(12) United States Patent
Ling

(10) Patent No.: US 10,690,860 B2
(45) Date of Patent: Jun. 23, 2020

(54) OPTICAL FIBER CONNECTOR AND ASSEMBLING STRUCTURE THEREOF

(71) Applicant: Kow-Je Ling, Taipei (TW)

(72) Inventor: Kow-Je Ling, Taipei (TW)

( * ) Notice: Subject to any disclaimer, the term of this patent is extended or adjusted under 35 U.S.C. 154(b) by 0 days.

(21) Appl. No.: 16/163,637

(22) Filed: Oct. 18, 2018

(65) Prior Publication Data

US 2019/0121031 A1 Apr. 25, 2019

(30) Foreign Application Priority Data

Oct. 20, 2017 (TW) .............................. 106136016 A

(51) Int. Cl.
*G02B 6/38* (2006.01)
(52) U.S. Cl.
CPC .......... *G02B 6/3825* (2013.01); *G02B 6/3809* (2013.01); *G02B 6/3869* (2013.01); *G02B 6/3861* (2013.01)
(58) Field of Classification Search
CPC ....................................................... G02B 6/38
USPC ............................................................ 395/66
See application file for complete search history.

(56) References Cited

U.S. PATENT DOCUMENTS

| 4,657,340 | A | * | 4/1987 | Tanaka | G02B 6/3878 385/139 |
| 5,151,961 | A | * | 9/1992 | Hvezda | G02B 6/3817 385/60 |
| 5,521,996 | A | * | 5/1996 | Ames | G02B 6/3817 385/53 |
| 5,675,680 | A | * | 10/1997 | Ames | G02B 6/3877 385/53 |
| 5,802,230 | A | * | 9/1998 | Kuribayashi | G02B 6/4246 385/88 |
| 6,022,150 | A | * | 2/2000 | Erdman | G02B 6/3843 385/62 |
| 6,113,283 | A | * | 9/2000 | Blom | G02B 6/4292 385/92 |
| 7,744,286 | B2 | * | 6/2010 | Lu | G02B 6/3816 385/53 |
| 2002/0076165 | A1 | * | 6/2002 | Childers | G02B 6/3869 385/78 |
| 2003/0007743 | A1 | * | 1/2003 | Asada | G02B 6/3887 385/81 |
| 2003/0161586 | A1 | * | 8/2003 | Hirabayashi | G02B 6/3851 385/78 |

(Continued)

*Primary Examiner* — Kaveh C Kianni
(74) *Attorney, Agent, or Firm* — Bacon & Thomas, PLLC

(57) ABSTRACT

An optical fiber connector includes a body member, a positioning member, a plastic portion, and an optical fiber assembly. The body member includes a first positioning hole and a concave portion. The positioning member includes a first spacing board and at least one positioning sheet. The first spacing board is provided with a second positioning hole and a protrusion. The second positioning hole corresponds to the first positioning hole, and the protrusion corresponds to the concave portion. The at least one positioning sheet is provided with a third positioning hole corresponding to the second positioning hole. The plastic portion is formed at the third positioning hole. The optical fiber assembly includes a bare fiber and a protective layer, such that the bare fiber passes through the third positioning hole, and is enveloped by the protective layer however with at least an end of the bare fiber uncovered.

16 Claims, 52 Drawing Sheets

(56) References Cited

U.S. PATENT DOCUMENTS

| | | | | |
|---|---|---|---|---|
| 2003/0201462 | A1* | 10/2003 | Pommer | G02B 6/4201 257/200 |
| 2003/0223701 | A1* | 12/2003 | Furumai | G02B 6/4246 385/73 |
| 2004/0264888 | A1* | 12/2004 | Go | G02B 6/325 385/92 |
| 2005/0135753 | A1* | 6/2005 | Eigenmann | G02B 6/3825 385/59 |
| 2006/0018609 | A1* | 1/2006 | Sonoda | G02B 6/4204 385/93 |
| 2009/0245734 | A1* | 10/2009 | Nakagawa | G02B 6/3887 385/78 |
| 2009/0257717 | A1* | 10/2009 | Liu | G02B 6/3833 385/66 |
| 2009/0257722 | A1* | 10/2009 | Fisher | G02B 6/3878 385/115 |
| 2010/0172617 | A1* | 7/2010 | Sato | G02B 6/421 385/88 |
| 2010/0303416 | A1* | 12/2010 | Danley | G02B 6/25 385/55 |
| 2010/0310213 | A1* | 12/2010 | Lewallen | G02B 6/3817 385/75 |
| 2011/0052126 | A1* | 3/2011 | Yamamoto | G02B 6/4204 385/92 |
| 2011/0097039 | A1* | 4/2011 | Zhao | G02B 6/4292 385/70 |
| 2011/0280525 | A1* | 11/2011 | Marcouiller | G02B 6/2551 385/99 |
| 2013/0084045 | A1* | 4/2013 | Aoki | G02B 6/3576 385/92 |
| 2015/0378111 | A1* | 12/2015 | Hikosaka | G02B 6/3887 385/60 |
| 2018/0031782 | A1* | 2/2018 | Zseng | G02B 6/3887 |
| 2019/0018201 | A1* | 1/2019 | Takano | G02B 6/4292 |
| 2019/0170961 | A1* | 6/2019 | Coenegracht | G02B 6/4472 |

* cited by examiner

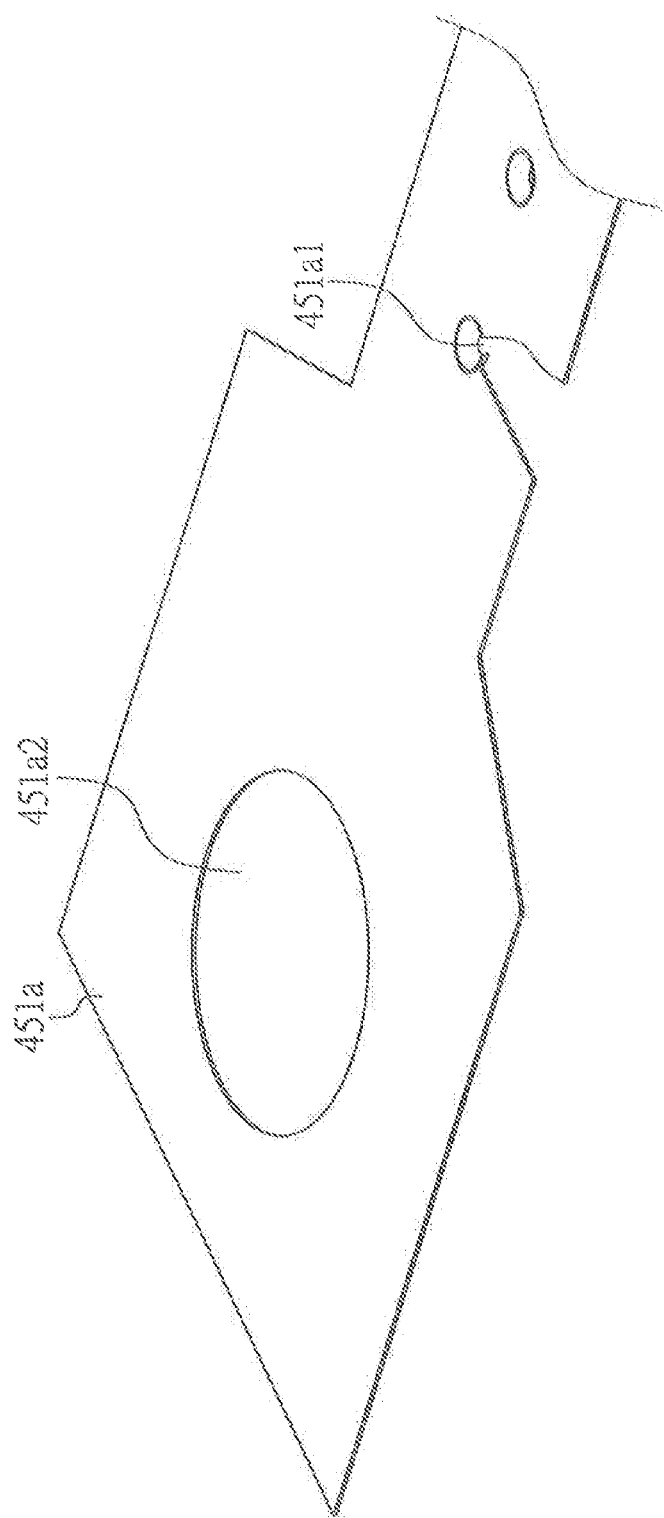

OPTICAL FIBER CONNECTOR AND ASSEMBLING STRUCTURE THEREOF

BACKGROUND OF THE INVENTION

1. Field of the Invention

The present invention relates to an optical fiber connector and assembled structure thereof, more particularly, to an optical fiber connector and assembled structure thereof using body members and positioning assemblies to position bare fibers.

2. Description of Related Art

As the era is progressing, Internet technology has been developed and changed day after day. Various kinds of information transmitted and received through Internet have become an important source of intelligence. In particular, the Internet, with merits of its real-time characteristic, turns out to be one of the indispensable media for interpersonal relations and communication between politicians or between businesses.

Following a rapid growth of the amount of information, optical fiber cables have developed and played a role in connecting Internet facilities which serve as a medium of transmission. Along with popularization of Internet, optical fiber cables have been employed through official services or huge organizations such as enterprises for business purposes, and down to personal usage.

No matter whether optical fiber cables are used by enterprises or personal, optical fiber connectors are essential to bond the optical fiber cables with relevant hardware facilities. During the manufacturing of optical fiber connectors, optical fibers are broken easily upon positioning. This will decrease the yield rate and production capacity when manufacturing the optical fiber connectors.

Referring to FIG. 1, a schematic view illustrating the conventional positioning of an optical fiber connector, the conventional positioning structure for an optical fiber connector relates to using a sleeve 13 to position the connection of an optical fiber connector assembly 11 and an optical fiber connector assembly 12. The optical fiber connector assembly 11 includes an optical fiber assembly 111 and a ferrule 112. The optical fiber connector assembly 12 includes an optical fiber assembly 121 and a ferrule 122. The optical fiber connector assembly 11 and the optical fiber connector assembly 12 are inserted into both ends of the sleeve 13, respectively, such that the end surface of the optical fiber assembly 111 and the end surface of the optical fiber assembly 121 contact, physically, with each other, and that signals can be connected and transmitted through the optical fiber.

Nevertheless, for the optical fiber connector assemblies 11, 12, the ferrules 112, 122 are drilled with holes, and then the optical fiber assemblies 111, 121 are embedded into the holes of the ferrules 112, 122. As such, manufacturing of the optical fiber connector assemblies 11, 12 not only is time consuming and labor consuming, but also is difficult for the connection of the optical fiber connector assemblies 11, 12 to be positioned, making it inappropriate for use and production in great amount. Given the above, with a spirit of aggressive innovation, an "Optical Fiber Connector and Assembled Structure Thereof" has been conceptualized by utilizing the structural design of body members and positioning assemblies, so as to improve the production efficiency of optical fiber connectors, and eventually the present invention is accomplished after research and experiments have been undertaken.

SUMMARY OF THE INVENTION

An object of the present invention is to solve the problems as mentioned above, and to provide an optical fiber connector and assembled structure thereof so as to improve the production efficiency of optical fiber connectors.

To achieve the above-mentioned object, a first aspect of the optical fiber connector, according to the present invention, comprises a body member and a positioning member. The body member includes a first positioning hole and a concave portion. The positioning member includes a first spacing board and at least one positioning sheet. The first spacing board is provided with a second positioning hole and a protrusion. The second positioning hole corresponds to the first positioning hole, and the protrusion corresponds to, and is arranged in the concave portion. The at least one positioning sheet is provided with a third positioning hole corresponding to the second positioning hole. Components of the body member and of the positioning member can be applied with adhesive, so that the body member and the positioning member can be integrated into one piece.

According to the first aspect of the optical fiber connector, the positioning member further includes at least one second spacing board, and that the second spacing board is provided with a fourth positioning hole corresponding to the third positioning hole.

Further, according to the first aspect of the optical fiber connector, the at least one positioning sheet may be made either of plastic material, metallic material, or celluloid material.

Still further, according to the first aspect of the present invention, in case the at least one positioning sheet relates to plural ones, the positioning sheets cover at least two kinds of thicknesses.

According to the first aspect of the optical fiber connector, the concave portion is formed inside with a first thread portion, and the first spacing board formed with a second thread portion corresponding to the first thread portion.

Further, according to the first aspect of the optical fiber connector, the first spacing board includes at least one structural reinforcing portion, and that each positioning sheet is provided with at least one structural reinforcing hole corresponding to the at least one reinforcing portion.

Still further, according to the first aspect of the optical fiber connector, each positioning sheet is provided with a plurality of structural reinforcing apertures communicated with the first spacing board, and with the at least one second spacing board.

According to the first aspect of the optical fiber connector, the first spacing board is provided with at least one structural reinforcing slot, and that each positioning sheet is provided with at least one structural reinforcing aperture corresponding to the at least one structural reinforcing slot. Each second spacing board includes at least one structural reinforcing portion corresponding to the at least one structural reinforcing slot.

Further, a second aspect of the optical fiber connector comprises a body member and a positioning member. The body member includes a first positioning hole and at least one engaging slot. The positioning member includes a first spacing board and at least one positioning sheet. The first spacing board includes a second positioning hole and at least one engaging portion. The second positioning hole corresponds to the first positioning hole, and that the at least one engaging portion corresponds to the at least one engaging slot. Each positioning sheet is provided with a third positioning hole corresponding to the second positioning hole, and with at least one first engaging groove corresponding to the at least one engaging portion. Components of the body member and of the positioning member can be applied with adhesive, so that the body member and the positioning member can be integrated into one piece.

Still further, according to the second aspect of the optical fiber connector, the positioning member includes at least one second spacing board. The at least one second spacing board includes a third positioning hole and at least one second engaging groove. The third positioning hole corresponds to the first positioning hole, and that the at least one second engaging groove corresponds to the at least one first engaging groove.

According to the second aspect of the optical fiber connector, the at least one positioning sheet may be made either of plastic material, metallic material, or celluloid material.

Further, according to the second aspect of the optical fiber connector, in case the at least one positioning sheet relates to plural ones, the positioning sheets cover at least two kinds of thicknesses.

Still further, a third aspect of the optical fiber connector comprises a body member and a positioning sheet. The body member is provided with a first positioning hole and at least one structural reinforcing portion. The positioning sheet is provided with at least one structural reinforcing hole and a third positioning hole. The at least one structural reinforcing hole corresponds to the at least one structural reinforcing portion. The third positioning hole corresponds to the first positioning hole. The body member and the positioning sheet are applied with adhesive therebetween, so that the body member and the positioning sheet can be integrated into one piece.

According to the present invention, a fourth aspect of the optical fiber connector comprises a tube member and a positioning member. The tube member is provided with a first positioning hole. The positioning member includes a first spacing portion, a second spacing portion, and at least one positioning sheet. The first spacing portion is provided with a second positioning hole and at least one structural reinforcing slot. The first spacing portion corresponds to the first positioning hole. Each positioning sheet is provided with a third positioning hole and at least one structural reinforcing aperture. The third positioning hole corresponds to the second positioning hole. The at least one structural reinforcing aperture corresponds to the at least one structural reinforcing slot. The second spacing portion is provided with a fourth positioning hole and at least one structural reinforcing portion, where the fourth positioning hole corresponds to the third positioning hole, and the at least one structural reinforcing portion to the at least one structural reinforcing slot. Adhesive is applied to and in between components of the tube member and of the positioning member, such that the tube member and the positioning member can be integrated into one piece.

Further, for the fourth aspect of the optical fiber connector, the tube member is provided with at least one fastening hole. The first spacing portion is further provided with at least one fastening portion corresponding to the at least one fastening hole.

Still further, the fourth aspect of the optical fiber connector further comprises a third spacing portion and two positioning sheets. The third spacing portion is interposed between the two positioning sheets. The third spacing portion is provided with a fifth positioning hole and at least one structural protrusion and at least one structural reinforcing recess.

According to the fourth aspect of the optical fiber connector, the at least one positioning sheet may be made either of plastic material, metallic material, or celluloid material.

Further, according to the fourth aspect of the optical fiber connector, in case the at least one positioning sheet relates to plural ones, the positioning sheets cover at least two kinds of thicknesses.

Still further, a fifth aspect of the optical fiber connector comprises a tube member and a positioning member. The tube member is provided with a first positioning hole. The positioning member includes a first spacing portion, a second spacing portion, and at least one positioning sheet. The first spacing portion is provided with a second positioning hole, at least one structural reinforcing slot, and at least one fastening opening. The first spacing portion corresponds to the first positioning hole. Each positioning sheet is provided with a third positioning hole and at least one structural reinforcing aperture. The third positioning hole corresponds to the second positioning hole. The at least one structural reinforcing aperture corresponds to the at least one structural reinforcing slot. The second spacing portion is provided with a fourth positioning hole and at least one fastening portions. The fourth positioning hole corresponds to the third positioning hole, and that the at least one fastening portions to the at least one fastening opening. Adhesive will be applied to and in between the components of the tube member and of the positioning member, such that the tube member and the positioning member can be integrated into one piece.

The fifth aspect of the optical fiber connector further comprises a third spacing portion. Suppose the at least one positioning sheet relates to two positioning sheets, then the third spacing portion is interposed between the two positioning sheets. The third spacing portion is provided with a fifth positioning hole and at least one concave portion.

Further, according to the fifth aspect of the optical fiber connector, the at least one positioning sheet may be made either of plastic material, metallic material, or celluloid material.

Still further, according to the fifth aspect of the optical fiber connector, in case the at least one positioning sheet relates to plural ones, the positioning sheets cover at least two kinds of thicknesses.

According to the present invention, a sixth aspect of the optical fiber connector comprises a tube member and a positioning member. The tube member is provided with a first positioning hole and at least one fastening hole. The positioning member includes a first spacing portion, a second spacing portion, and at least one positioning sheet. The first spacing portion is provided with a second positioning hole and at least one structural reinforcing slot. The first spacing portion corresponds to the first positioning hole. Each positioning sheet is provided with a third positioning hole and at least one structural reinforcing aperture. The third positioning hole corresponds to the second positioning hole. The at least one structural reinforcing aperture corresponds to the at least one structural reinforcing slot. The second spacing portion is provided with a fourth positioning hole and at least one fastening portion, where the fourth positioning hole corresponds to the third positioning hole, and that the at least one fastening portion corresponds to the at least one fastening hole. Adhesive will be applied to and in between the components of the tube member and of the positioning member, such that the tube member and the positioning member can be integrated into one piece.

Further, the sixth aspect of the optical fiber connector further comprises a third spacing portion. Suppose the at least one positioning sheet relates to two positioning sheets, then the third spacing portion is interposed between the two positioning sheets. The third spacing portion is provided with a fifth positioning hole and at least one concave portion.

Still further, according to the sixth aspect of the optical fiber connector, the at least one positioning sheet may be made either of plastic material, metallic material, or celluloid material.

According to the sixth aspect of the optical fiber connector, in case the at least one positioning sheet relates to plural ones, the positioning sheets cover at least two kinds of thicknesses.

According to the present invention, in the first aspect to the sixth aspect of the optical fiber connectors, the third positioning holes each has a cross-section relatively ladder-like, with a longer top side and a shorter bottom side, and opened downward, and that an opening is formed at the bottom thereof, such that bare fibers can be inserted into, and positioned in, the third positioning holes.

Further, the first aspect to the sixth aspect of the optical fiber connectors each further comprises an optical fiber assembly including a bare fiber and a protective layer. The bare fiber is enveloped by the protective layer however with at least an end of the bare fiber uncovered. The protective layer is provided with a first positioning hole, and that the bare fiber is inserted into the third positioning hole so as to obtain a positioning effect.

Still further, in the first aspect of the optical fiber connector, a plastic portion is formed by applying glue in and between the bare fiber and the positioning sheet so as to secure the bare fiber.

According to the present invention, in the second to the six aspect of the optical fiber connectors, plastic portions are formed by applying glue in and between the bare fibers and the positioning sheets so as to secure the bare fibers.

Further, according to the present invention, an assembled structure of optical fiber connectors comprises, in a first aspect, a plurality of optical fiber connectors, a casing member, an upper board, a positioning assembly, and a plastic member. The upper board is arranged above the casing member, and includes at least one sprue and at least one optical-fiber-assembly through hole. The positioning assembly is provided at inner side of the casing member, and is provided with at least one optical-fiber-connector positioning hole corresponding to the at least one optical-fiber-assembly through hole. The plastic member is integrated with the casing member, the upper board, the positioning assembly, and with at least one optical fiber connector, where the at least one optical fiber connector corresponds to, and passes through, the at least one optical-fiber-assembly through hole.

In the first aspect of the assembled structure of optical fiber connectors, the casing member further includes a mounting portion for arranging a protective member.

Further, in the first aspect of the assembled structure of optical fiber connectors, the positioning assembly includes at least one sheet and at least one spacing board. The at least one sheet is provided with at least one optical-fiber-connector positioning hole, whereas the at least one spacing board is provided with at least one positioning hole corresponding to the at least one optical-fiber-assembly through hole.

Still further, in the first aspect of the assembled structure of optical fiber connectors, the positioning assembly may be formed with at least one plastic-material channel; and that a plastic member, located at the upper side and lower side of the positioning assembly, can be fed through the at least one plastic-material channel, and formed integrally as an optical-fiber-connector assembled structure.

In the first aspect of the assembled structure of optical fiber connectors, at least one positioning sheet of each optical fiber connector and the at least one sheet may be made either of plastic material, metallic material, or celluloid material.

Further, in the first aspect of the assembled structure of optical fiber connectors, in case the at least one positioning sheet relates to plural ones, the positioning sheets cover at least two kinds of thicknesses.

Still further, a second aspect of the assembled structure of optical fiber connectors comprises a plurality of optical fiber connectors, a first body member, a second body member, and a positioning assembly. The first body member includes at least one first mounting portion. The second body member is arranged on the first body member, and includes at least one second mounting portion corresponding to the at least one first mounting portions. The positioning assembly includes either at least one sheet or at least one spacing board. The at least one sheet is provided with a plurality of optical-fiber-connector positioning holes corresponding to the plural optical fiber connectors, respectively. The at least one spacing board is provided with a plurality of positioning holes corresponding respectively to the plural optical fiber connectors. Adhesive is applied to the plural optical fiber connectors, the first body member, the second body member, and the positioning assembly, so as to make the same integrated into one piece. The plural optical fiber connectors correspond to, and are arranged in, the at least one first mounting portion and the at least one second mounting portion; and besides, ends of the plural optical fiber connectors emerge from the positioning holes of the at least one spacing board, respectively.

The second aspect of the assembled structure of optical fiber connectors further comprises two tube-like members. The first body member further includes two receiving portions for receiving the two tube-like members. The first body member and the second body member are formed with two recessed portions. The positioning assembly further includes two protrusions corresponding respectively to the two recessed portions. The at least one spacing board further includes two second positioning pin holes corresponding respectively to the two tube-like members. The two tube-like members are provided on the positioning assembly. Each tube-like member includes a third positioning pin hole for receiving a positioning pin. Adhesive is applied to the plural optical fiber connectors, the first body member, the second body member, the positioning assembly, and the two tube-like members, so as to make the same integrated into one piece.

Further, the second aspect of the assembled structure of optical fiber connectors further comprises two tube-like members. The first body member further includes two receiving portions for respectively receiving the two tube-like members, and two first fastening portions. Further, the second body member further includes two second fastening portions corresponding respectively to the two first fastening portions, and two first engaging portions. The positioning assembly further includes two second engaging portions corresponding respectively to the two first engaging portions. The at least one spacing board further includes two second positioning pin holes corresponding respectively to the two tube-like members. The two tube-like members are provided on the positioning assembly. Each tube-like member includes a third positioning pin hole for receiving the positioning pin. Adhesive is applied to the plural optical fiber connectors, the first body member, the second body member, the positioning assembly, and the two tube-like members, so as to make the same integrated into one piece.

Further, in the second aspect of the assembled structure of optical fiber connectors, the at least one sheet is formed with an opening communicated therethrough, and a plurality of positioning slots, where the positioning slots take place of the plural optical-fiber-connector positioning holes of the at least one sheet, respectively.

Still further, the second aspect of the assembled structure of optical fiber connectors further comprises a protective member for receiving therein the first body member, the second body member, and the positioning assembly.

According to the present invention, a seventh aspect of the optical fiber connector comprises an upper board, a positioning assembly, two tube-like members, a plastic member, and at least one optical fiber assembly. The upper board includes at least one sprue, at least one optical-fiber-assembly through hole, and two mounting holes. The positioning assembly includes at least one positioning sheet, where the at least one positioning sheet is provided with at least one bare-fiber positioning hole corresponding to the at least one optical-fiber-assembly hole, and with two first positioning pin holes corresponding respectively to the two mounting holes. The tube-like members are provided respectively on the two mounting holes, and that the tube-like members are each provided with a third positioning pin hole for receiving a positioning pin. The plastic member is integrated with the upper board, the positioning assembly, and the two tube-like members, and that the at least one optical fiber assembly is integrated with the plastic member. The at least one optical fiber assembly includes at least one bare fiber and a protective layer, and that the at least one bare fiber corresponds to, and emerges from the at least one bare-fiber positioning hole.

Further, according to the seventh aspect of the optical fiber connector, the positioning assembly further comprises at least one spacing board. The at least one spacing board includes at least one positioning hole corresponding to the at least one bare-fiber positioning hole, and with two second positioning pin holes corresponding respectively to the two tube-like members.

Still further, according to the present invention, the seventh aspect of the optical fiber connector further comprises a casing member, where the casing member is formed with an accommodating space for receiving the plastic member, the upper board, and the two tube-like member; and where the casing member has a length and a width, which are greater than a length and a width of the positioning assembly.

In the seventh aspect of the optical fiber connector, the at least one positioning sheet may be made either of plastic material, metallic material, or celluloid material.

Further, according to the seventh aspect of the present invention, in case the at least one positioning sheet relates to plural ones, the positioning sheets cover at least two kinds of thicknesses.

Still further, an eighth aspect of the optical fiber connector comprises a first body member, a second body member, a positioning assembly, two tube-like members, and at least one optical fiber assembly. The first body member includes at least one first mounting portion and two receiving portions. The second body member is arranged on the first body member, and includes at least one second mounting portion corresponding to the at least one first mounting portion. The positioning assembly includes either at least one positioning sheet or at least one spacing board. The at least one positioning sheet is provided with at least one bare-fiber positioning hole corresponding to the at least one first mounting portion and to the at least one second mounting portion, and with two first positioning pin holes. The at least one spacing board is provided with at least one positioning hole corresponding to the at least one bare-fiber positioning hole, and with two second positioning pin holes. The two tube-like members correspond to, and are received in the two receiving portions. The two tube-like members are each provided with a third positioning pin hole for receiving a positioning pin, such that each third positioning pin hole corresponds to each first positioning pin hole and to each second positioning pin hole, respectively. The at least one optical fiber assembly corresponds to, and is arranged in, the at least one first mounting portion and in the at least one second mounting portion. The at least one optical fiber assembly includes at least one bare fiber and a protective layer. The at least one bare fiber emerges from the at least one bare-fiber positioning hole. Adhesive is applied to the first body member, the second body member, the two tube-like members, and the positioning assembly, so as to make the same integrated into one piece.

According to the eighth aspect of the optical fiber connector, the first body member and the second body member are formed with two recessed portions. The positioning assembly further includes two protrusions corresponding respectively to the two recessed portions. The two tube-like members are arranged on the positioning assembly.

Further, according to the eighth aspect of the optical fiber connector, the first body member further includes two first fastening portions. The second body member further includes two second fastening portions corresponding respectively to the two first fastening portions, and two first engaging portions. The positioning assembly further includes two second engaging portions corresponding respectively to the two first engaging portions.

Still further, according to the eighth aspect of the optical fiber connector, the at least one positioning sheet is provided with an opening communicated therethrough, and at least one positioning slot. The at least one positioning slot takes the place of the at least one bare-fiber positioning hole of the at least one positioning sheet.

According to the present invention, the eighth aspect of the optical fiber connector further comprises a protective member for accommodating the first body member, the second body member, and the positioning assembly.

Further, according to the present invention, the eighth aspect of the optical fiber connector, the at least one positioning sheet may be made either of plastic material, metallic material, or celluloid material.

Still further, according to the eighth aspect of the present invention, in case the at least one positioning sheet relates to plural ones, the positioning sheets cover at least two kinds of thicknesses.

According to the eighth aspect of the optical fiber connector, the at least one bare-fiber positioning hole has a cross-section relatively ladder-like, with a longer top side and a shorter bottom side, and that an opening is formed at the bottom thereof, such that bare fibers can be inserted into, and positioned in, the at least one bare-fiber positioning hole.

Further, according to the present invention the eighth aspect of the optical fiber connector further comprises at least one optical fiber assembly, where the at least one optical fiber connector corresponds to, and is arranged in, the at least one first mounting portion and in the at least one second mounting portion. The at least one optical fiber assembly includes at least one bare fiber and a protective layer, such that at least one bare fiber is enveloped by the protective layer; and besides, at least one end of the at least one bare fiber emerges from the protective layer. The at least one bare fiber passes through, and is arranged in, the at least one bare-fiber positioning hole so as to obtain a positioning effect.

Still further, according to the eighth aspect of the optical fiber connector, a plastic portion is formed by applying glue in and between the at least one bare fiber and the positioning assembly so as to secure the bare fiber.

The abovementioned brief description and the following detailed description are for the purpose of exemplification, and for a further explanation of the claims, and that it is understood that other objects, advantages, and novel features of the present invention will become more apparent from the following description when taken in conjunction with the accompanying drawings.

BRIEF DESCRIPTION OF THE DRAWINGS

FIG. 14B is a schematic view illustrating a positioning assembly of the optical fiber connector according to the nineteenth embodiment of the present invention;

DETAILED DESCRIPTION OF THE PREFERRED EMBODIMENTS

Figure 1:
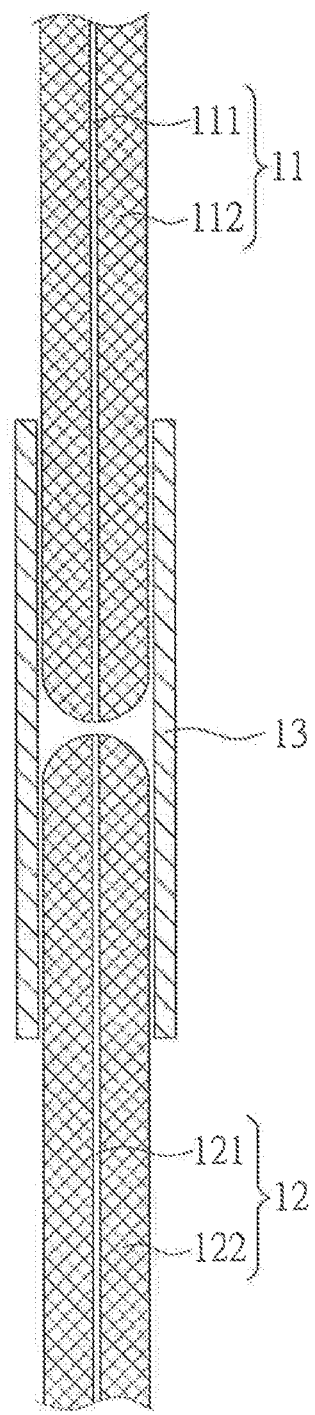
FIG. 1 is a schematic view illustrating the conventional positioning of an optical fiber connector.
Figure 2A:
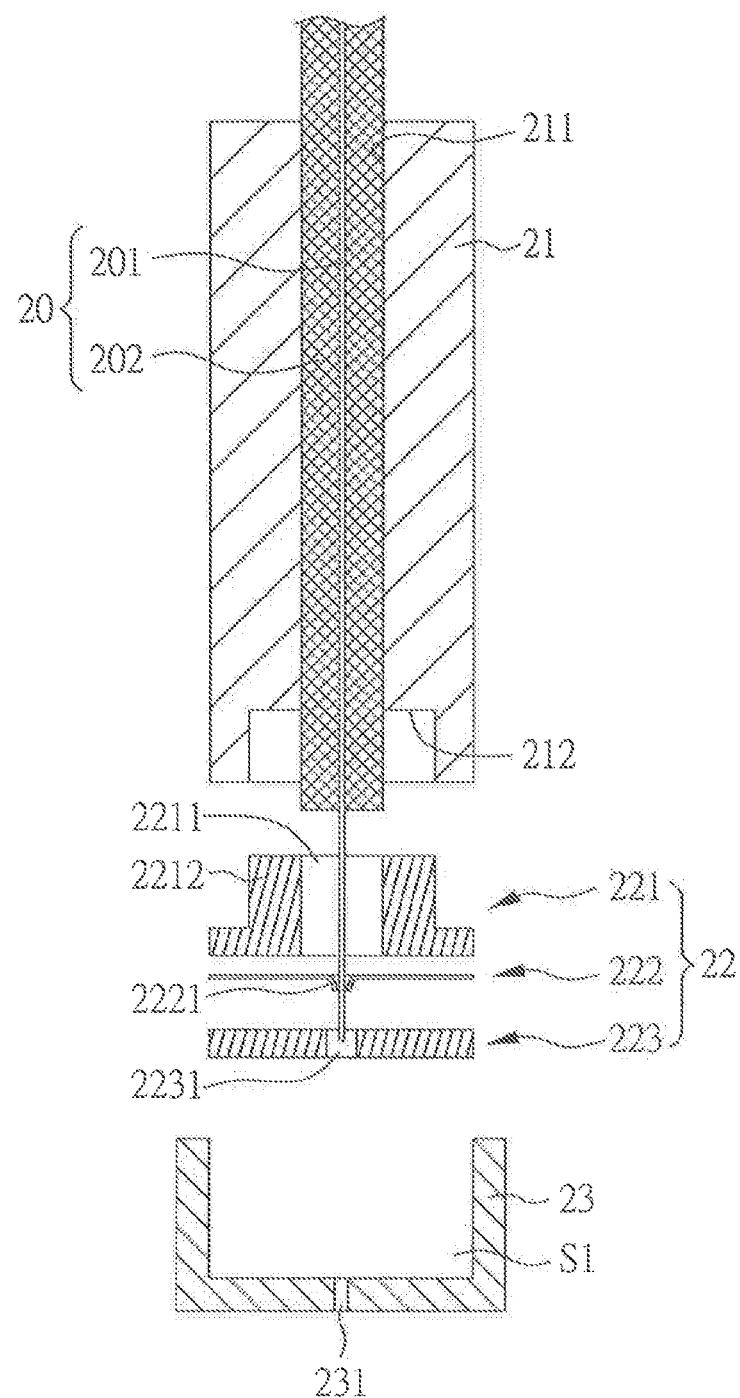
FIG. 2A is an exploded view illustrating manufacturing of an optical fiber connector according to a first embodiment of the present invention.
Figure 2B:
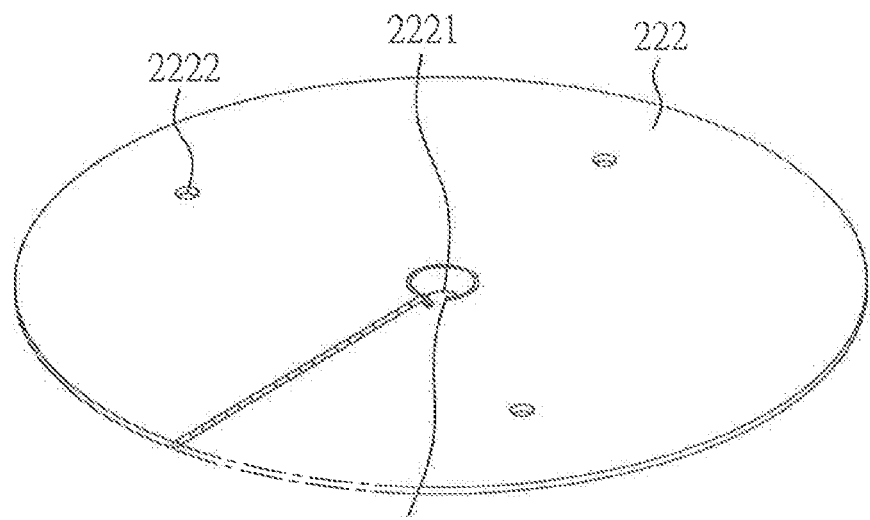
FIG. 2B is a schematic view illustrating a positioning sheet of the optical fiber connector according to the first embodiment of the present invention.

References are made to FIG. 2A, an exploded view illustrating manufacturing of an optical fiber connector according to a first embodiment of the present invention; FIG. 2B, a schematic view illustrating a positioning sheet of the optical fiber connector; and FIG. 2C, a cross-sectional view illustrating the optical fiber connector. The manufacturing of the optical fiber connector 2, in the first embodiment, comprises an optical fiber assembly 20, a body member 21, a positioning member 22, and a lower mold plate 23. By using the lower mold plate 23 and adhesive (not shown), the optical fiber assembly 20, the body member 21, and the positioning member 22 can be integrated into one piece, so as to form the optical fiber connector 2.

The optical fiber assembly 20 includes a bare fiber 201 and a protective layer 202, where the bare fiber 201 is enveloped by the protective layer 202 however with at least an end of the bare fiber 201 uncovered. The body member 21 includes a first positioning hole 211 and a concave portion 212. The positioning member 22 includes a first spacing board 221, a positioning sheet 222, and a second spacing board 223. The first spacing board 221 is provided with a second positioning hole 2211 and a protrusion 2212. The second positioning hole 2211 corresponds to the first positioning hole 211, and the protrusion 2212 corresponds to, and is arranged in the concave portion 212. The positioning sheet 222 is provided with a third positioning hole 2221 corresponding to the second positioning hole 2211, and three structural reinforcing holes 2222 communicated with the first spacing board 221 and the second spacing board 223. The second spacing board 223 is provided with a fourth positioning hole 2231 corresponding to the third positioning hole 2221. The positioning sheet 222 is stacked on the second spacing board 223. The lower mold plate 23 is provided with a through hole 231 corresponding to the fourth positioning hole 2231, and with an accommodating space S1 for arranging therein the body member 21 and the positioning member 22.

Further, as shown in FIG. 2A, the protective layer 202 of the optical fiber assembly 20 passes through, and is arranged in, the first positioning hole 211; whereas the bare fiber 201 of the optical fiber assembly 20 passes through, and is arranged in, the third positioning hole 2221 for achieving the purpose of positioning. Adhesive will be applied to and in between the components of the body member 21 and of the positioning member 22; and then the optical fiber assembly 20, the body member 21, and the positioning member 22 be laid into the accommodating space S1 of the lower mold plate 23, and be pressed, such that the optical fiber assembly 20, the body member 21, and the positioning member 22 can be integrated into one piece. Thereafter, the lower mold plate 23 is removed, and the fourth positioning hole 2231 is applied with glue so as to form a plastic portion 240 and to secure the bare fiber 201, where the bare fiber 201 will be processed with abrasion.

Still further, as shown in FIGS. 2A and 2B, the third positioning hole 2221 is formed crater-like and opened downward, such that cross-section of the third positioning hole 2221 is relatively ladder-like, with a longer top side and a shorter bottom side, and that an opening is formed at the bottom thereof. With this configuration, the bare fiber 201 can be inserted into the third positioning hole 2221 easily during the process of manufacturing. Moreover, the bare fiber 201 can be positioned precisely in an accurate position where the optical fiber connector 2 is connected and aligned with other optical fiber connector, making signals between the two optical fiber connectors be transmitted more efficiently. The structural reinforcing holes 2222 of the positioning sheet 222 can make the first spacing board 221 and the second spacing board 223 be securely glued together.

The body member 21 may be made either of plastic material, metallic material, or ceramic material; whereas the positioning sheet 222 made either of plastic material, metallic material, or celluloid material, which facilitate arranging the third positioning hole 2221 at an accurate position, and which facilitate abrasion of the optical fiber connectors. Further, suppose the second spacing board 223 is absent, the third positioning hole 2221 is to correspond to the through hole 231 of the lower mold plate 23.

Figure 3A:
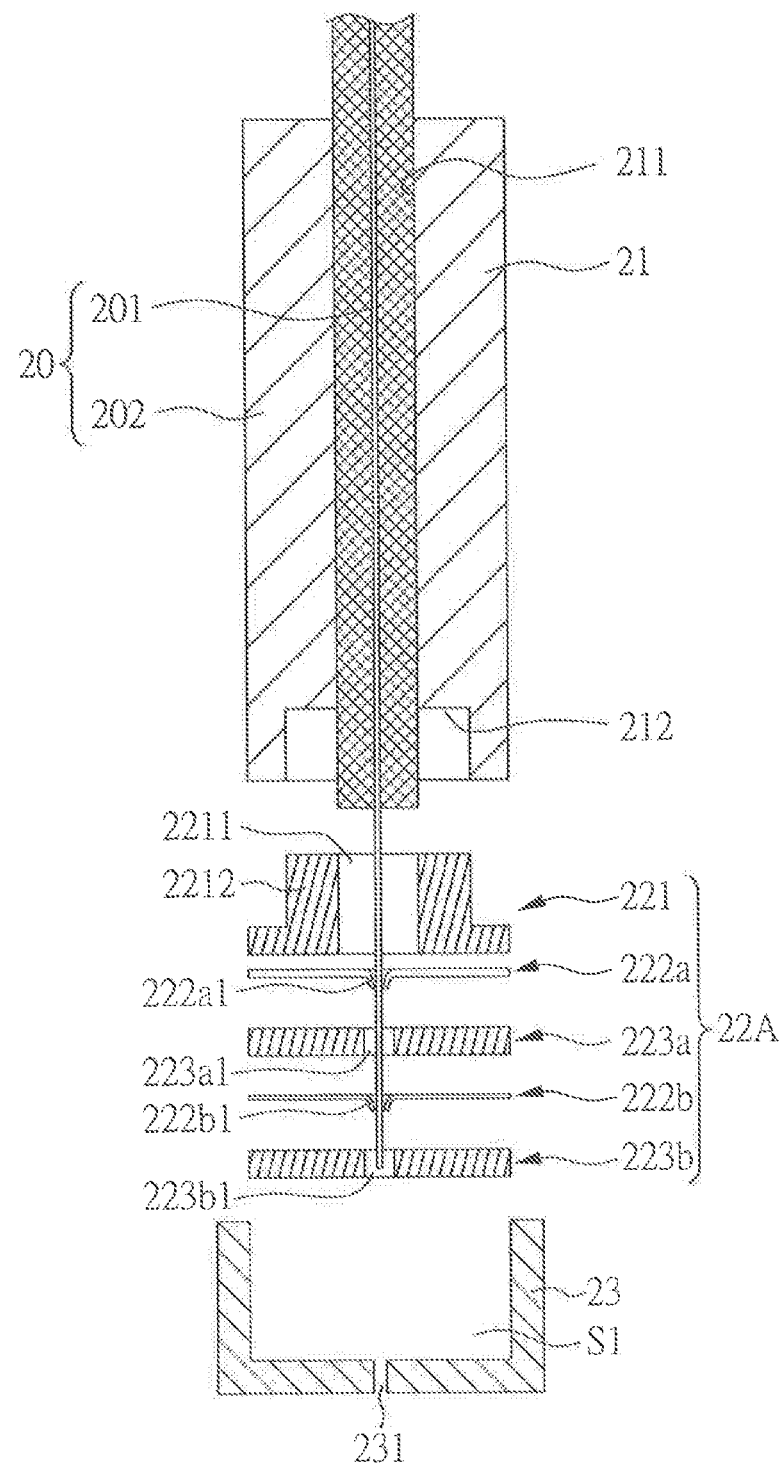
FIG. 3A is an exploded view illustrating manufacturing of an optical fiber connector according to a second embodiment of the present invention.
Figure 3B:
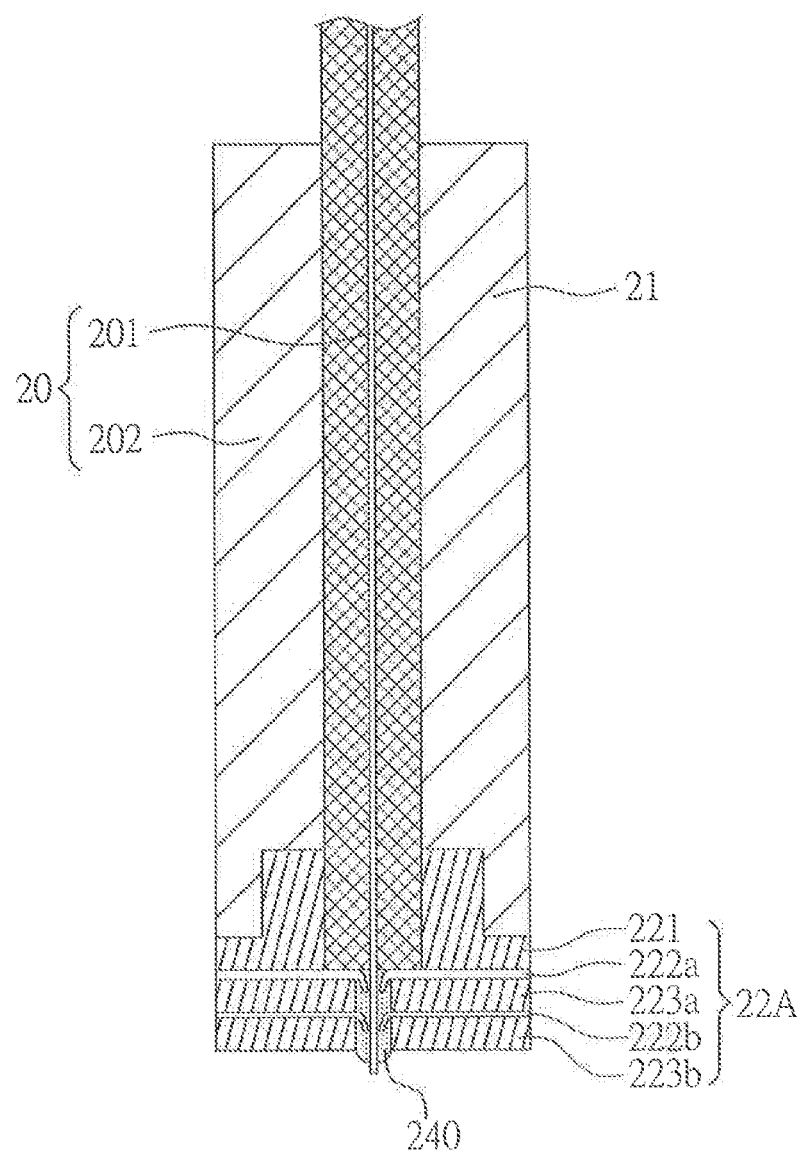
FIG. 3B is a cross-sectional view illustrating the optical fiber connector according to the second embodiment of the present invention.

Now references are made to FIG. 3A, an exploded view illustrating manufacturing of an optical fiber connector according to a second embodiment of the present invention; and FIG. 3B, a cross-sectional view illustrating the optical fiber connector. The manufacturing of the optical fiber connector 2A, in the second embodiment, comprises an optical fiber assembly 20, a body member 21, a positioning member 22A, and a lower mold plate 23. By using the lower mold plate 23 and adhesive (not shown), the optical fiber assembly 20, the body member 21, and the positioning member 22A can be integrated into one piece, so as to form the optical fiber connector 2A.

According to the present invention, the optical fiber connector 2 of the first embodiment differs from the optical fiber connector 2A of the second embodiment in that there are different numbers for the positioning sheets and for the second spacing boards. The positioning member 22A includes a first spacing board 221, two positioning sheets 222a, 222b, and two second spacing boards 223. The first spacing board 221 is provided with a second positioning hole 2211 and a protrusion 2212. The second positioning hole 2211 corresponds to a first positioning hole 211, and the protrusion 2212 corresponds to, and is arranged in, a concave portion 212. The positioning sheet 222a is provided with a bare-fiber positioning hole 222a1 corresponding to the second positioning hole 2211, whereas the positioning sheet 222b is provided with a bare-fiber positioning hole 222b1 corresponding to the second positioning hole 2211. The second spacing board 223a is provided with a second positioning hole 223a1 corresponding to the bare-fiber positioning hole 222a1; whereas the second spacing board 223b is provided with a second positioning hole 223b1 corresponding to the bare-fiber positioning hole 222B1. The positioning sheets 222a, 223b and the second spacing boards 223a, 223b are interlaced with each other. The lower mold plate 23 is provided with a through hole 231 corresponding to the second positioning hole 223b1, and with an accommodating space S1 for arranging therein the body member 21 and the positioning member 22A.

Namely, in the second embodiment, the two positioning sheets 222a, 222b are used to enhance the positioning effect of the bare fiber 201. The shape of the positioning sheets 222a, 222b may be formed, as shown in FIG. 2B, by either laser cutting method, wet etching method, dry etching method, or precision punching method. In view of the fact that these methods relate to quite mature technology, a thickness of preferably 0.05 mm for the positioning sheet 222b, and a diameter of preferably 0.127 mm for the bare-fiber positioning holes 222a1, 222b1, can be obtained easily. Besides, the positioning sheets 222a, 222b each has a different thickness, respectively, such that the positioning sheet 222a has a thickness of 0.5 mm which is greater than that of the positioning sheet 222b, thereby the optical fiber connector 2A can increase its wear resistance and durability.

Figure 2C:
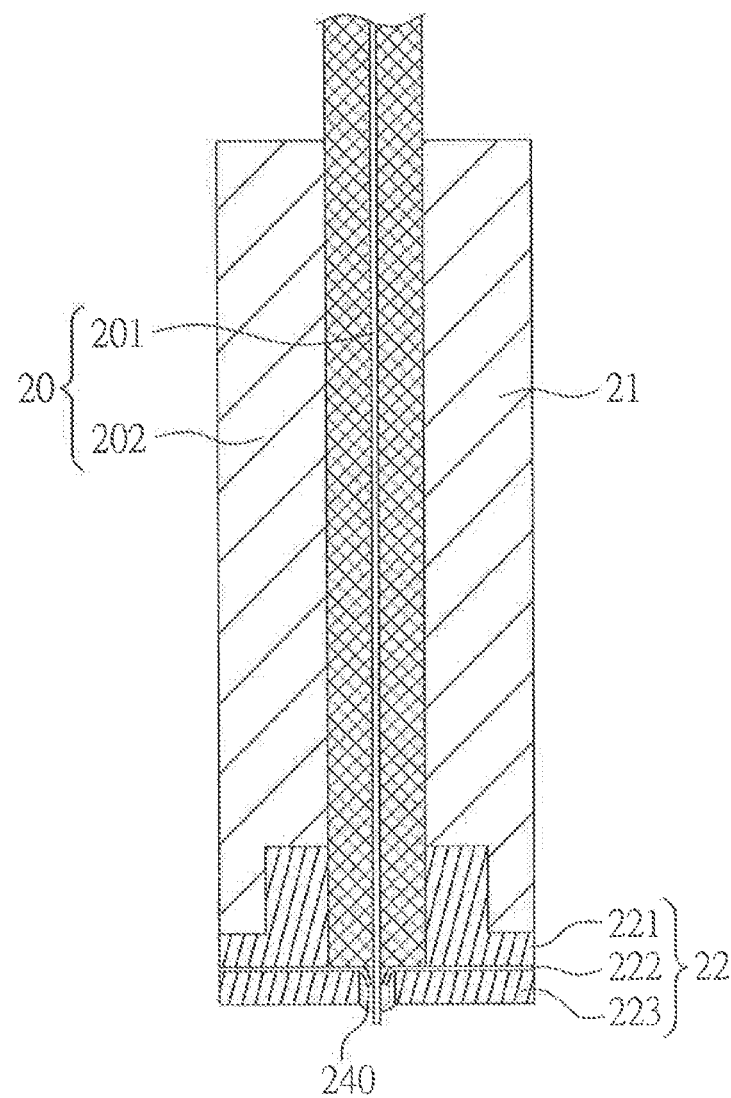
FIG. 2C is a cross-sectional view illustrating the optical fiber connector according to the first embodiment of the present invention.
Figure 4:
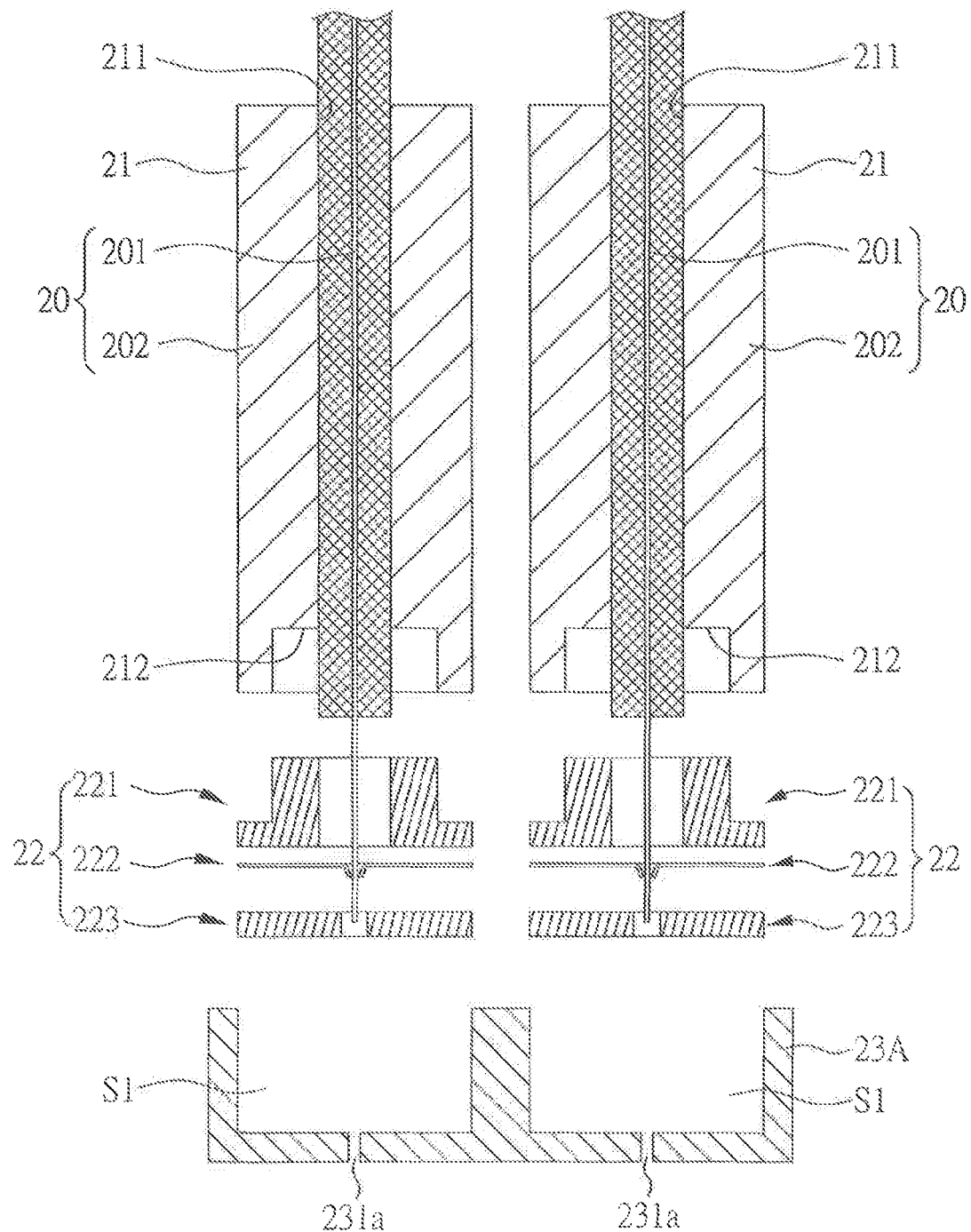
FIG. 4 is an exploded view illustrating manufacturing of an optical fiber connector according to a third embodiment of the present invention.

Further referring to FIG. 4, an exploded view illustrating manufacturing of an optical fiber connector according to a third embodiment of the present invention, the manufacturing of the optical fiber connector, in the third embodiment, comprises two optical fiber assemblies 20, two body members 21, two positioning members 22, and a lower mold plate 23. By using the lower mold plate 23 and adhesive (not shown), the optical fiber assembly 20, the body member 21, and the positioning member 22 can be integrated into one piece, so as to form the optical fiber connector 2 as shown in FIG. 2C.

Still further, according to the present invention, the manufacturing of the optical fiber connector of the third embodiment differs from the manufacturing of the optical fiber connector of the first embodiment in that a lower mold plate 23A is provided with two through holes 231a and two accommodating spaces S1 for arranging therein the body members 21 and the positioning members 22. Namely, in the third embodiment, two optical fiber connectors can be made in one process, so as to increase the production capacity of optical fiber connectors. As such, it is obvious to know that making plural optical fiber connectors at one process with plural lower mold plates is possible.

Figure 5:
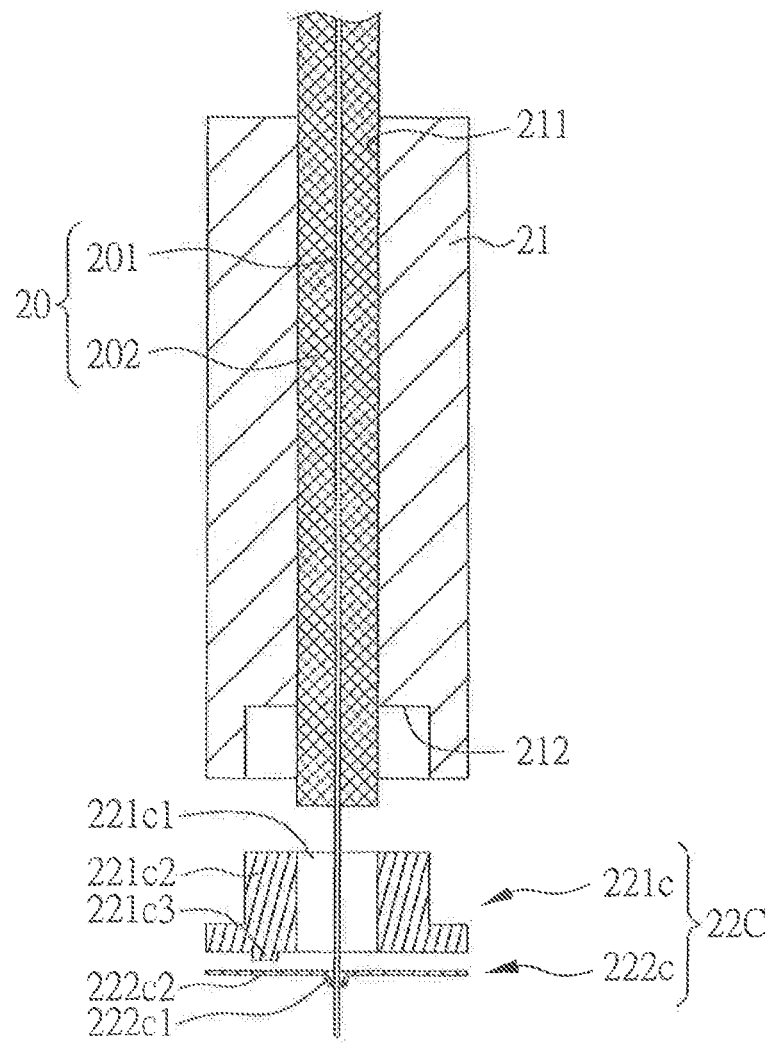
FIG. 5 is an exploded view illustrating manufacturing of an optical fiber connector according to a fourth embodiment of the present invention.

Now referring to FIG. 5, an exploded view illustrating manufacturing of an optical fiber connector according to a fourth embodiment of the present invention, the manufacturing of an optical fiber connector, in the fourth embodiment, comprises an optical fiber assembly 20, a body member 21, a positioning member 22C, and a lower mold plate 23.

In the fourth embodiment, the positioning member 22C includes a first spacing board 221c and a positioning sheet 222c. The first spacing board 221c includes a second positioning hole 221c1, a protrusion 221c2, and three structural reinforcing portions 221c3. The three structural reinforcing portions 221c3, which are formed equidistantly, surround the second positioning hole 221c1 (since FIG. 5 is a cross-sectional view, only one structural reinforcing position 221c3 is shown). The second positioning hole 221c1 corresponds to a first positioning hole 221, and the protrusion 221c2 corresponds to, and is arranged, in a concave portion 212. The positioning sheet 222c includes a third positioning hole 222c1 and three positioning apertures 222c2 corresponding to the three structural reinforcing portions 221c3, respectively. Through the help of the three structural reinforcing portions 221c3 and the three positioning apertures 222c2, the structure of the first spacing board 221c and of the positioning sheet 222c can be strengthened, and after gluing and pressing, an optical fiber connector can be formed.

Figure 6:
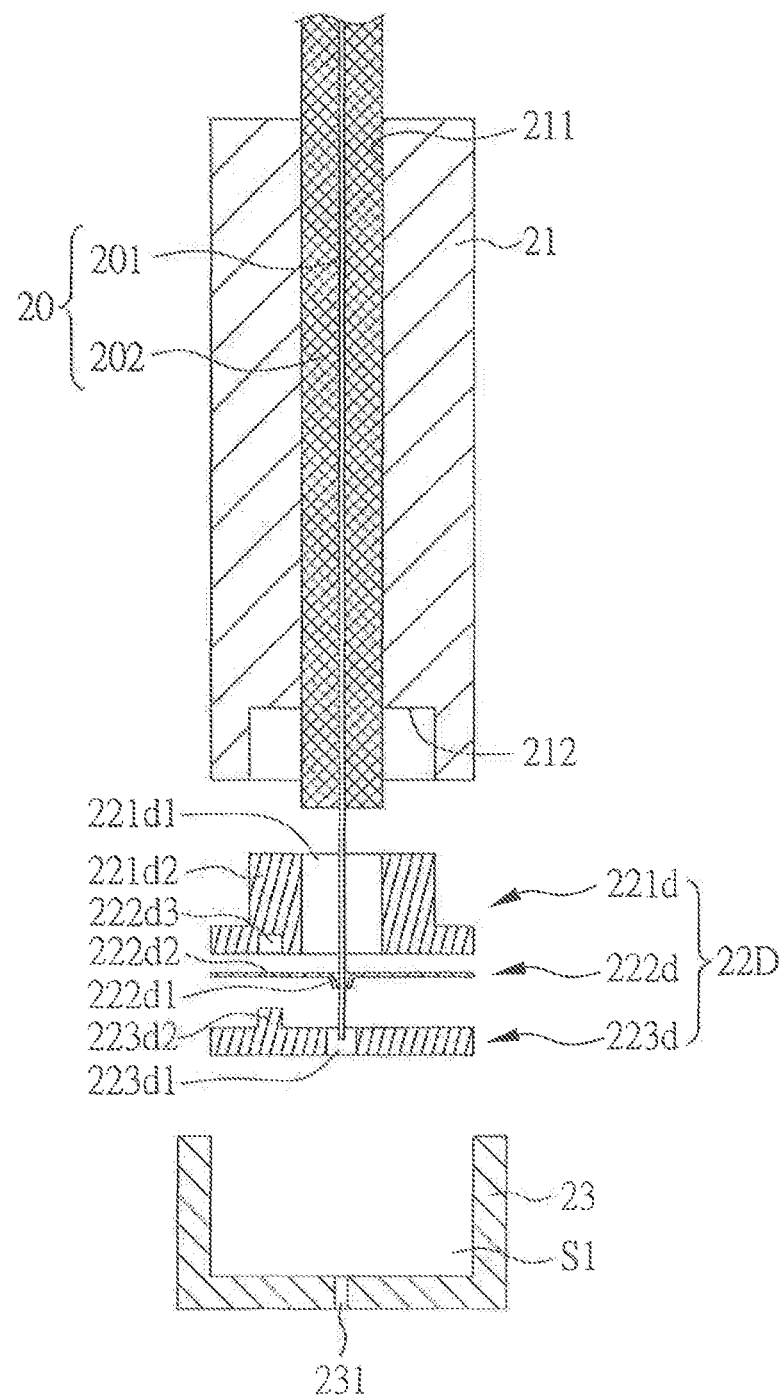
FIG. 6 is an exploded view illustrating manufacturing of an optical fiber connector according to a fifth embodiment of the present invention.

Further referring to FIG. 6, an exploded view illustrating manufacturing of an optical fiber connector according to a fifth embodiment of the present invention, the manufacturing of an optical fiber connector, in the fifth embodiment, comprises an optical fiber assembly 20, a body member 21, a positioning member 22D, and a lower mold plate 23.

In the fifth embodiment, the positioning member 22D includes a first spacing board 221d, a positioning sheet 222d, and a second spacing board 223d. The first spacing board 221d is provided with a second positioning hole 221d1, a protrusion 221d2, and three structural reinforcing slots 221d3. The three structural reinforcing slots 221d3, which are formed equidistantly, surround the second positioning hole 221d1 (since FIG. 6 is a cross-sectional view, only one structural reinforcing slot 221d3 is shown). The second positioning hole 221d1 corresponds to a first positioning hole 221, and the protrusion 221d2 corresponds to, and is arranged, in a concave portion 212. The positioning sheet 222d is provided with a third positioning hole 222d1 and three structural reinforcing apertures 222d2 corresponding to the three structural reinforcing slots 221d3, respectively. The second spacing board 223d includes a fourth positioning hole 223d1 and three structural reinforcing portions 223d2. Through the help of the three structural reinforcing slots 221d3, the three structural reinforcing apertures 222d2, and the three structural reinforcing portions 223d2, the structure of the first spacing board 221d, of the positioning sheet 222, and of the second spacing board 223d, can be positioned accurately, and after gluing and pressing, an optical fiber connector can be formed.

Figure 7:
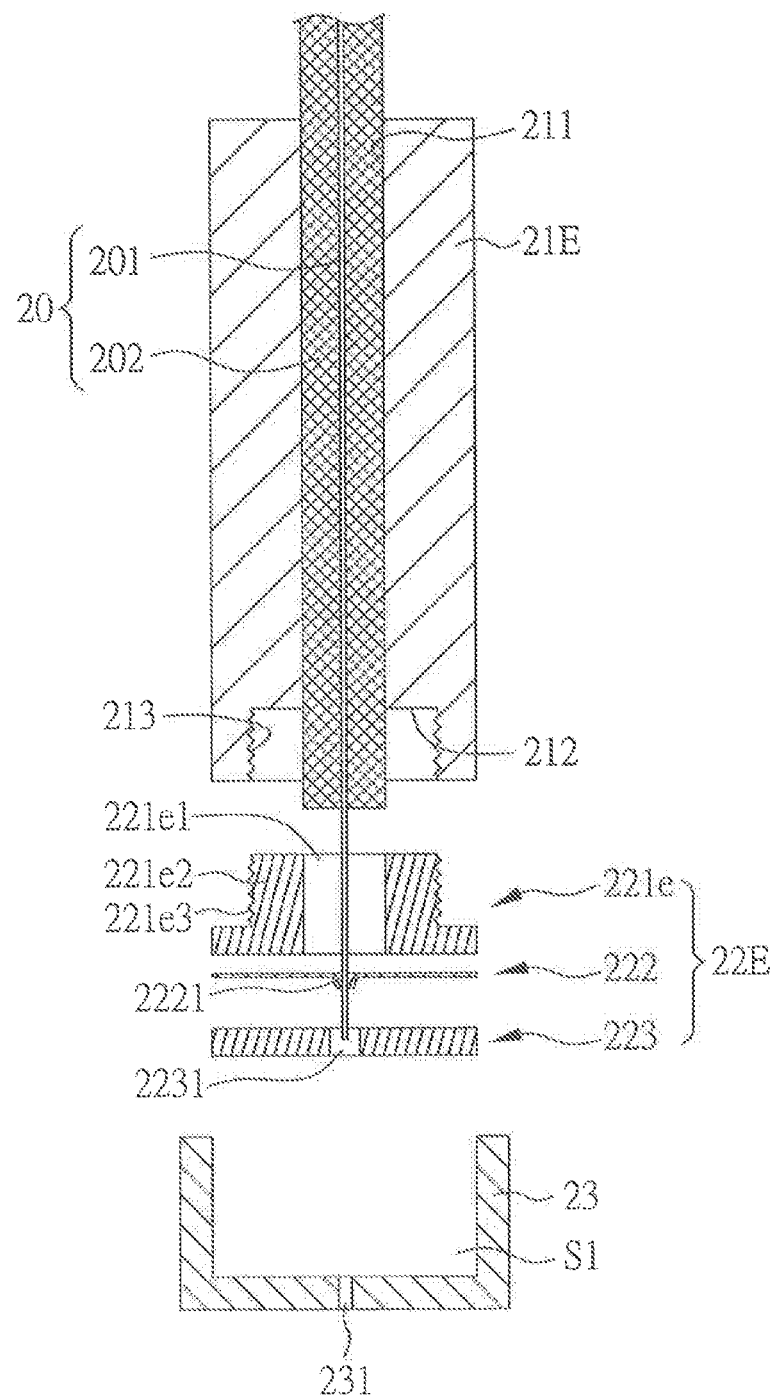
FIG. 7 is an exploded view illustrating manufacturing of an optical fiber connector according to a sixth embodiment of the present invention.

Still further referring to FIG. 7, an exploded view illustrating manufacturing of an optical fiber connector according to a sixth embodiment of the present invention, the manufacturing of an optical fiber connector, in the sixth embodiment, comprises an optical fiber assembly 20, a body member 21E, a positioning member 22E, and a lower mold plate 23.

In the sixth embodiment, the body member 21E is provided with a concave portion 212 which is formed inside a thread portion 213. The positioning member 22E includes a first spacing board 221e, a positioning sheet 222, and a second spacing board 223. The first spacing board 221e includes a second positioning hole 221e1, a protrusion 221e2, and a second thread portion 221e3 corresponding to the first thread portion 213. Through the help of the first thread portion 213 and the second thread portion 221e3, the first spacing board 221e can be fastened to the body member 21E, and after gluing and pressing, an optical fiber connector can be formed.

Figure 8A:
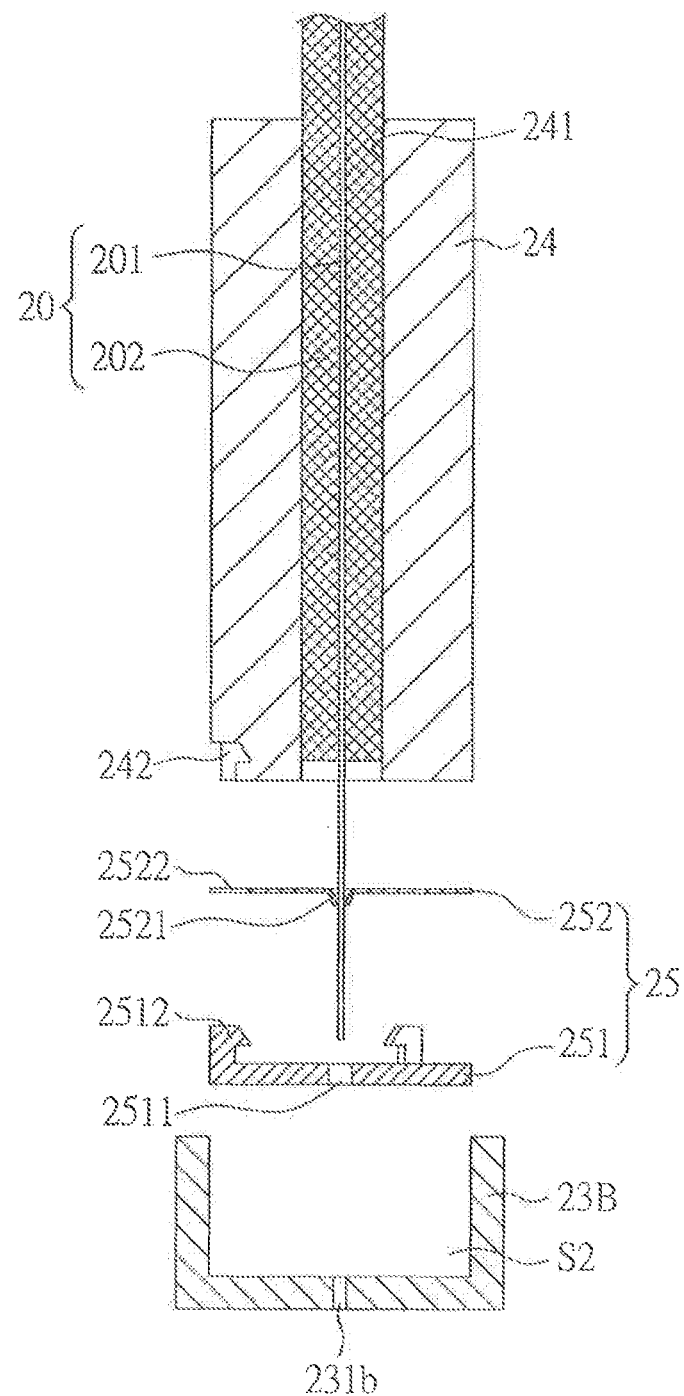
FIG. 8A is an exploded view illustrating manufacturing of an optical fiber connector according to a seventh embodiment of the present invention.
Figure 8B:
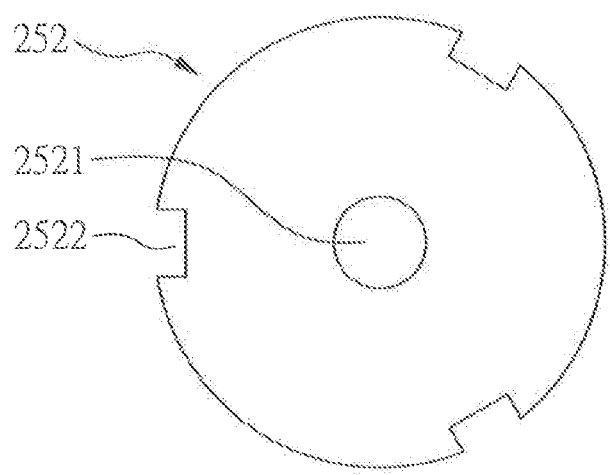
FIG. 8B is a schematic view illustrating a first spacing board and a positioning sheet of the optical fiber connector according to the seventh embodiment of the present invention.
Figure 8B:
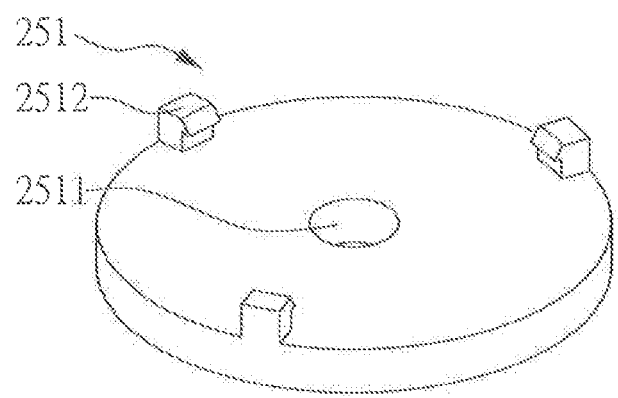

Now references are made to FIG. 8A, an exploded view illustrating manufacturing of an optical fiber connector according to a seventh embodiment of the present invention; and FIG. 8B, a schematic view illustrating a first spacing board and a positioning sheet of the optical fiber connector. The manufacturing of the optical fiber connector, in the seventh embodiment, comprises an optical fiber assembly 20, a body member 24, a positioning member 25, and a lower mold plate 23B.

In the seventh embodiment, the body member 24 includes a first positioning hole 241 and three engaging slots 242. The positioning member 25 includes a first spacing board 251 and a positioning sheet 252. The first spacing board 251 includes a second positioning hole 2511 and three engaging portions 2512. The second positioning hole 2511 corresponds to the first positioning hole 241, and that the three engaging portions 2512 correspond to the three engaging slots 242, respectively. The positioning sheet 252 is provided with a third positioning hole 2512, which corresponds to the second positioning hole 2511, and three first engaging grooves 2522 which correspond to the three engaging portions 2512, respectively. The lower mold plate 23B is provided with a through hole 231b corresponding to the second positioning hole 2511, and with an accommodating space S2 for arranging therein the body member 24 and the positioning member 25. Components of the body member 24 and of the positioning member 25 can be applied with adhesive, so that the body member 24, the positioning member 25, and the optical fiber assembly 20 can be integrated into one piece. Then an end of the bare fiber 201 of the optical fiber assembly 20 protrudes from the positioning member 25, and after gluing and pressing, an optical fiber connector can be formed.

Figure 9A:
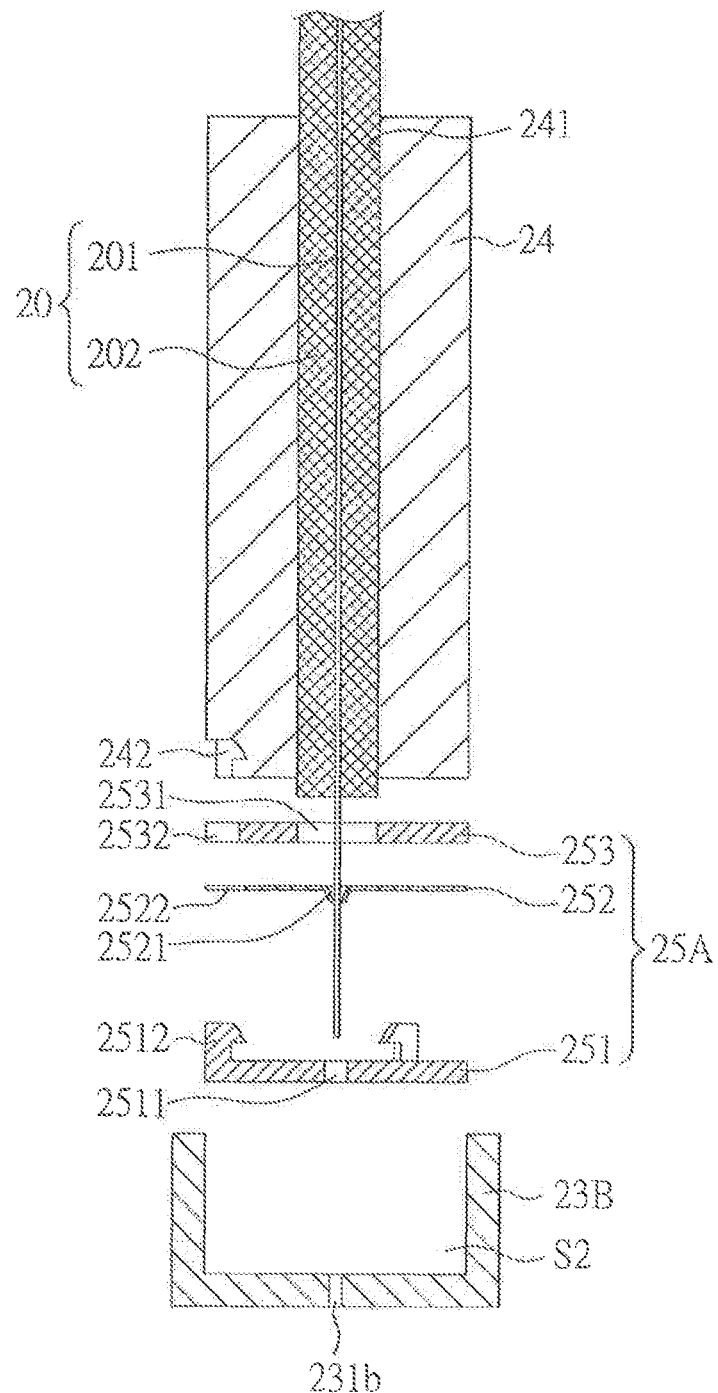
FIG. 9A is an exploded view illustrating manufacturing of an optical fiber connector according to an eighth embodiment of the present invention.
Figure 9B:
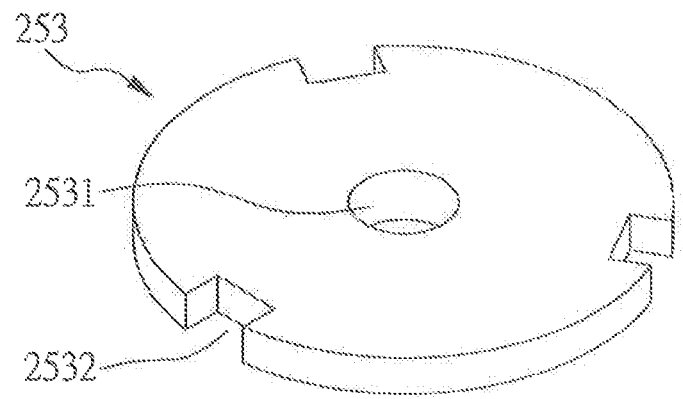
FIG. 9B is a schematic view illustrating a first spacing board and a positioning sheet of the optical fiber connector according to the eighth embodiment of the present invention.
Figure 9B:
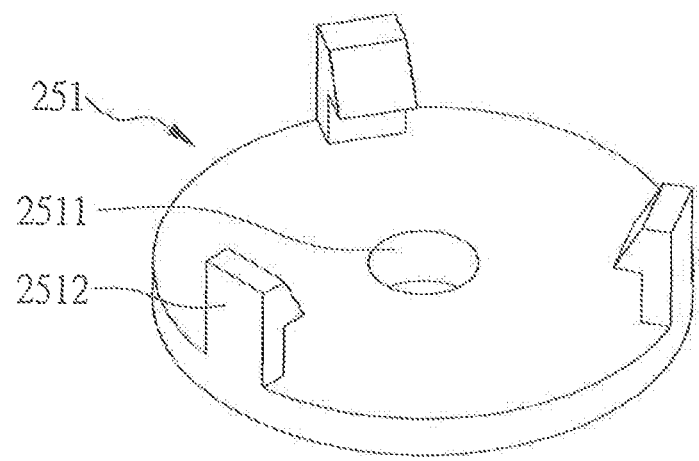

References are made to FIG. 9A, an exploded view illustrating manufacturing of an optical fiber connector according to an eighth embodiment of the present invention; and FIG. 9B, a schematic view illustrating a first spacing board and a positioning sheet of the optical fiber connector. The manufacturing of the optical fiber connector, in the eighth embodiment, comprises an optical fiber assembly 20, a body member 24, a positioning member 25A, and a lower mold plate 23B.

In the eighth embodiment, the positioning member 25A includes a first spacing board 251, a positioning sheet 252, and a second spacing board 253. The second spacing board 253 includes a third positioning hole 2531 and three second engaging grooves 2532. The third positioning hole 2531 corresponds to the first positioning hole 241, and that the three second engaging grooves 2532 correspond to three first engaging grooves 2522, respectively, and after gluing and pressing, an optical fiber connector can be formed.

Figure 9C:
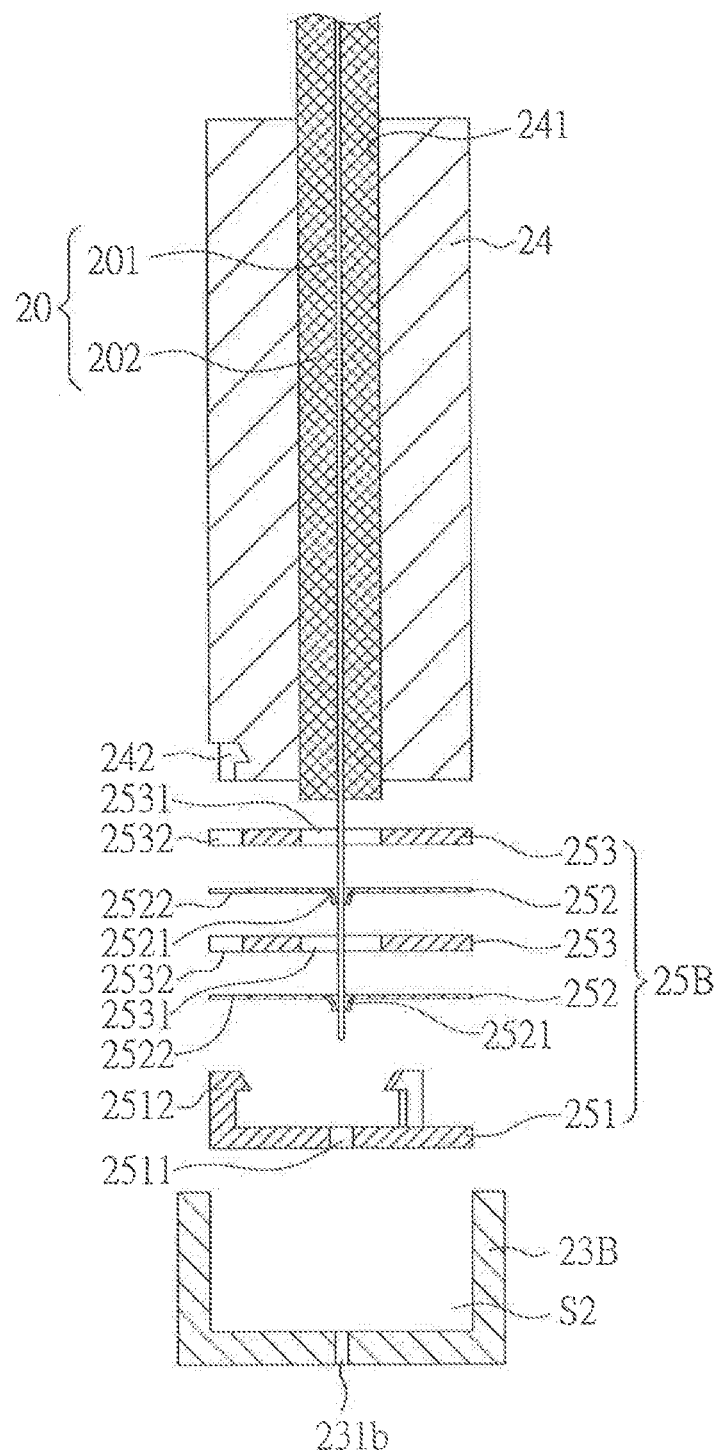
FIG. 9C is an exploded view illustrating manufacturing of an optical fiber connector according to a ninth embodiment of the present invention.

Further referring to FIG. 9C, an exploded view illustrating manufacturing of an optical fiber connector according to a ninth embodiment of the present invention, the manufacturing of the optical fiber connector, in the ninth embodiment, comprises an optical fiber assembly 20, a body member 24, a positioning member 25B, and a lower mold plate 23B. The positioning member 25B includes a first spacing board 251, two positioning sheets 252, and two second spacing boards 253. By way of the arrangement of the two positioning sheets 252, an enhancing positioning effect for the bare fiber 201 can be obtained.

Figure 10:
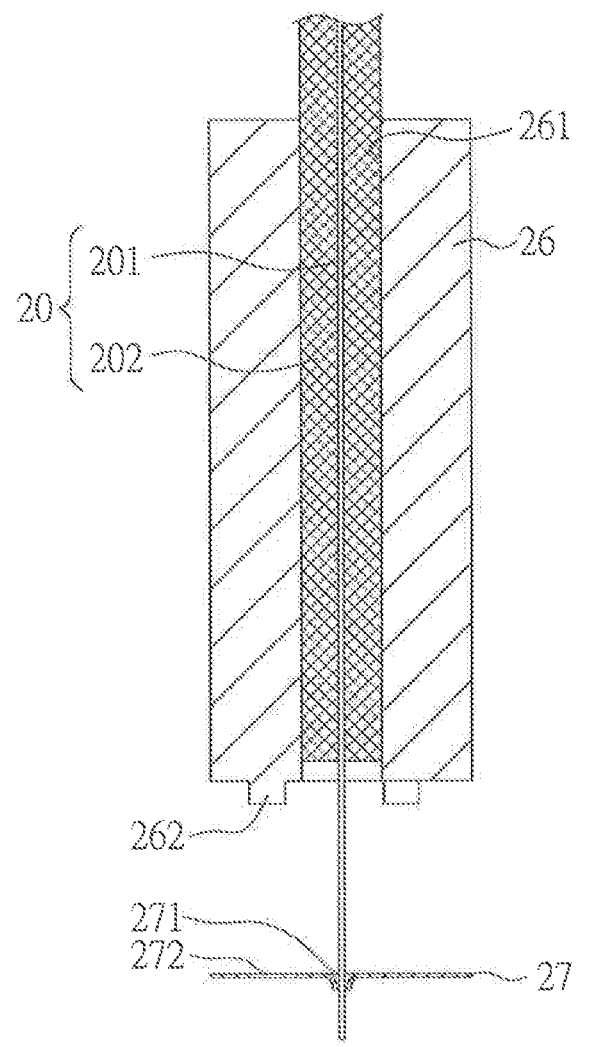
FIG. 10 is an exploded view illustrating manufacturing of an optical fiber connector according to a tenth embodiment of the present invention.
Figure 10:
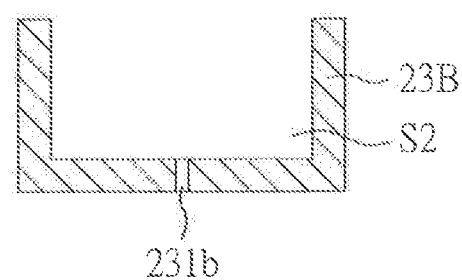

Referring to FIG. 10, an exploded view illustrating manufacturing of an optical fiber connector according to a tenth embodiment of the present invention, the manufacturing of the optical fiber connector, in the tenth embodiment, comprises an optical fiber assembly 20, a body member 26, a positioning sheet 27, and a lower mold plate 23B.

In the tenth embodiment, the body member 26 is provided with a first positioning hole 261 and three structural reinforcing portions 262. The three structural reinforcing portions 262, which are formed equidistantly, surround the first positioning hole 261 (since FIG. 10 is a cross-sectional view, only two structural reinforcing portions 262 are shown). The positioning sheet 27 is provided with a third positioning hole 271 and three structural reinforcing holes 272, where the three structural reinforcing holes 272 correspond to the three structural reinforcing portions 262, respectively. The third positioning hole 271 corresponds to the first positioning hole 261. The body member 26 and the positioning sheet 27 are applied with adhesive therebetween, so that the body member 26 and the positioning member 27 can be integrated with the optical fiber assembly 20 and into one piece. Then an end of the bare fiber 201 of the optical fiber assembly 20 protrudes from the positioning sheet 27, and after gluing and pressing, an optical fiber connector can be formed.

Figure 11A:
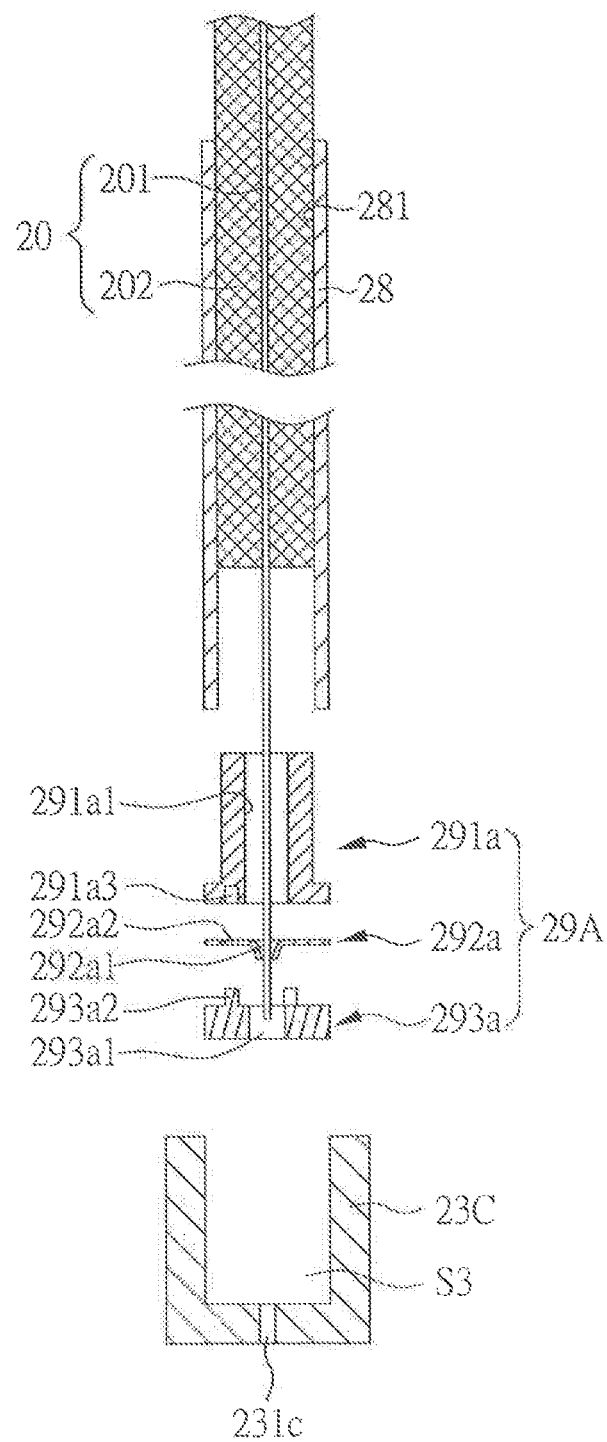
FIG. 11A is an exploded view illustrating manufacturing of an optical fiber connector according to an eleventh embodiment of the present invention.
Figure 11B:
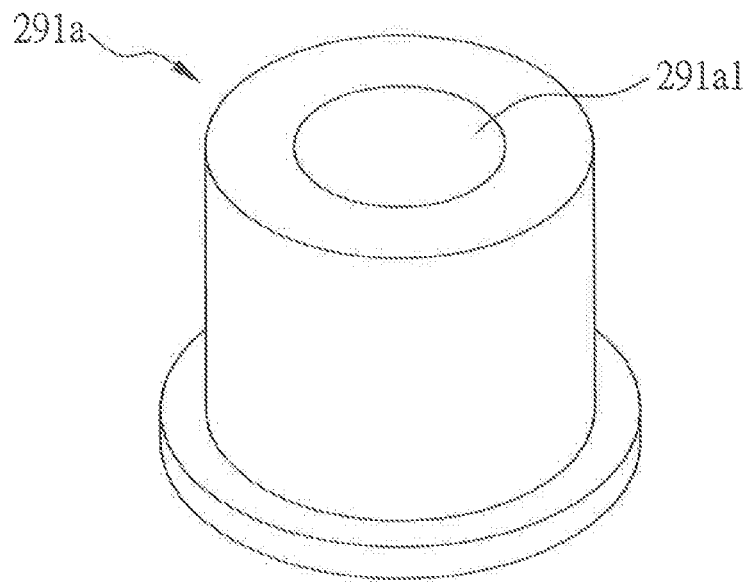
FIG. 11B is a schematic view illustrating a first spacing portion and a second spacing portion of the optical fiber connector according to the eleventh embodiment of the present invention.
Figure 11B:
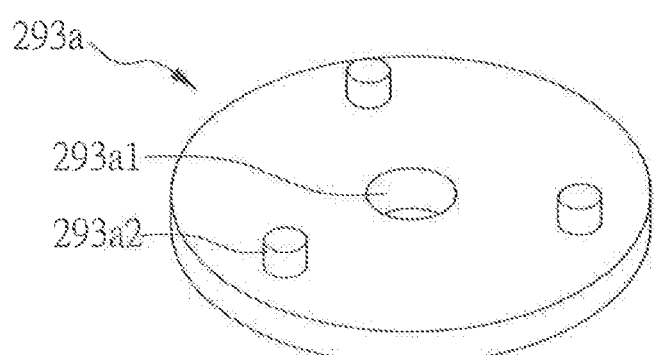

Now references are made to FIG. 11A, an exploded view illustrating manufacturing of an optical fiber connector according to an eleventh embodiment of the present invention; and FIG. 11B, a schematic view illustrating a first spacing portion and a second spacing portion of the optical fiber connector. The manufacturing of the optical fiber connector, in the eleventh embodiment, comprises an optical fiber assembly 20, a tube member 28, a positioning member 29A, and a lower mold plate 23C.

In the eleventh embodiment, the tube member 28 is provided with a first positioning hole 281. The positioning member 29A includes a first spacing portion 291a, a second spacing portion 293a, and a positioning sheet 292a. The first spacing portion 221a is provided with a second positioning hole 291a and three structural reinforcing slots 291a3. The first spacing portion 291a corresponds to, and is arranged in, the first positioning hole 281. The positioning sheet 292a is provided with a third positioning hole 292a1 and three structural reinforcing apertures 292a2. The third positioning hole 292a1 corresponds to the second positioning hole 291a. The three structural reinforcing apertures 292a2 correspond to the three structural reinforcing slots 291a3, respectively. The second spacing portion 293a is provided with a fourth positioning hole 293a1 and three structural reinforcing portions 293a2, where the fourth positioning hole 293a1 corresponds to the third positioning hole 292a1, and the three structural reinforcing portions 293a2 to the three structural reinforcing slots 291a3. The lower mold plate 23C is provided with a through hole 231c corresponding to the fourth positioning hole 293a1, and with an accommodating space S3 for arranging therein the tube member 28 and the positioning member 29A. Adhesive will be applied to and in between components of the tube member 28 and of the positioning member 29A, such that the tube member 28 and the positioning member 29A can be integrated with the optical fiber assembly 20 and into one piece. Then an end of the bare fiber 201 of the optical fiber assembly 20 protrudes from the positioning member 29A, and after gluing and pressing, an optical fiber connector can be formed.

Figure 11C:
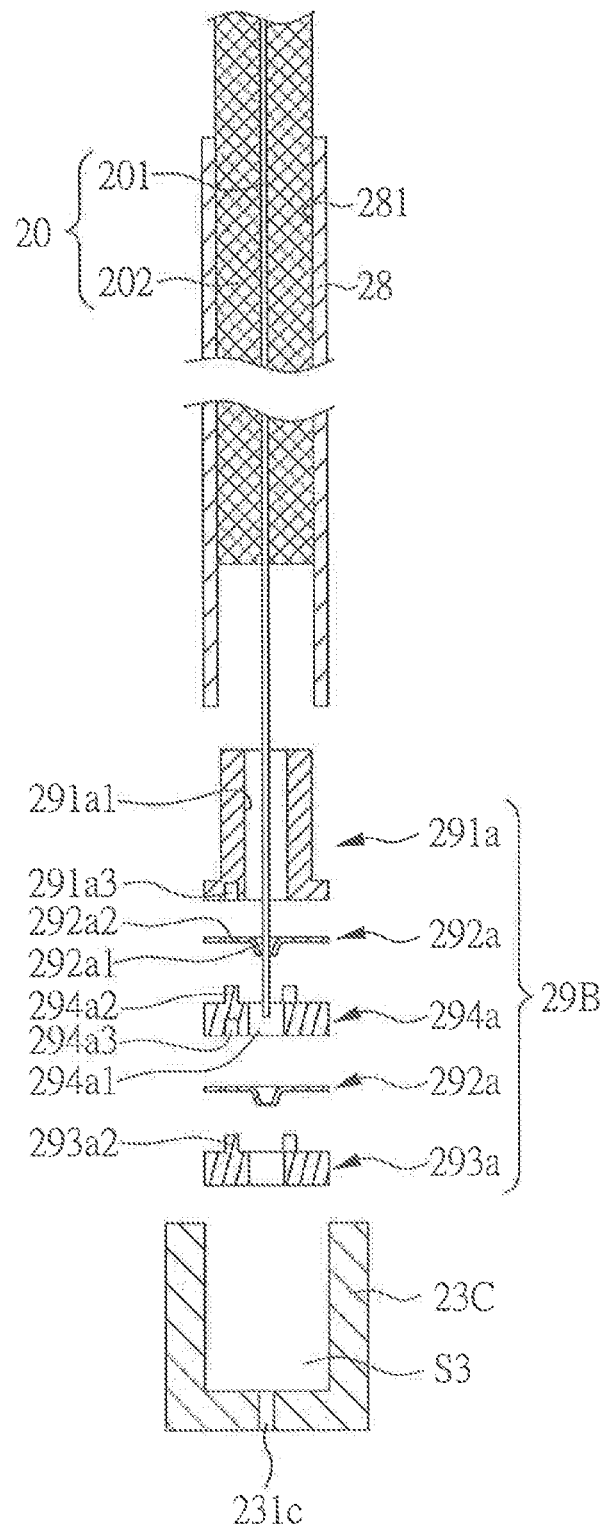
FIG. 11C is an exploded view illustrating manufacturing of an optical fiber connector according to a twelfth embodiment of the present invention.

Further referring to FIG. 11C, an exploded view illustrating manufacturing of an optical fiber connector according to a twelfth embodiment of the present invention, the manufacturing of the optical fiber connector, in the twelfth embodiment, comprises an optical fiber assembly 20, a tube member 28, a positioning member 29B, and a lower mold plate 23C.

According to the present invention, the manufacturing of the optical fiber connector of the twelfth embodiment differs from that of the eleventh embodiment in that in the twelfth embodiment, the positioning sheet 29B includes a first spacing portion 291a, a second spacing portion 293a, two positioning sheets 292a, and a third spacing portion 294a. The third spacing portion 294a is interposed between the two positioning sheets 292a. The third spacing portion 294a is provided with a fifth positioning hole 294a1, three structural reinforcing protrusions 294a2, and three structural reinforcing recesses 294a3. The three structural reinforcing protrusions 294a2 correspond to three structural reinforcing slots 291a3, respectively, and that the three structural reinforcing recesses 294a3 to three structural reinforcing portions 293a2. The two positioning sheets 292a2 enhance a positioning effect for the bare fiber 201.

Figure 11D:
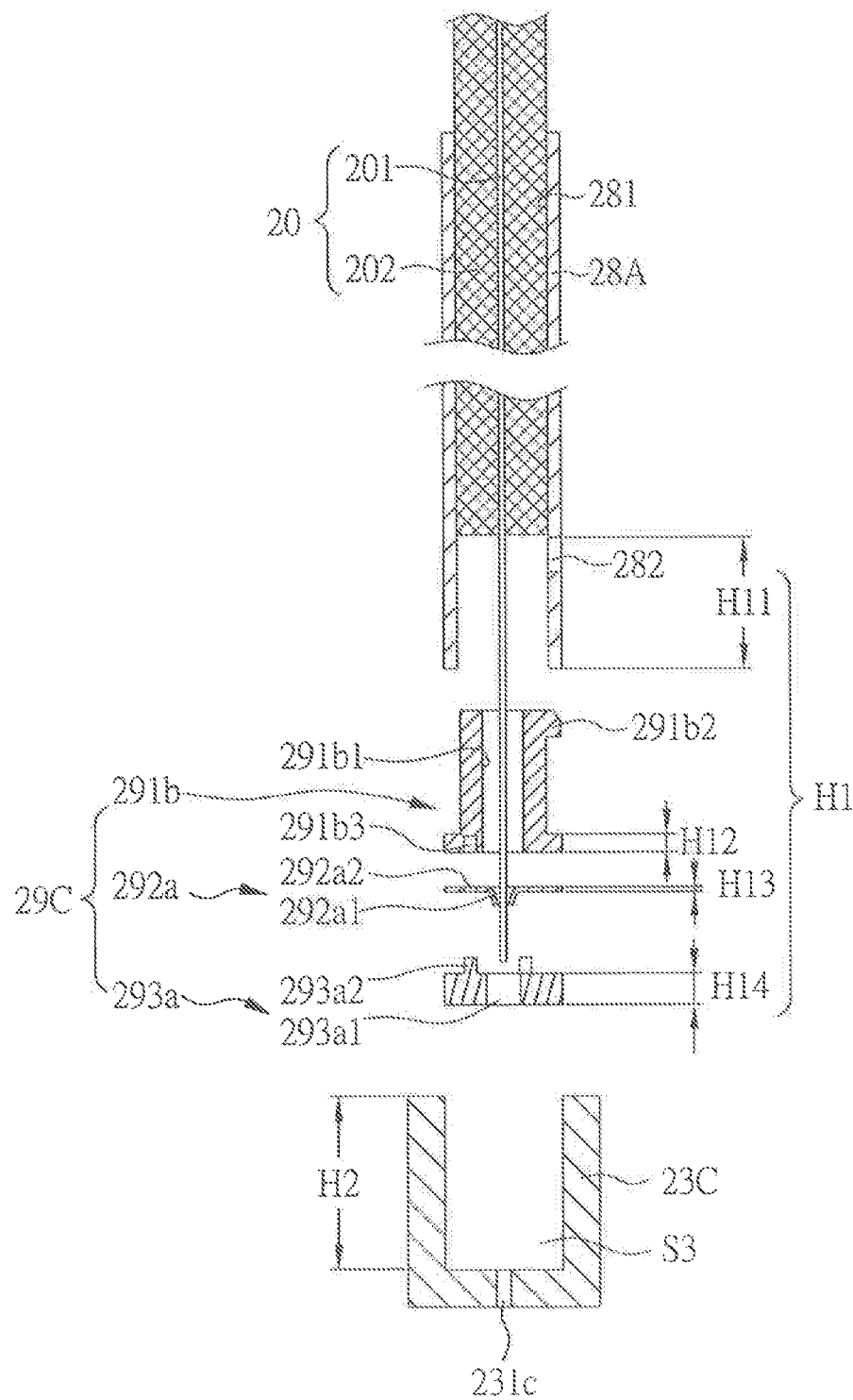
FIG. 11D is an exploded view illustrating manufacturing of an optical fiber connector according to a thirteenth embodiment of the present invention.
Figure 11E:
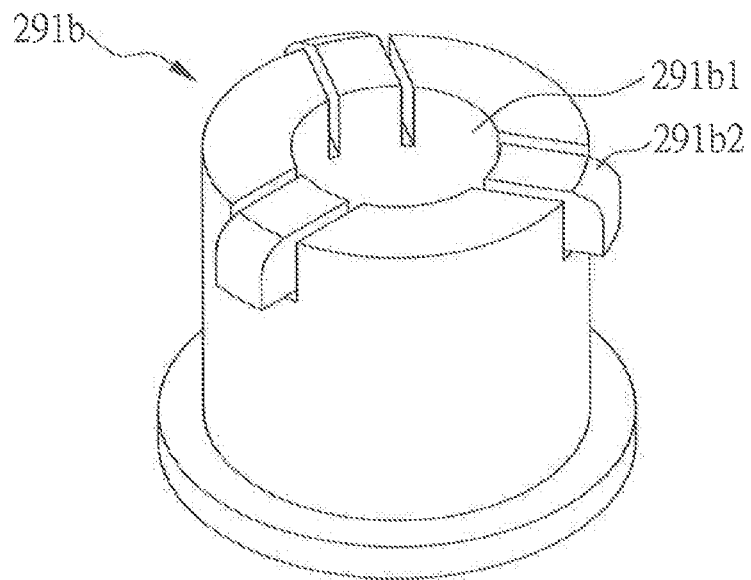
FIG. 11E is a schematic view illustrating a first spacing portion and a second spacing portion of the optical fiber connector according to the thirteenth embodiment of the present invention.
Figure 11E:
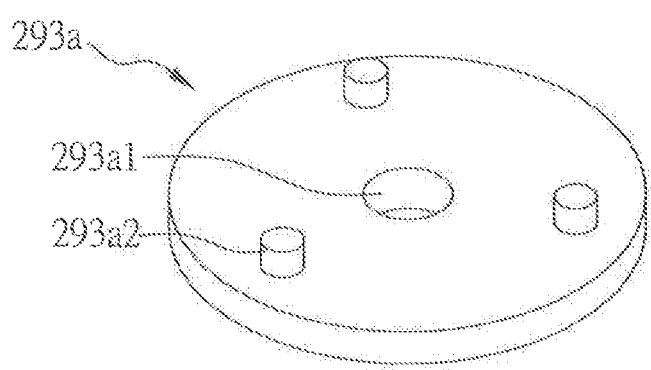

Now references are made to FIG. 11D, an exploded view illustrating manufacturing of an optical fiber connector according to a thirteenth embodiment of the present invention; and FIG. 11E, a schematic view illustrating a first spacing portion and a second spacing portion of the optical fiber connector. The manufacturing of the optical fiber connector, in the thirteenth embodiment, comprises an optical fiber assembly 20, a tube member 28A, a positioning member 29C, and a lower mold plate 23C.

In the thirteenth embodiment, the tube member 28A is provided with a first positioning hole 281 and three fastening holes 282. The positioning member 29C includes a first spacing portion 291b, a second spacing portion 293a, and a positioning sheet 292a. The first spacing portion 291b is provided with a second positioning hole 291b1, three fastening portions 291b2, and three structural reinforcing slots 291b3. The first spacing portion 291b corresponds to, and is arranged in, the first positioning hole 281. The three fastening portions 291b2 correspond to the three fastening holes 282, respectively. The positioning sheet 292a is provided with a third positioning hole 292a1 and three structural reinforcing apertures 292a2. The third positioning hole 292a1 corresponds to the second positioning hole 291b1. The three structural reinforcing apertures 292a2 correspond to the three structural reinforcing slots 291b3, respectively. The second spacing portion 293a is provided with a fourth positioning hole 293a1 and three structural reinforcing portions 293a2, where the fourth positioning hole 293a1 corresponds to the third positioning hole 292a1, and the three structural reinforcing portions 293a2 to the three structural reinforcing slots 291b3. The lower mold plate 23C is provided with a through hole 231c corresponding to the fourth positioning hole 293a1, and with an accommodating space S3 for arranging therein the tube member 28A and the positioning member 29C. Adhesive will be applied to and in between the components of the tube member 28A and of the positioning member 29C, such that the tube member 28A and the positioning member 29C can be integrated with the optical fiber assembly 20 and into one piece. Then an end of the bare fiber 201 of the optical fiber assembly 20 protrudes from the positioning member 29C, and after gluing and pressing, an optical fiber connector can be formed. Moreover, the fastening hole 282 has a height H11, which plus height H12, height H13, and height H14 equals to a total height H1, such that height H1 is smaller than a height H2 which is the height of the accommodating space S3 of the lower mold plate 23C, making the lower mold plate 23C able to envelop the fastening holes 282.

Figure 11F:
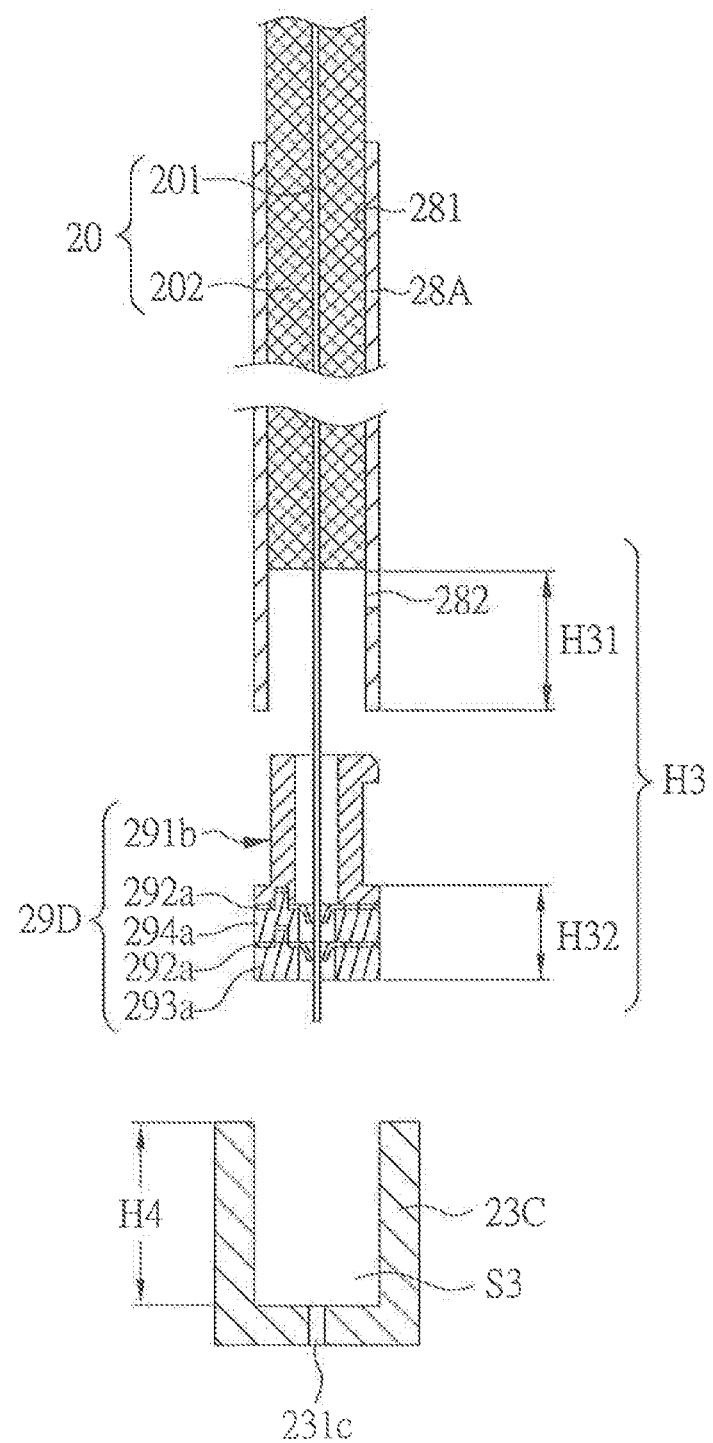
FIG. 11F is an exploded view illustrating manufacturing of an optical fiber connector according to a fourteenth embodiment of the present invention.

Referring to FIG. 11F, an exploded view illustrating manufacturing of an optical fiber connector according to a fourteenth embodiment of the present invention, the manufacturing of the optical fiber connector, in the fourteenth embodiment, comprises an optical fiber assembly 20, a tube member 28A, a positioning member 29D, and a lower mold plate 23C.

According to the present invention, the manufacturing of the optical fiber connector of the fourteenth embodiment differs from the manufacturing of the optical fiber connector of the thirteenth embodiment in that in the fourteenth, the positioning member 29D includes a first spacing portion 291b, a second spacing portion 293a, two positioning sheets 292a, and a third spacing portion 294a. The third spacing portion 294a is interposed between the two positioning sheets 292a. The two positioning sheets 292a2 enhance a positioning effect for the bare fiber 201. Further, the fastening hole 282 has a height H31, which plus height H32 equals to a total height H3, such that height H3 is smaller than a height H4 which is the height of the accommodating space S3 of the lower mold plate 23C, making the lower mold plate 23C able to envelop the fastening holes 282.

Figure 12A:
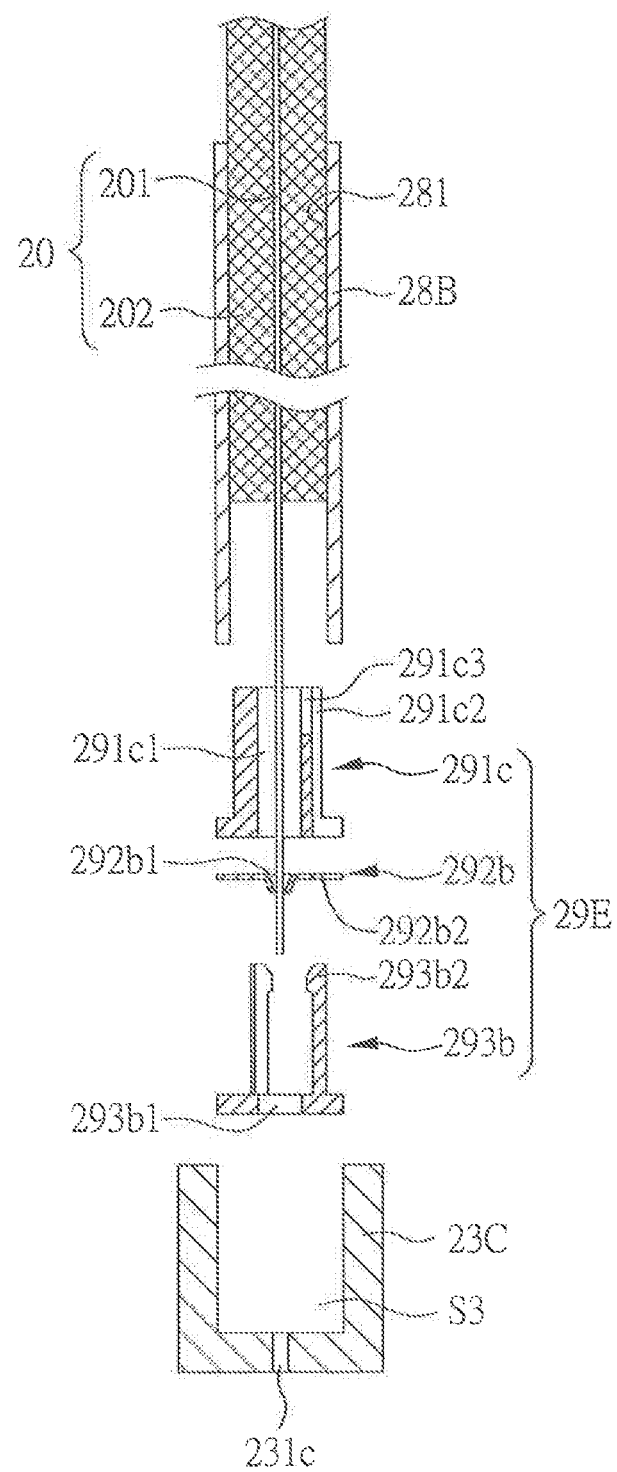
FIG. 12A is an exploded view illustrating manufacturing of an optical fiber connector according to a fifteenth embodiment of the present invention.
Figure 12B:
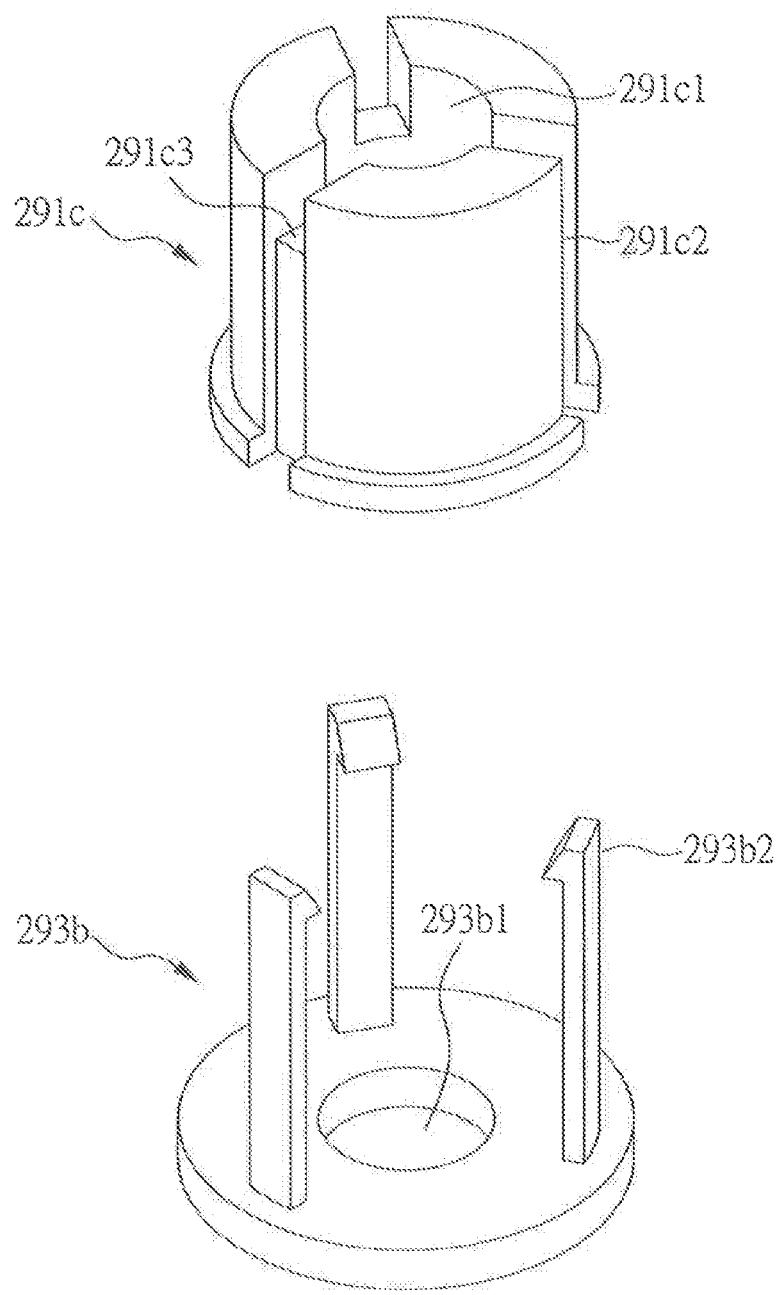
FIG. 12B is a schematic view illustrating a first spacing portion and a second spacing portion of the optical fiber connector according to the fifteenth embodiment of the present invention.

Further, references are made to FIG. 12A, an exploded view illustrating manufacturing of an optical fiber connector according to a fifteenth embodiment of the present invention; and FIG. 12B, a schematic view illustrating a first spacing portion and a second spacing portion of the optical fiber connector. The manufacturing of the optical fiber connector, in the fifteenth embodiment, comprises an optical fiber assembly 20, a tube member 28B, a positioning member 29E, and a lower mold plate 23C.

In the fifteenth embodiment, the tube member 28B is provided with a first positioning hole 281. The positioning member 29E includes a first spacing portion 291c, a second spacing portion 293b, and a positioning sheet 292b. The first spacing portion 291c is provided with a second positioning hole 291c1, three structural reinforcing slots 291c2, and three fastening openings 291c3. The first spacing portion 291c corresponds to, and is arranged in, the first positioning hole 281. The positioning sheet 292b is provided with a third positioning hole 292b1 and three structural reinforcing apertures 292b2. The third positioning hole 292b1 corresponds to the second positioning hole 291c1. The three structural reinforcing apertures 292b2 each corresponds to at least one structural reinforcing slot 291c2. The second spacing portion 293b is provided with a fourth positioning hole 293b1 and three fastening portions 293b2. The fourth positioning hole 293b1 corresponds to the third positioning hole 292b1, and the three fastening portions 293b2 to the three fastening openings 291c3, respectively. Adhesive will be applied to and in between the components of the tube member 28B and of the positioning member 29E, such that the tube member 28B and the positioning member 29E can be integrated with the optical fiber assembly 20 and into one piece. Then an end of the bare fiber 201 of the optical fiber assembly 20 protrudes from the positioning member 29E, and after gluing and pressing, an optical fiber connector can be formed.

Figure 12C:
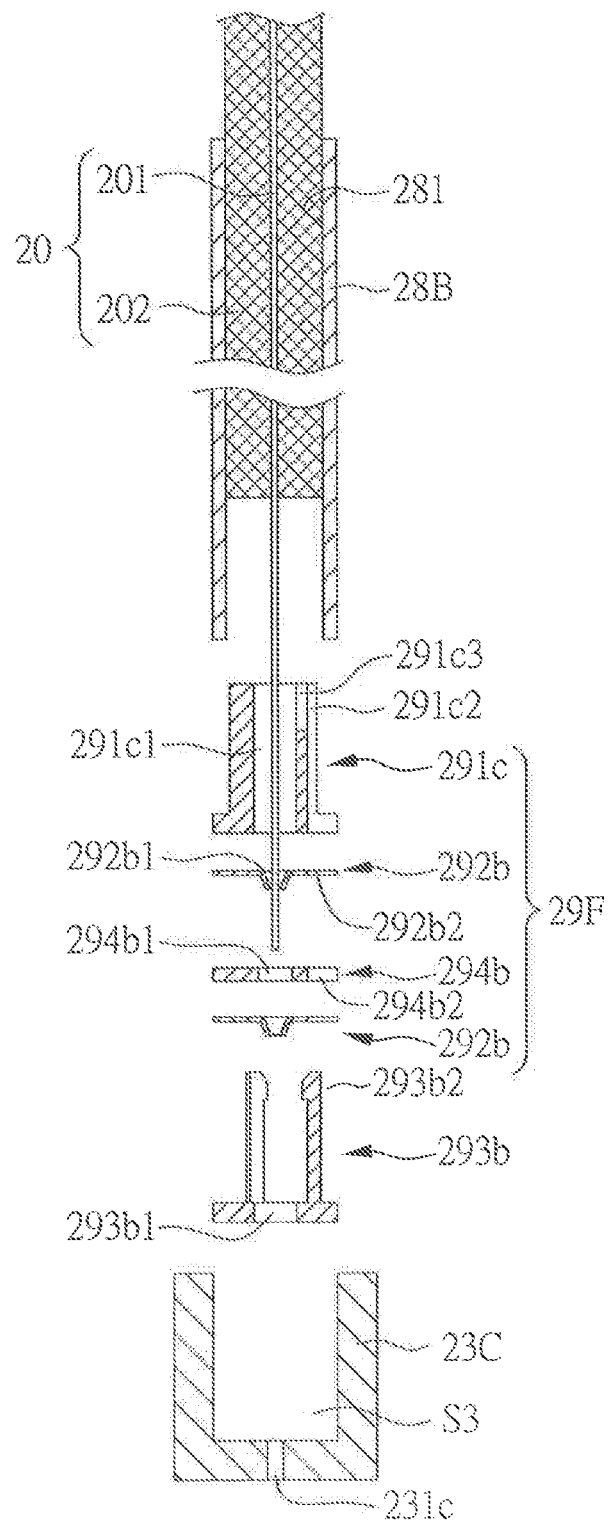
FIG. 12C is an exploded view illustrating manufacturing of an optical fiber connector according to a sixteenth embodiment of the present invention.

Now referring to FIG. 12C, an exploded view illustrating manufacturing of an optical fiber connector according to a sixteenth embodiment of the present invention, the manufacturing of the optical fiber connector, in the sixteenth embodiment, comprises an optical fiber assembly 20, a tube member 28B, a positioning member 29F, and a lower mold plate 23C.

According to the present invention, the manufacturing of the optical fiber connector of the sixteenth embodiment differs from the manufacturing of the optical fiber connector of the fifteenth embodiment in that in the sixteenth, the positioning member 29F includes a first spacing portion 291c, a second spacing portion 293b, two positioning sheets 292b, and a third spacing portion 294b. The third spacing portion 294b is interposed between the two positioning sheets 292b. The third spacing portion 294b is provided with a fifth positioning hole 294b1 and three concave portions 294b2, where the fifth positioning hole 294b1 corresponds to a second positioning hole 291c1, and the three concave portions 294b2 to three structural reinforcing slots 291c2. The two positioning sheets 292b2 enhance a positioning effect for the bare fiber 201.

Figure 12D:
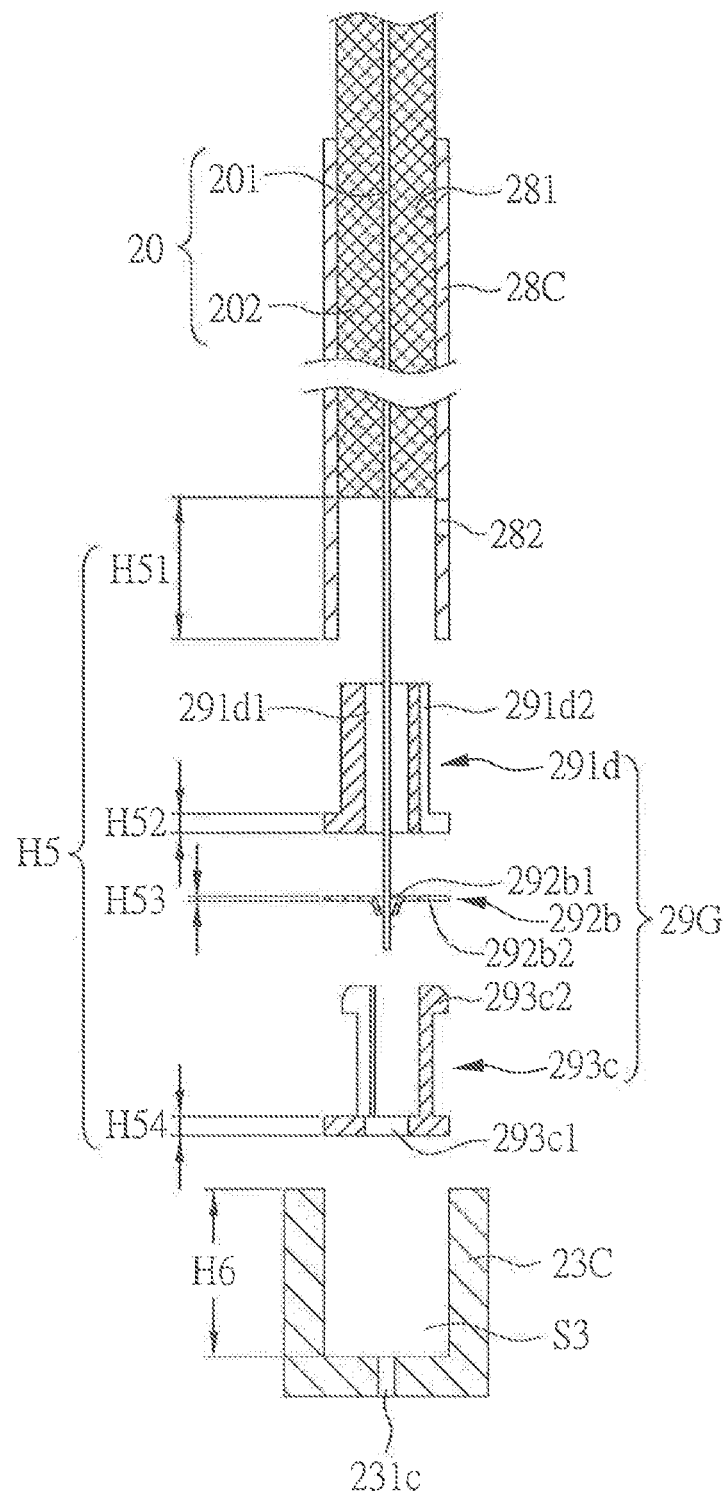
FIG. 12D is an exploded view illustrating manufacturing of an optical fiber connector according to a seventeenth embodiment of the present invention.
Figure 12E:
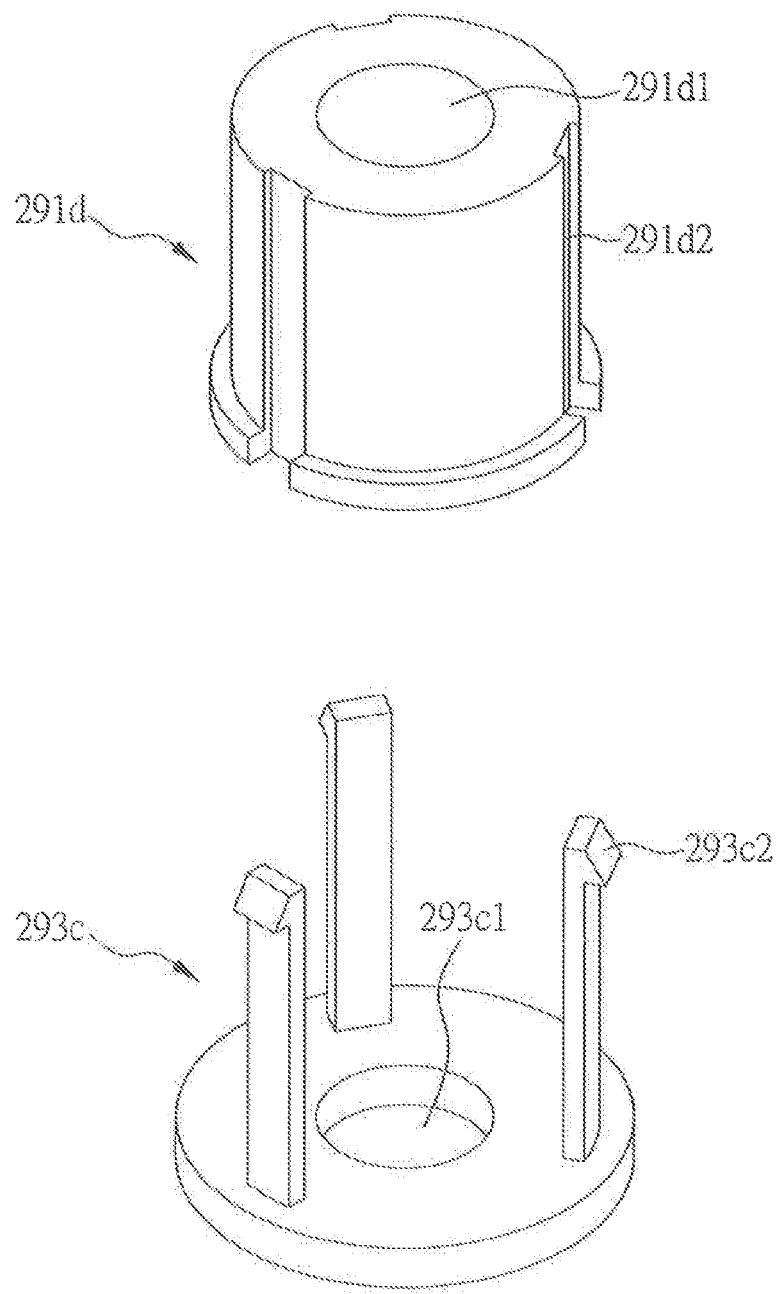
FIG. 12E is a schematic view illustrating a first spacing portion and a second spacing portion of the optical fiber connector according to the seventeenth embodiment of the present invention.

Further, references are made to FIG. 12D, an exploded view illustrating manufacturing of an optical fiber connector according to a seventeenth embodiment of the present invention; and FIG. 12E, a schematic view illustrating a first spacing portion and a second spacing portion of the optical fiber connector. The manufacturing of the optical fiber connector, in the seventeenth embodiment, comprises an optical fiber assembly 20, a tube member 28C, a positioning member 29G and a lower mold plate 23C.

In the seventeenth embodiment, the tube member 28C is provided with a first positioning hole 281 and three fastening holes 282. The positioning member 29G includes a first spacing portion 291d, a second spacing portion 293c, and a positioning sheet 292b. The first spacing portion 291d is provided with a second positioning hole 291d1 and three structural reinforcing slots 291d2. The first spacing portion 291d corresponds to, and is arranged in, the first positioning hole 281. The positioning sheet 292b is provided with a third positioning hole 292b1 and three structural reinforcing apertures 292b2. The third positioning hole 292b1 corresponds to the second positioning hole 291d1. The three structural reinforcing apertures 292b2 each corresponds to at least one structural reinforcing slot 291d2. The second spacing portion 293c is provided with a fourth positioning hole 293c1 and three fastening portions 293c2. The fourth positioning hole 293c1 corresponds to the third positioning hole 292b1, and the three fastening portions 293c2 to the three fastening holes 282, respectively. Adhesive will be applied to and in between the components of the tube member 28C and of the positioning member 29 such that the tube member 28C and the positioning member 29G can be integrated with the optical fiber assembly 20 and into one piece. Then an end of the bare fiber 201 of the optical fiber assembly 20 protrudes from the positioning member 29G, and after gluing and pressing, an optical fiber connector can be formed. Moreover, the fastening hole 282 has a height H51, which plus height H52, height H53, and height H54 equals to a total height H5, such that height H5 is smaller than a height H6 which is the height of the accommodating space S3 of the lower mold plate 23C, making the lower mold plate 23C able to envelop the fastening holes 282.

Figure 12F:
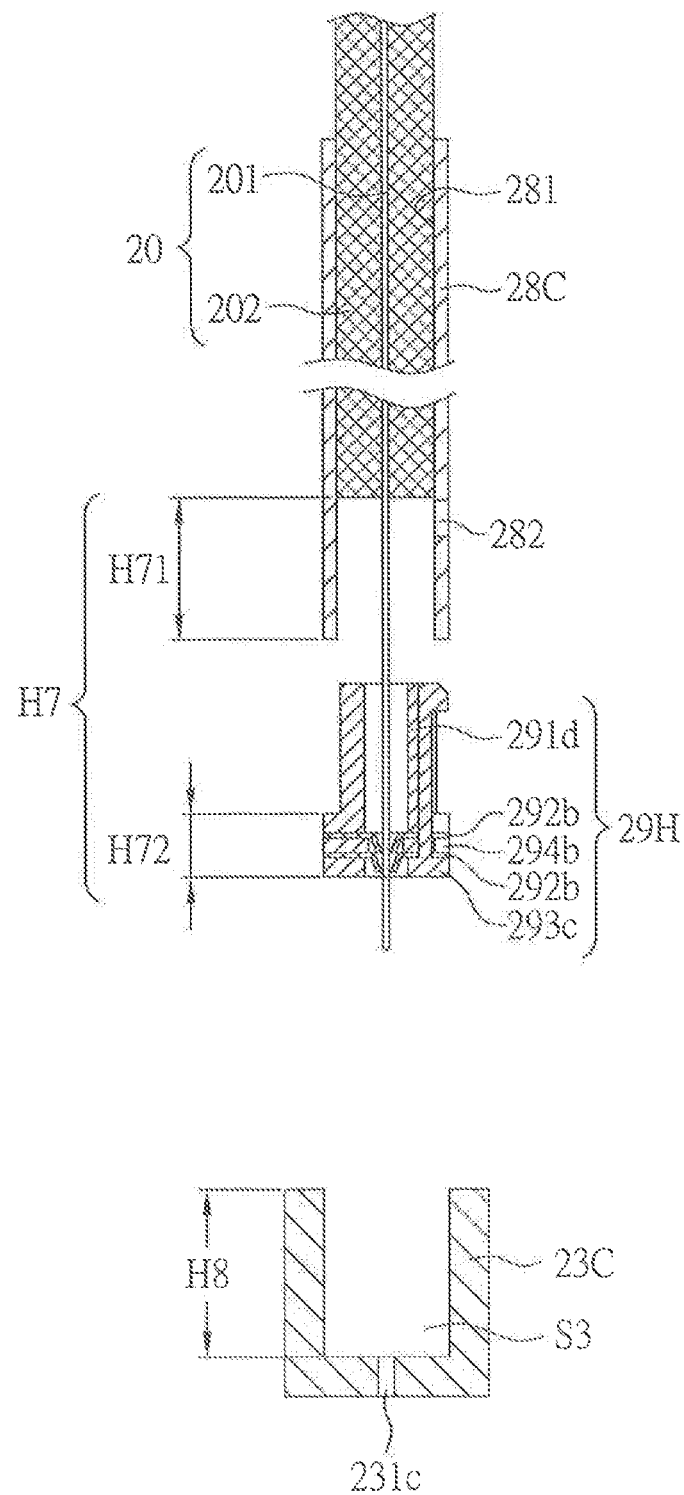
FIG. 12F is an exploded view illustrating manufacturing of an optical fiber connector according to an eighteenth embodiment of the present invention.

Referring to FIG. 12F, an exploded view illustrating manufacturing of an optical fiber connector according to an eighteenth embodiment of the present invention, the manufacturing of the optical fiber connector, in the eighteenth embodiment, comprises an optical fiber assembly 20, a tube member 28C, a positioning member 29H, and a lower mold plate 23C.

According to the present invention, the manufacturing of the optical fiber connector of the eighteenth embodiment differs from the manufacturing of the optical fiber connector of the seventeenth embodiment in that in the eighteenth, the positioning member 29H includes a first spacing portion 291d, a second spacing portion 293c, two positioning sheets 292b, and a third spacing portion 294b. The third spacing portion 294b is interposed between the two positioning sheets 292b. The two positioning sheets 292b2 enhance a positioning effect for the bare fiber 201. Further, the fastening hole 282 has a height H71, which plus height H72 equals to a total height H7, such that height H7 is smaller than a height H8 which is the height of the accommodating space S3 of the lower mold plate 23C, making the lower mold plate 23C able to envelop the fastening holes 282.

Figure 13A:
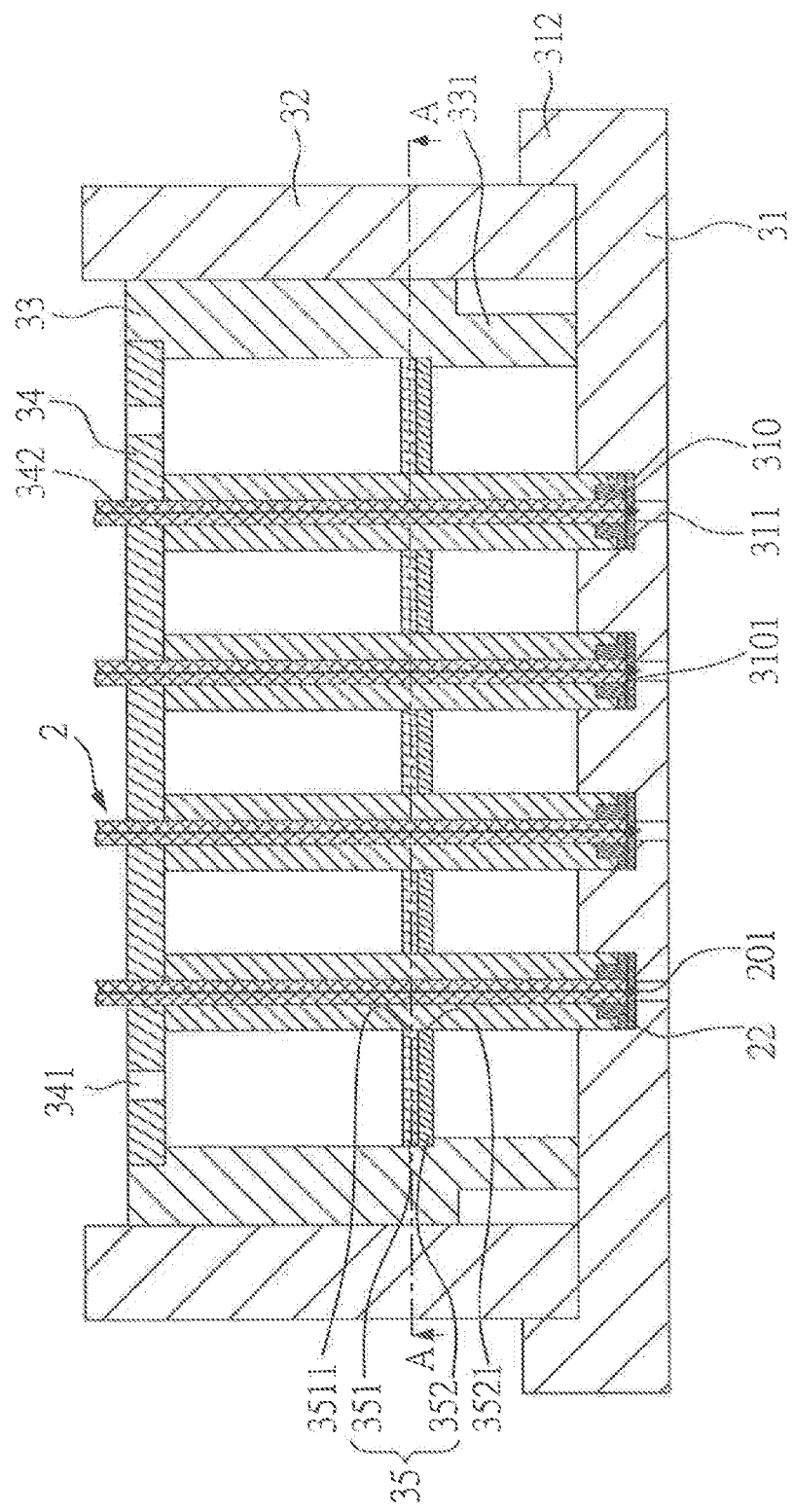
FIG. 13A is a cross-sectional view illustrating a first embodiment in manufacturing an assembled structure of optical fiber connectors according to the present invention.
Figure 13B:
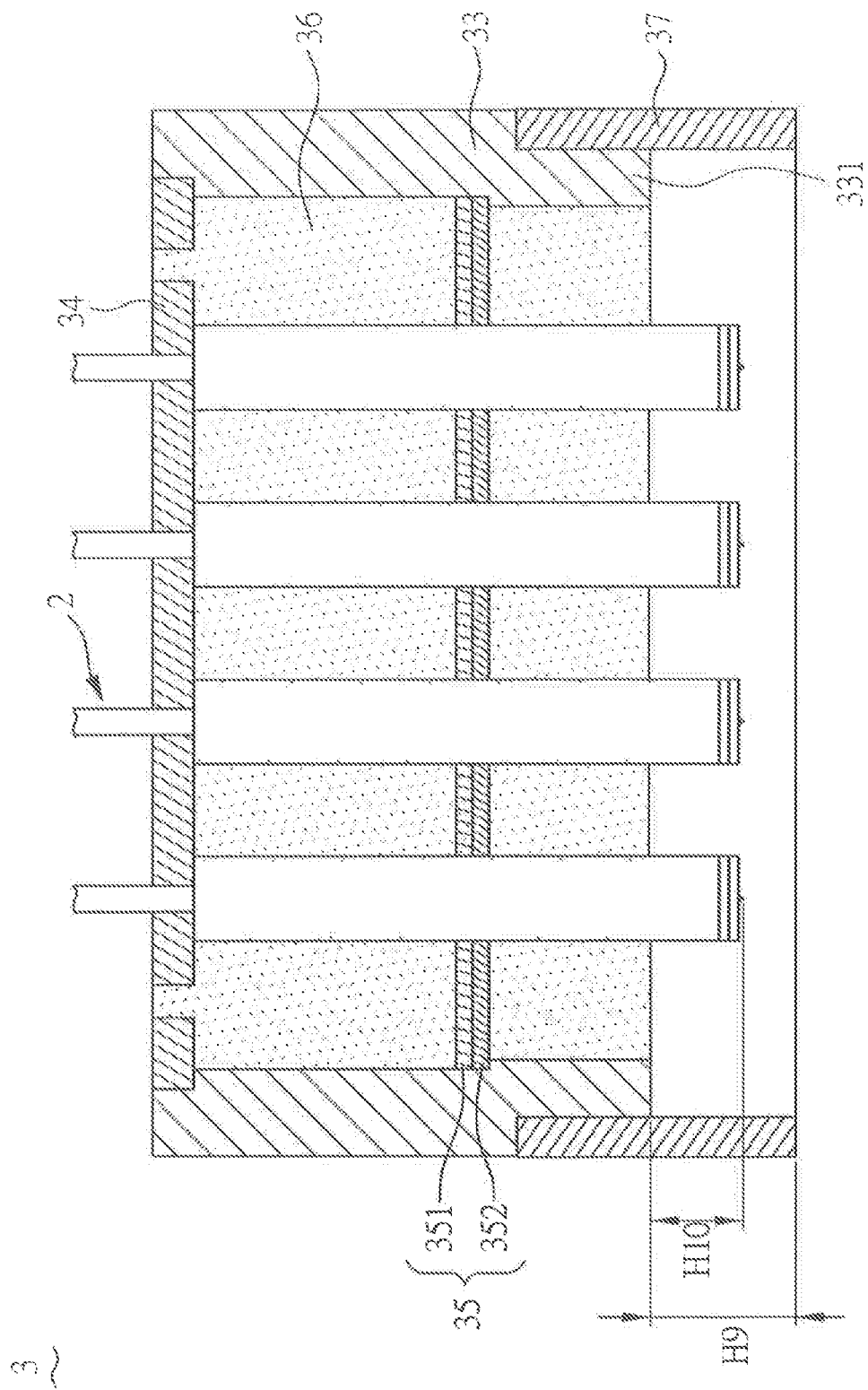
FIG. 13B is a cross-sectional view illustrating the assembled structure of optical fiber connectors shown in FIG. 13A.
Figure 13D:
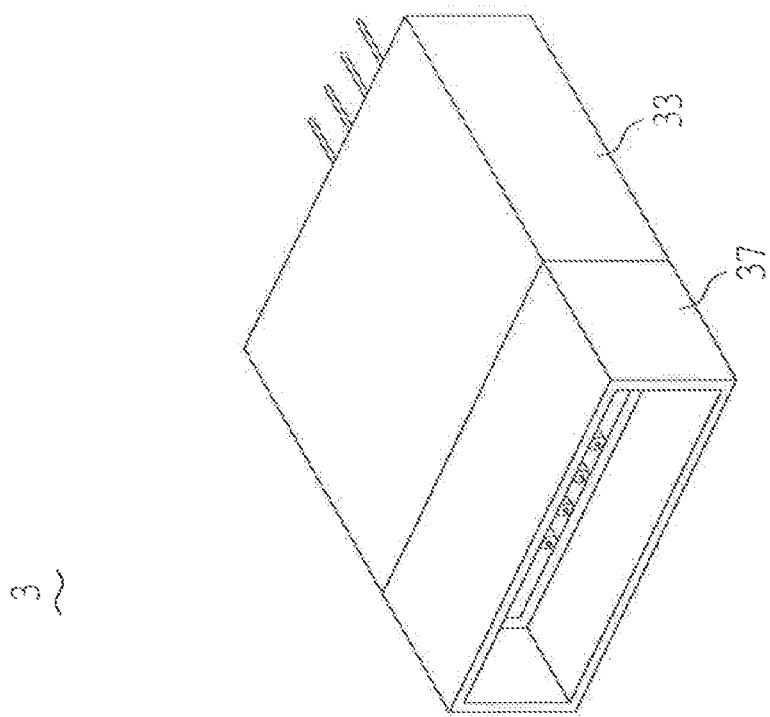
FIG. 13D is a perspective view illustrating the assembled structure of optical fiber connectors shown in FIG. 13B.
Figure 13C:
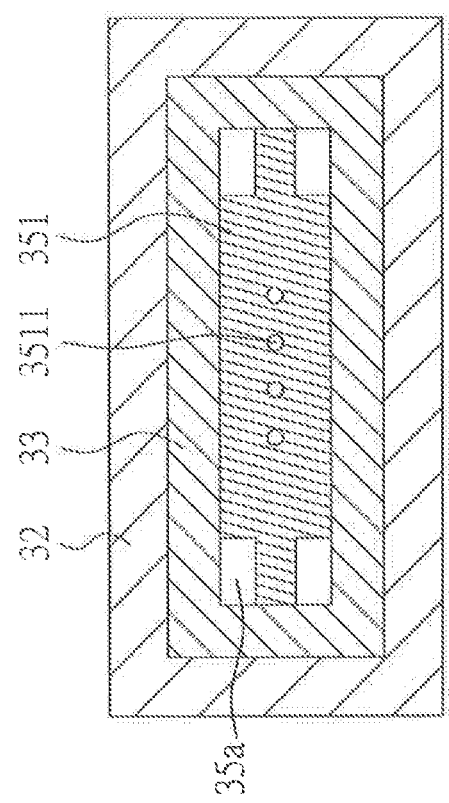
FIG. 13C is a cross-sectional view taken from cutting line A-A of FIG. 13A.

Now references are made to FIG. 13A, a cross-sectional view illustrating a first embodiment in manufacturing an assembled structure of optical fiber connectors according to the present invention; FIG. 13B, a cross-sectional view illustrating the assembled structure of optical fiber connectors shown in FIG. 13A; FIG. 13C, a cross-sectional view taken from cutting line A-A of FIG. 13A; and FIG. 13D, a perspective view illustrating the assembled structure of optical fiber connectors shown in FIG. 13B; and also made to FIG. 2C. The manufacturing of the first embodiment of the assembled structure of optical fiber connectors comprises four optical fiber connectors 2, a lower mold plate 31, a mold wall 32, a casing member 33, an upper board 34, and a positioning assembly 35.

According to the present invention, explanation is necessary for the manufacturing of the first embodiment of the assembled structure of optical fiber connectors that four optical fiber connectors 2 are employed (see FIG. 2C). Of course, the optical fiber connector 2A can be employed as well (see FIG. 3B). The optical fiber connectors formed in the manufacturing of the optical fiber connectors, according to the first embodiment to the eighteenth embodiment, can be adapted for the manufacturing of the first embodiment of the assembled structure of optical fiber connectors. In other words, the manufacturing of the first embodiment of the assembled structure of optical fiber connectors lies in integrating the optical fiber connectors 2, 2A into one piece.

In the first embodiment in manufacturing the assembled structure of optical fiber connectors, the lower mold plate 31 is provided with four first holes 310, four second holes 311, and a protrusion 312. The first holes 310 are communicated with the second holes 311. The first hole 310 corresponds to the positioning member 22 of the optical fiber connector 2; and that the second hole 311 has a diameter slightly smaller than that of the first hole 310, and does not contact with the bare fiber 201; such that the second holes 311 are provided for maintaining the same height for the ends of the optical fiber connectors 2 so as to facilitate abrasion thereof. The lower mold plate 31 is provided with a bottom wall 3101 at where the first hole 310 is communicated with the second hole 311. The mold wall 32 is provided above the lower mold plate 31 and is located inside of the protrusion 312. The casing member 33 is arranged above the lower mold plate 31 and neighbors to inner side of the mold wall 32, and includes a mounting portion 331 for arranging a protective member 37. The upper board 34 is arranged above the casing member 33, and includes two sprues 341 and four optical-fiber-assembly through holes 342. The positioning assembly 35 is provided in between the lower mold plate 31 and the upper board 34, and includes a sheet 351 and a spacing board 352 overlapped with each other (in case of more than two sheets or spacing plates, the sheet(s) and spacing plate(s) will be interplaced with one another, however not shown). The sheet 351 is provided with four optical-fiber-connector positioning holes 3511 corresponding to the four second holes 311 and to the four optical-fiber-assembly through holes 342, respectively. The spacing board 352 is provided with four positioning holes 3521 corresponding to the four optical-fiber-connector positioning holes 3511. The positioning members 22 and the bare fibers 201 of the four optical fiber connectors 2 (see FIG. 2C) correspond to, and pass through, the four first holes 310 and the four second holes 311.

As shown in FIG. 13A and FIG. 13B, the four optical fiber connectors 2 pass through the four optical-fiber-assembly through holes 342 of the upper board 34, the four optical-fiber-connector positioning holes 3511 and the four positioning holes 3521 of the positioning assemblies 35, respectively, such that the positioning members 22 can touch the bottom walls 3101 of the four first holes 310 of the lower mold plate 31, respectively, and that the four bare fibers 201 pass through the second holes 311, respectively. Through the help of the optical-fiber-connector positioning holes 3511 and the positioning holes 3521 of the positioning assemblies 35, and of the first holes 310 and the bottom walls 3101 of the lower mold plate 31, the four optical fiber connectors 2 can achieve a positioning effect, and then plastic material is poured into the two sprues 341.

Thereafter, according to the present invention, as shown in FIG. 13C, four plastic-material channels 35a are formed in the positioning assembly 35, such that plastic material can be fed into the lower side of the positioning assembly 35 through the four plastic-material channels 35a, and that a plastic member 36 can be formed at the upper side and lower side of the positioning assembly 35 (see FIG. 13B). Then the lower mold plate 31 is removed, so that an optical-fiber-connector assembled structure 3 can be formed. Further, the protective member 37 is arranged in the mounting portion 331 of the casing member 33, such that emerged height H9 of the protective member 37 is greater than emerged height H10 of the bare fibers 201 of the optical fiber connectors 2, so as to protect the ends of the four bare fibers 201. According to the present invention, the casing member 33 and the protective member 37 are made, preferably, by metallic materials.

Figure 14A:
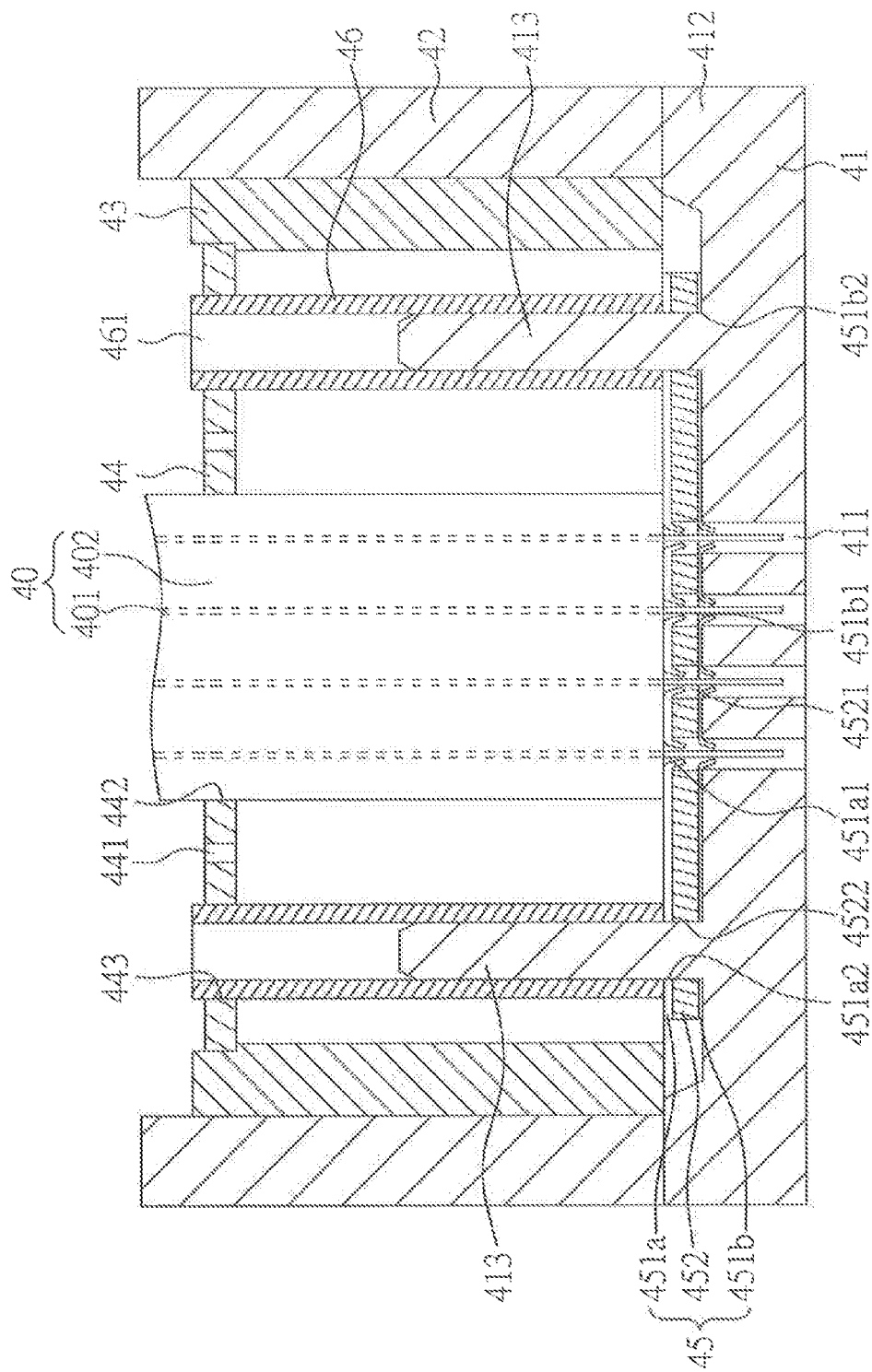
FIG. 14A is a schematic view illustrating manufacturing of an optical fiber connector according to a nineteenth embodiment of the present invention.
Figure 14C:
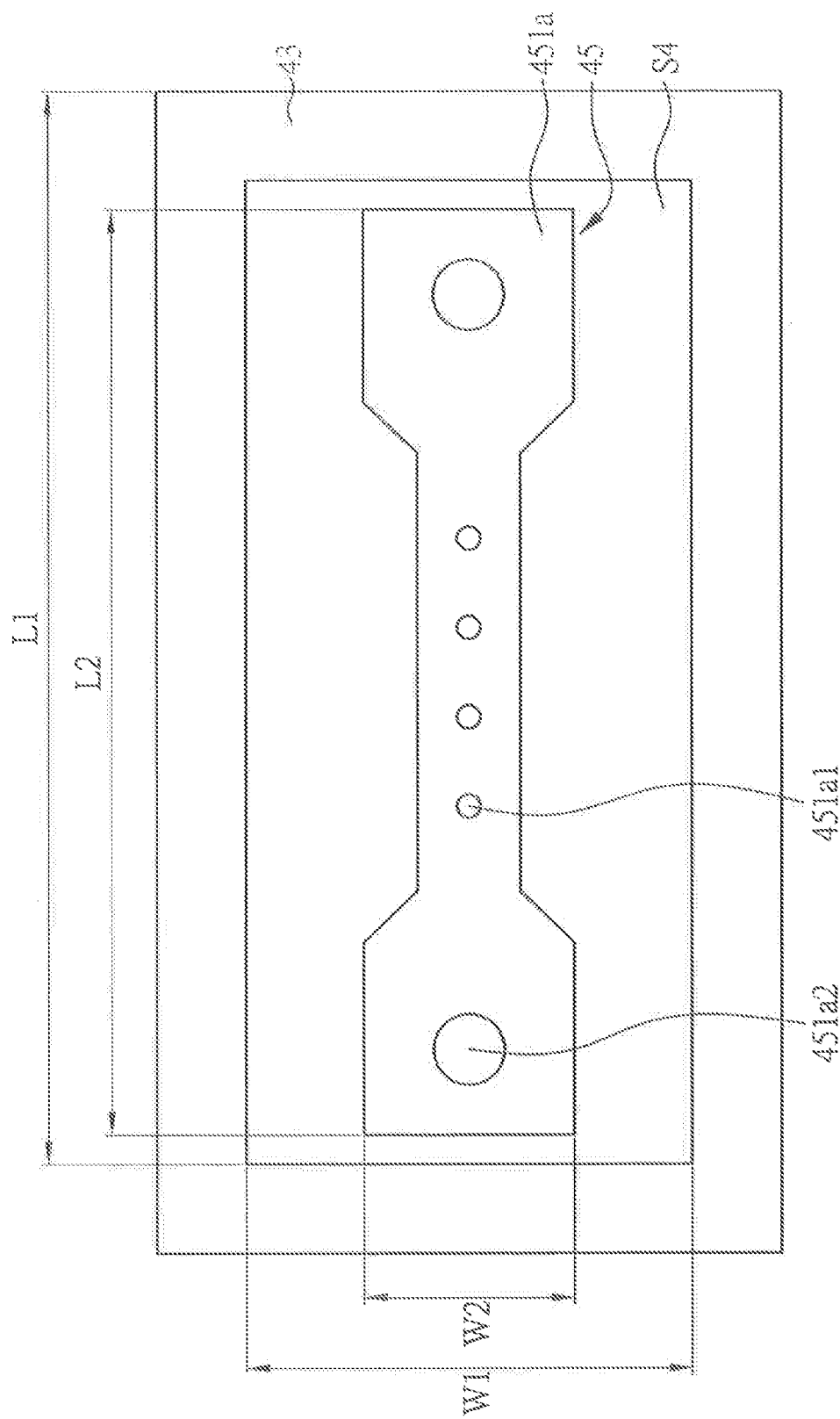
FIG. 14C is a schematic view illustrating layout of a casing member and the positioning assembly of the optical fiber connector according to the nineteenth embodiment of the present invention.
Figure 14D:
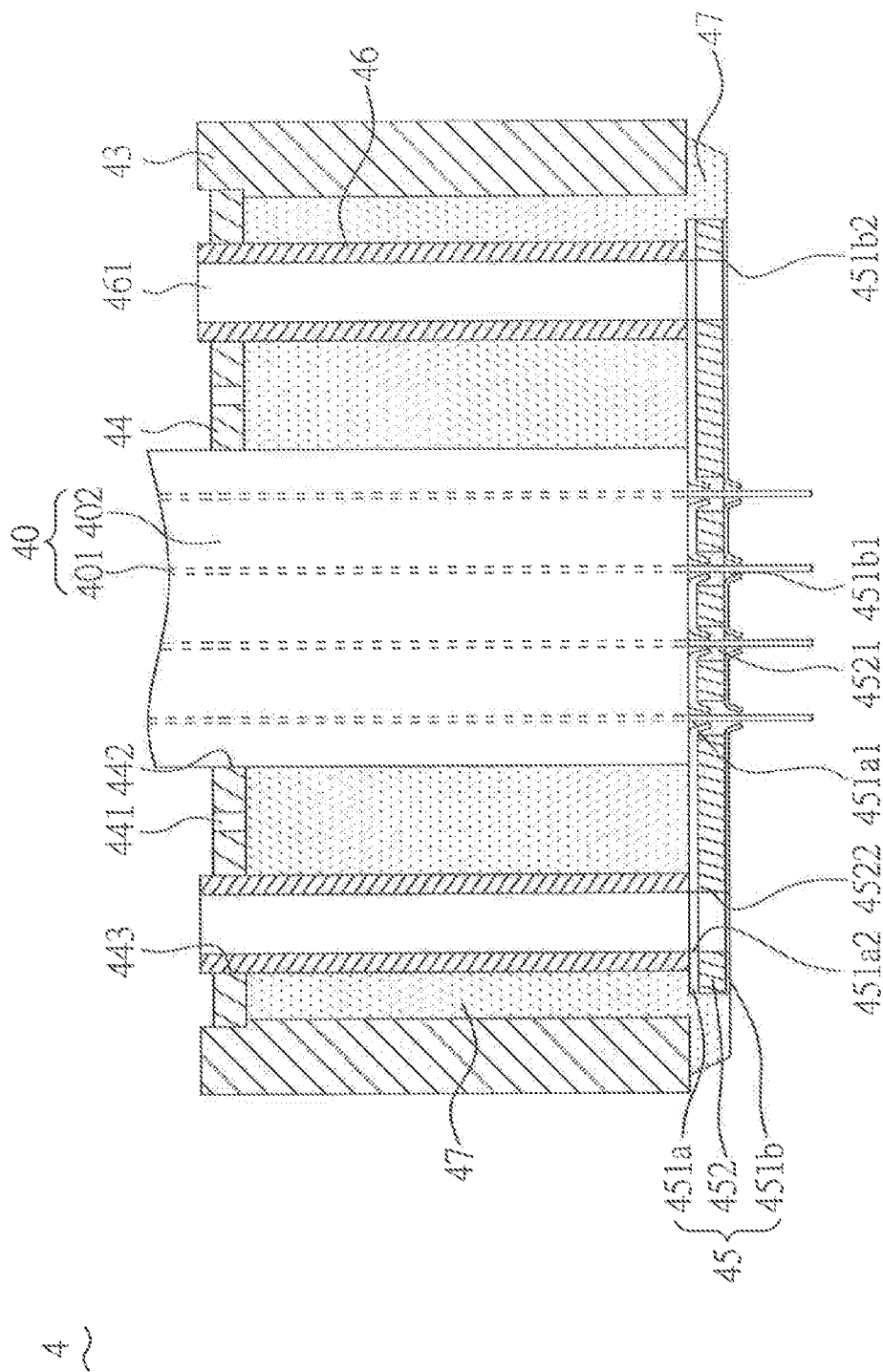
FIG. 14D is a cross-sectional view illustrating the optical fiber connector according to the nineteenth embodiment of the present invention.

Further, references are made to FIG. 14A, a schematic view illustrating manufacturing of an optical fiber connector according to a nineteenth embodiment of the present invention; FIG. 14B, a schematic view illustrating a positioning assembly of the optical fiber connector; FIG. 14C, a schematic view illustrating layout of a casing member and the positioning assembly of the optical fiber connector; and FIG. 14D, a cross-sectional view illustrating the optical fiber connector. The manufacturing of the optical fiber connector, in the nineteenth embodiment, comprises an optical fiber assembly 40, a lower mold plate 41, a mold wall 42, a casing member 43, an upper board 44, a positioning assembly 45, and two tube-like members 46.

According to the present invention, explanations are necessary for the differences on the structure of optical fiber assemblies. The optical fiber assembly 40 includes four bare fibers 401 and a protective layer 402. Or alternatively, there may be formed with two optical fiber assemblies each constituted by two bare fibers and a protective layer. In other words, the molding, according to the present invention, can be adjusted to comply with the structure of the optical fiber assembly, without limitation to the number of the bare fibers and of the protective layers as described in the embodiments.

In the nineteenth embodiment for the manufacturing of the optical fiber connector, the optical fiber assembly 40 includes four bare fibers 401 and a protective layer 402. The lower mold plate 41 includes four through holes 411, a protrusion 412, and two positioning pins 413. The mold wall 42 is provided on the lower mold plate 41. The casing member 43 is provided on the lower mold plate 41 and is adjacent to inner side of the mold wall 42, such that both the mold wall 42 and the casing member 43 are provided on the protrusion 412. The upper board 44 is arranged on the casing member 43, and includes two sprues 441, an optical-fiber-assembly hole 442, and two mounting holes 443 corresponding to the two tube-like members 46. The positioning assembly 45 is arranged in between the lower mold plate 41 and the upper board 44, and on the lower mold plate 41, and includes two positioning sheets 451a, 452b and a spacing board 452 which are overlapped with one another. The positioning sheet 451a is provided with four bare-fiber positioning holes 451a1 corresponding respectively to the four through holes 411 and the optical-fiber-assembly hole 442, and with two first positioning holes 451a2 corresponding respectively to the two positioning pins 413. The positioning sheet 451b is provided with four bare-fiber positioning holes 451b1 corresponding respectively to the four through holes 411 and the optical-fiber-assembly hole 442, and with two first positioning holes 451b2 corresponding respectively to the two positioning pins 413. The spacing board 452 is provided with four positioning holes 4521 corresponding respectively to the four bar-fiber positioning holes 451b1, and with two second positioning pin holes 4522 corresponding respectively to the two positioning pins 413. The two tube-like members 46 correspond to the two positioning pins 413, respectively, and are arranged on the positioning assembly 45. The tube-like members 46 are each provided with a third positioning pin hole 461 for receiving the positioning pins 413.

Further, as shown in FIG. 14A and FIG. 14B, the bare-fiber positioning hole 451a1 is formed crater-like and opened downward, such that cross-section of the bare-fiber positioning hole 451a1 is relatively ladder-like, with a longer top side and a shorter bottom side, and that an opening is formed at the bottom thereof. With this configuration, the bare fibers 201 can be inserted into the bare-fiber positioning holes 451a1 easily during the process of manufacturing.

As shown in FIG. 14C, the positioning assembly 45 is formed as a dumbbell-like structure. The casing member 43 is formed with an accommodating space S4 having a length L1 and a width W1, which are greater than a length L2 and a width W2 of the positioning assembly 45, so that a plastic member 47 formed through plastic material fed thereinto can reach to tips of the bare fibers 401.

Further, the structure located at the protrusion 412 of the lower mold plate 41, arranged in compliance with the mold wall 42 and the casing member 43, makes the plastic member 47, after feeding in plastic material and forming the plastic member 47 and removing the lower mold plate 41 and the mold wall 42, exposed from the bottom of the casing member 43 (see FIG. 14D), so as to facilitate abrasion of the optical fiber connector 4.

Still further, the positioning sheets 451a, 451b may be made of either plastic materials, metallic materials, or celluloid materials, with different thicknesses, such that the positioning sheet 451a has a larger thickness such as 0.5 mm, for increasing wear resistance and durability for the optical fiber connector 4. Besides, the tube-like members 46 are made, preferably, of metallic material, such that, during use of the optical fiber connector 4 in operation of insertion and pulling out thereof, polluted particles or debris due to friction can be avoided, and that transmission of optical fiber signals will not be adversely affected.

Figure 15:
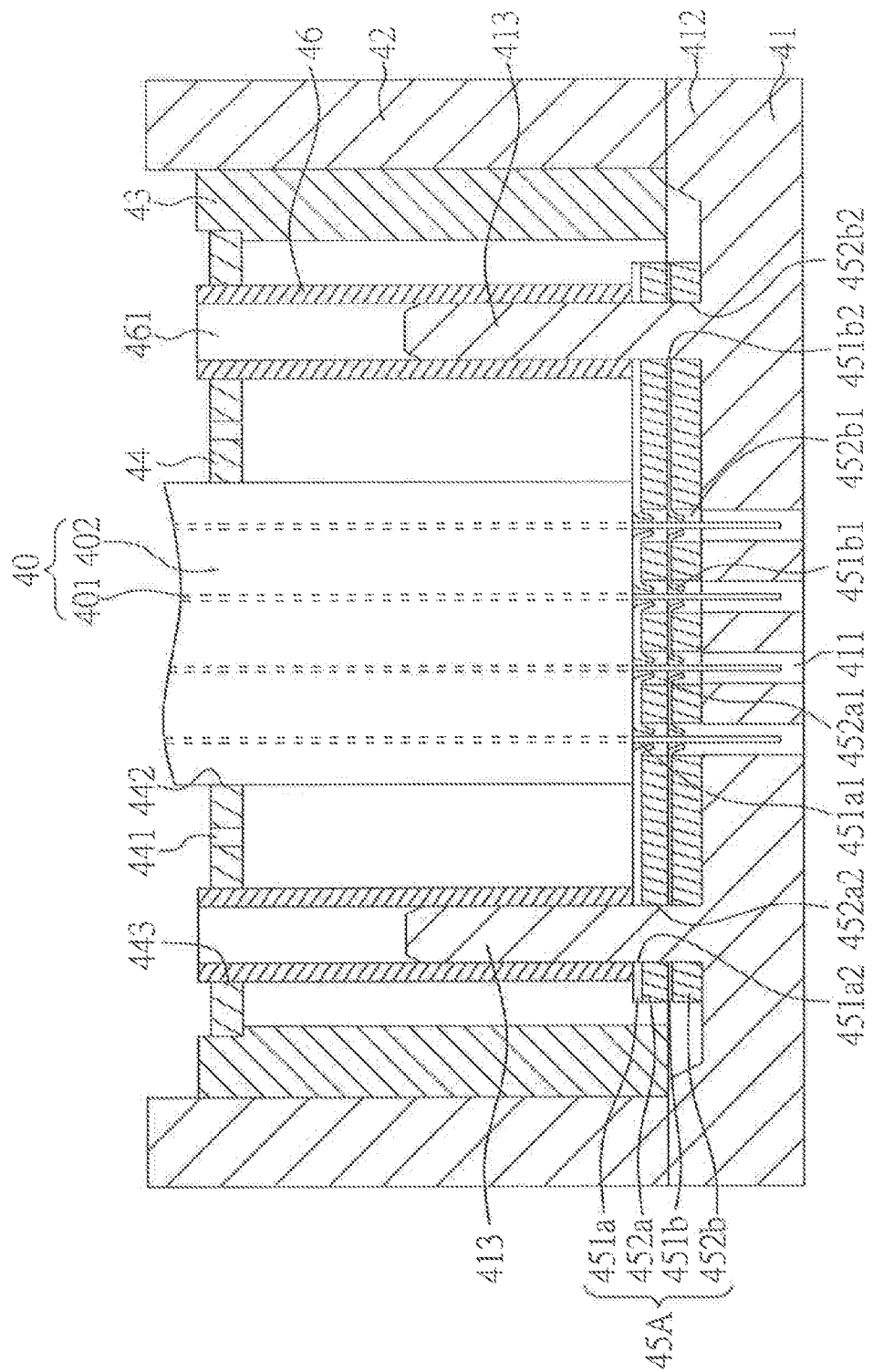
FIG. 15 is a schematic view illustrating manufacturing of an optical fiber connector according to a twentieth embodiment of the present invention.
Figure 16:
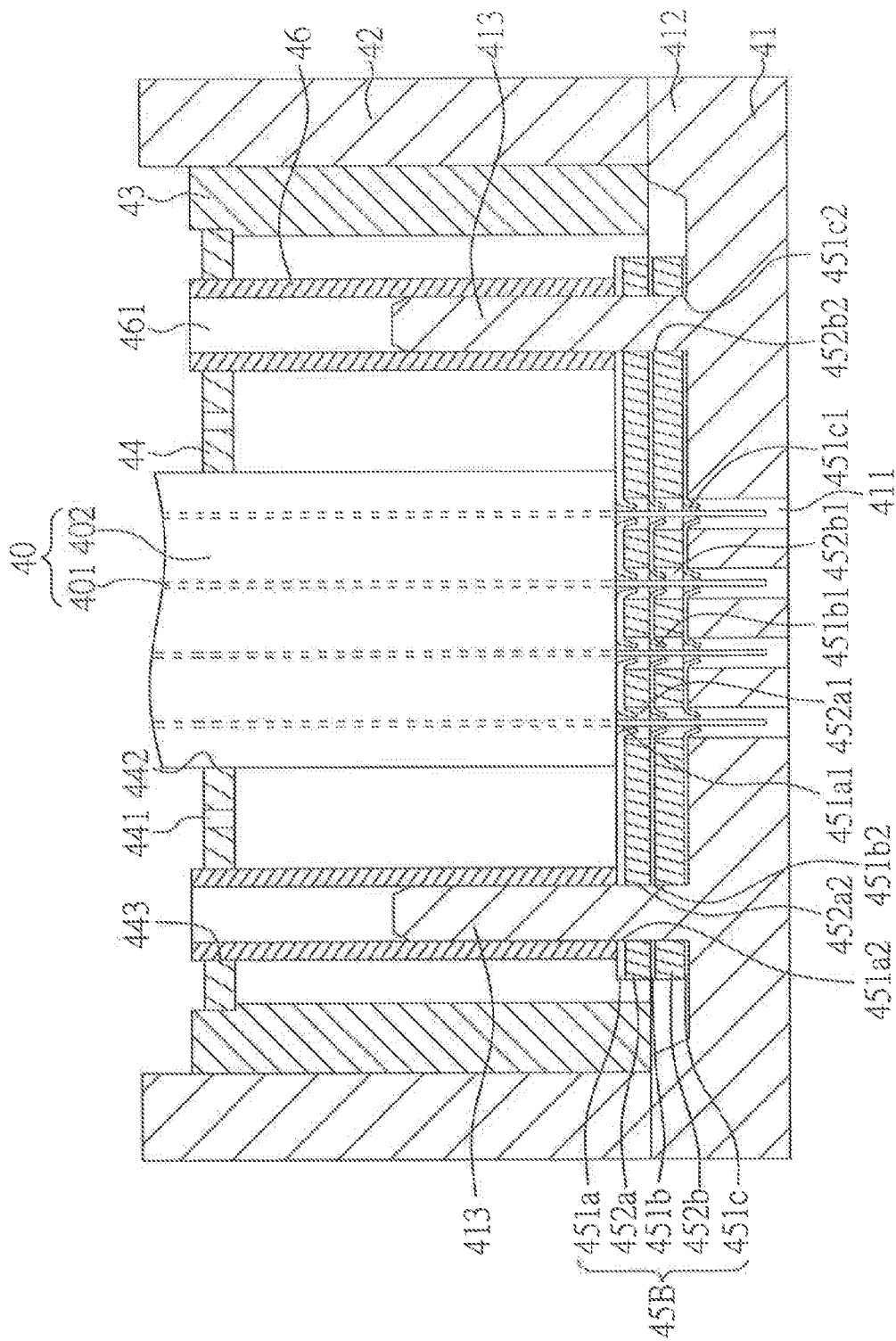
FIG. 16 is a schematic view illustrating manufacturing of an optical fiber connector according to a twenty-first embodiment of the present invention.
Figure 17:
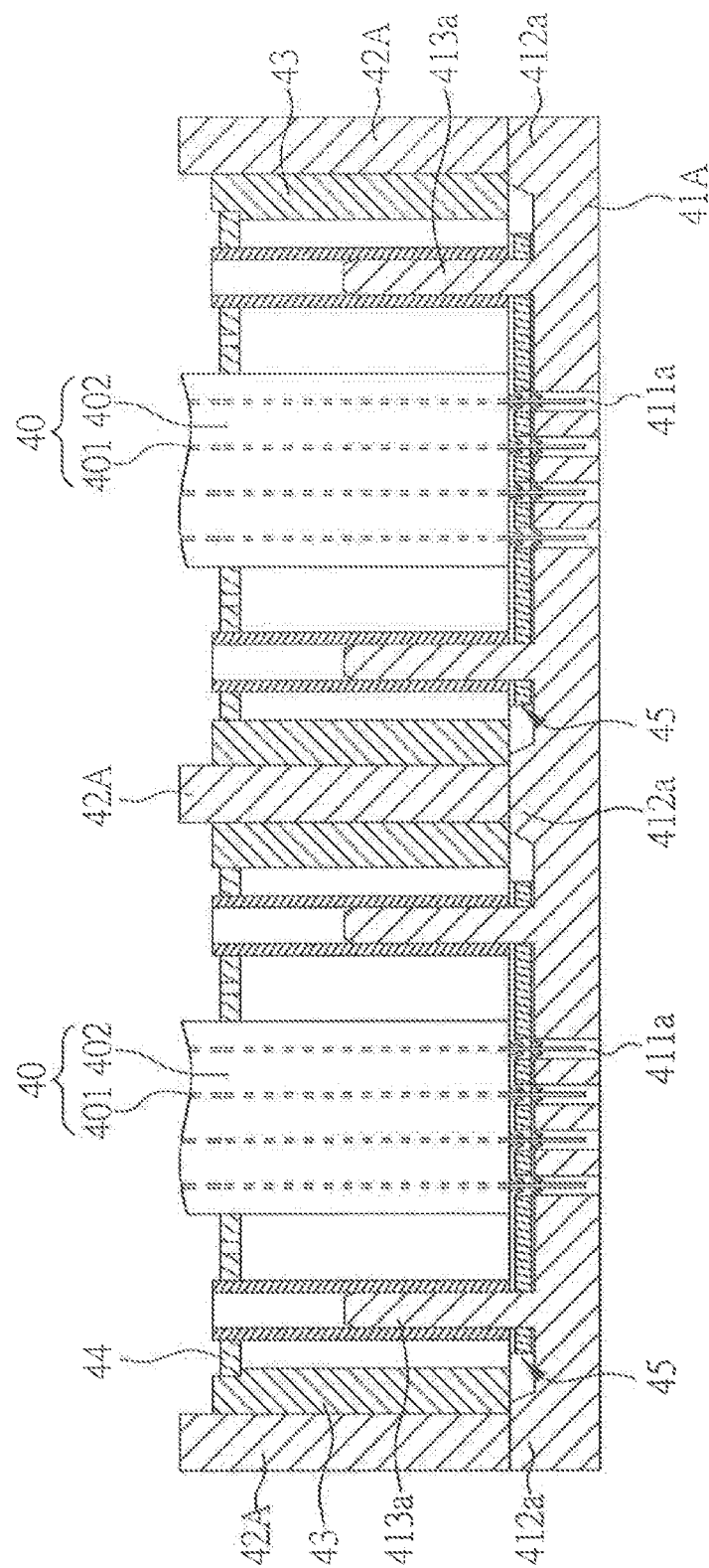
FIG. 17 is a schematic view illustrating manufacturing of an optical fiber connector according to a twenty-second embodiment of the present invention.

Now references are made to FIG. 15, a schematic view illustrating manufacturing of an optical fiber connector according to a twentieth embodiment of the present invention; FIG. 16, a schematic view illustrating manufacturing of an optical fiber connector according to a twenty-first embodiment of the present invention; and FIG. 17, a schematic view illustrating manufacturing of an optical fiber connector according to a twenty-second embodiment of the present invention. The twentieth, twenty-first, and twenty-second embodiments relate to a modified application of the nineteenth embodiment shown in FIG. 14A to FIG. 14D.

According to the present invention, the manufacturing of the optical fiber connector of the nineteenth embodiment differs from that of the twentieth embodiment in that there are different numbers for the positioning sheets and for the second spacing boards. In the twentieth embodiment, the positioning member 45A includes two overlappingly arranged positioning sheets 451a, 451b and spacing boards 452a, 452b. The positioning sheet 451a is provided with four bare-fiber positioning holes 451a1 corresponding respectively to four through holes 411 and optical-fiber-assembly holes 442, and with two first positioning pin holes 451a2 corresponding respectively to two positioning pins 413. The positioning sheet 451b is provided with four bare-fiber positioning holes 451b1 corresponding respectively to four through holes 411 and optical-fiber-assembly holes 442, and with two first positioning pin holes 451b2 corresponding respectively to two positioning pins 413. The spacing board 452a is provided with four positioning holes 452a1 corresponding respectively to four bare-fiber positioning holes 451a1, and with two second positioning pin holes 452a2 corresponding respectively to two positioning pins 413. The spacing board 452b is provided with four positioning holes 452b1 corresponding respectively to four bare-fiber positioning holes 451b1, and with two second positioning pin holes 452b2 corresponding respectively to two positioning pins 413. As such, the product of optical fiber connectors can be made.

Further, according to the present invention, the manufacturing of the optical fiber connector of the nineteenth embodiment differs from that of the twenty-first embodiment in that there are different numbers for the positioning sheets and for the second spacing boards. In the twenty-first embodiment, the positioning member 45B includes three positioning sheets 451a, 451b, 451c and two spacing boards 452a, 452b which are interplaced with one another. The positioning sheet 451a is provided with four bare-fiber positioning holes 451a1 corresponding respectively to four through holes 411 and optical-fiber-assembly holes 442, and with two first positioning pin holes 451a2 corresponding respectively to two positioning pins 413. The positioning sheet 451b is provided with four bare-fiber positioning holes 451b1 corresponding respectively to four through holes 411 and optical-fiber-assembly holes 442, and with two first positioning pin holes 451b2 corresponding respectively to two positioning pins 413. The spacing board 451c is provided with four bare-fiber-assembly positioning holes 451c1 corresponding respectively to four through holes 411 and optical-fiber-assembly holes 442, and with two first positioning pin holes 451c2 corresponding respectively to two positioning pins 413. The spacing board 452a is provided with four positioning holes 452a1 corresponding respectively to four bare-fiber positioning holes 451a1, and with two second positioning pin holes 452a2 corresponding respectively to two positioning pins 413. The spacing board 452b is provided with four positioning holes 452b1 corresponding respectively to four bare-fiber positioning holes 451b1, and with two second positioning pin holes 452b2 corresponding respectively to two positioning pins 413. As such, the production of optical fiber connectors can be accomplished.

According to the present invention, in the nineteenth, twentieth, and twenty-first embodiments, position members 45, 45A, 45B include different numbers of positioning sheets and spacing boards, variable combinations thereof depending on actual need for the positioning effect required, so as to make the product of optical fiber connectors.

Further, according to the present invention, the manufacturing of the optical fiber connector of the nineteenth embodiment differs from that of the twenty-second embodiment in that, in the twenty-second embodiment, a lower mold plate 41A is provided with eight through holes 411a, a protrusion 412a, and four positioning pins 413a. A mold wall 42A is provided on the protrusion 412a. Namely, in the twenty-second embodiment, production of two optical fiber connections can be accomplished in one process. This will increase the production capacity of optical fiber connectors. As such, according to the present invention, it is obvious to know that making plural optical fiber connectors at one process with corresponding molds is possible.

Figure 18A:
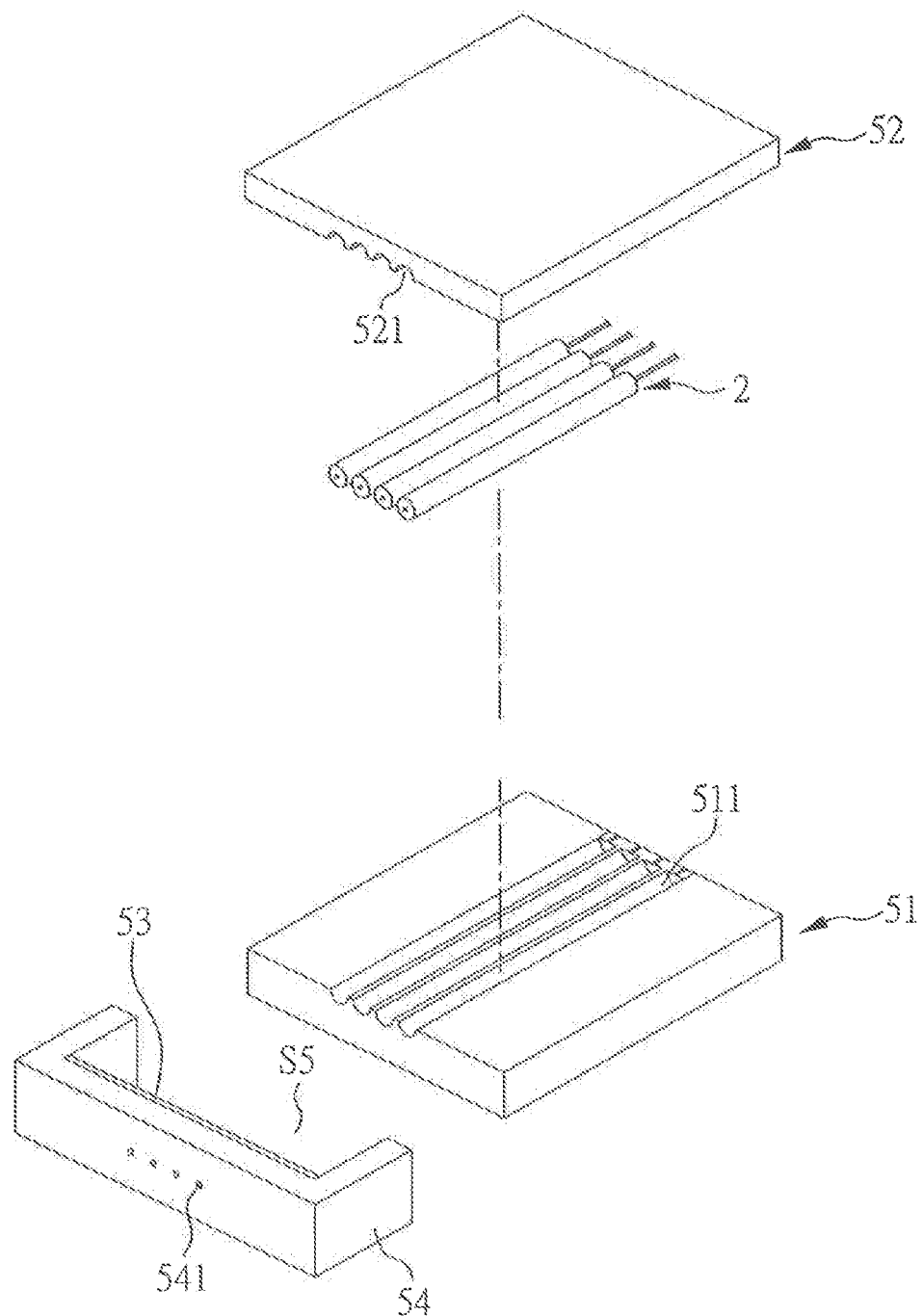
FIG. 18A is a perspective exploded view illustrating a second embodiment in manufacturing an assembled structure of optical fiber connectors according to the present invention.
Figure 18B:
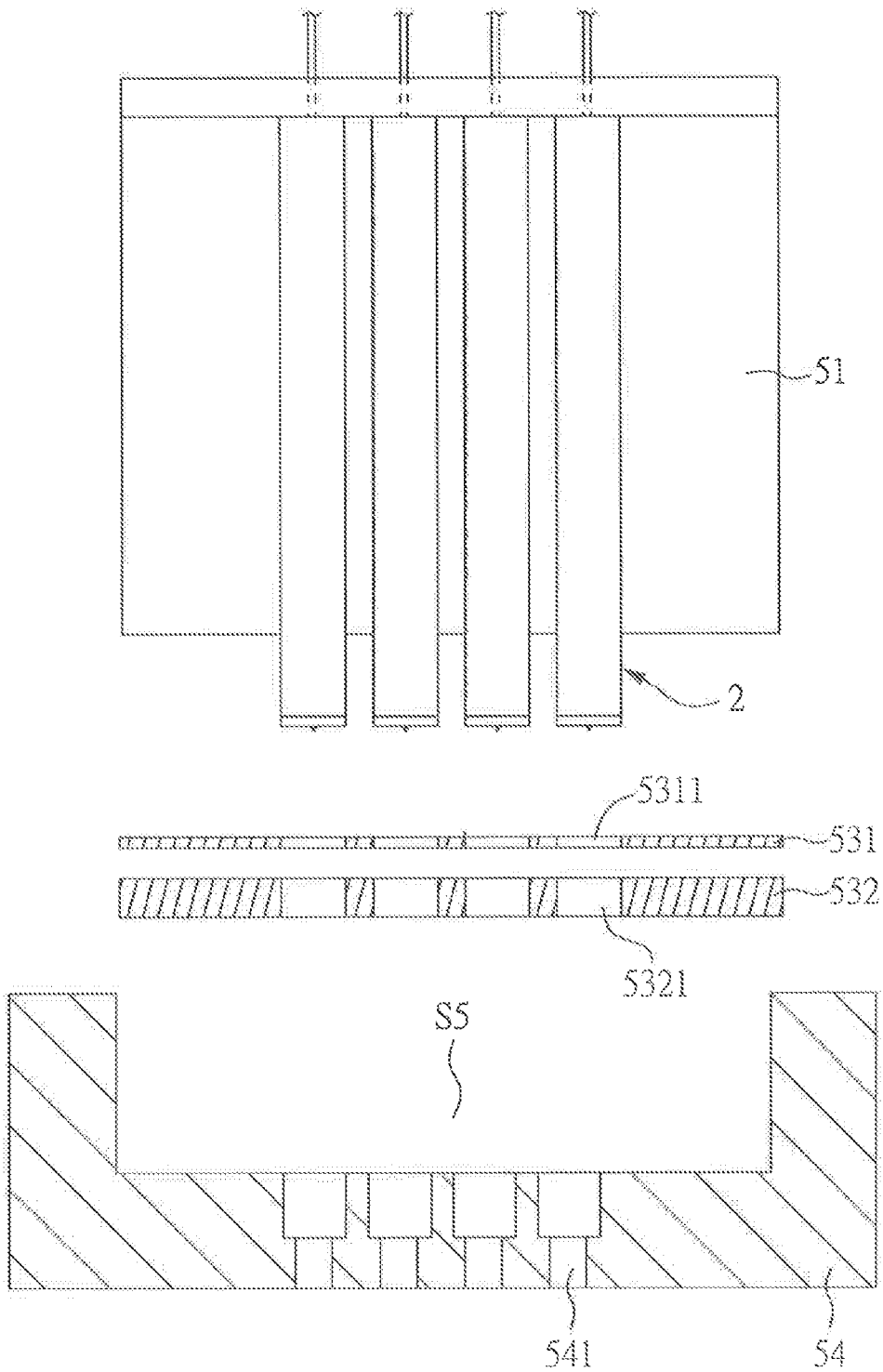
FIG. 18B is an exploded cross-sectional view illustrating the second embodiment in manufacturing the assembled structure of optical fiber connectors according to the present invention.
Figure 18C:
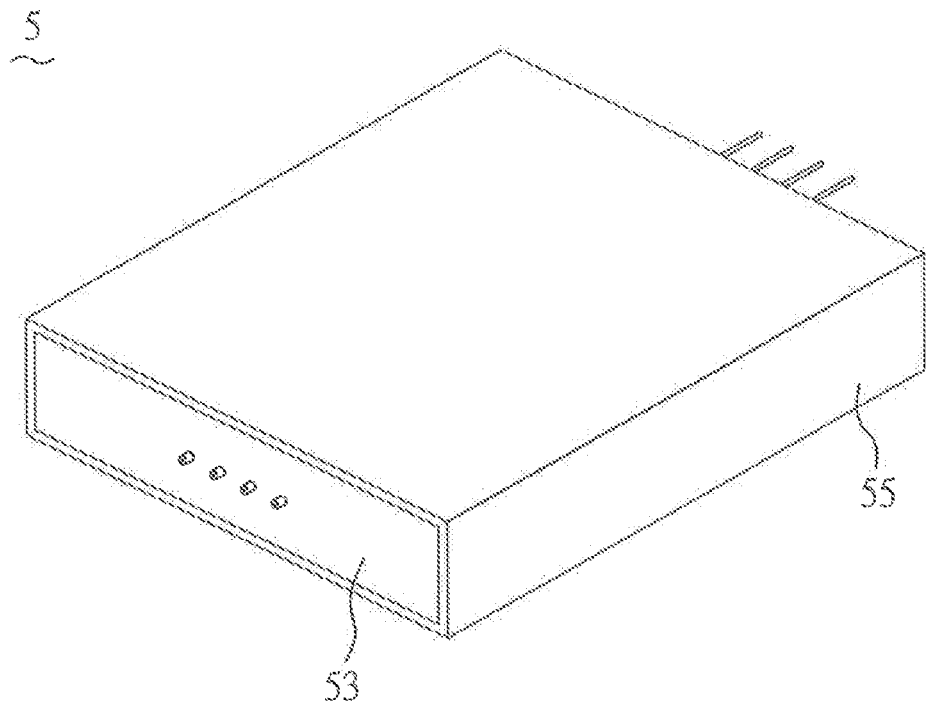
FIG. 18C is a perspective view illustrating the assembled structure of optical fiber connectors shown in FIG. 18A.
Figure 18D:
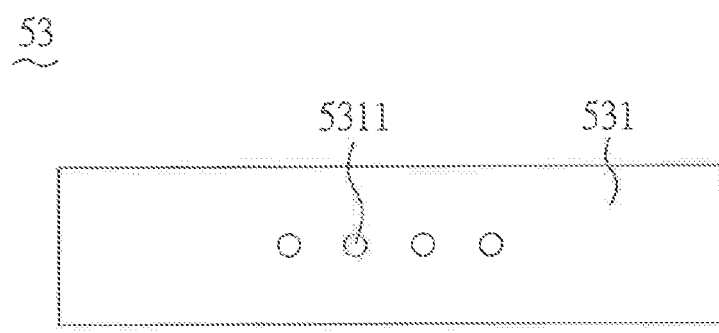
FIG. 18D is a schematic view illustrating a positioning assembly of the assembled structure of optical fiber connectors as shown in FIG. 18C.

Further, references are made to FIG. 18A, a perspective exploded view illustrating a second embodiment in manufacturing an assembled structure of optical fiber connectors according to the present invention; FIG. 18B, an exploded cross-sectional view illustrating the second embodiment in manufacturing the assembled structure of optical fiber connectors; FIG. 18C is a perspective view illustrating the assembled structure of optical fiber connectors shown in FIG. 18A; and FIG. 18D, a schematic view illustrating a positioning assembly of the assembled structure of optical fiber connectors as shown in FIG. 18C. The manufacturing of the second embodiment of the assembled structure of optical fiber connectors comprises four optical fiber connectors 2, a first body member 51, a second body member 52, a positioning assembly 53, and a lower mold plate 54.

The first body member 51 includes four first mounting portions 511. The second body member 52 is arranged on the first body member 51, and includes four second mounting portions 521 corresponding to the four first mounting portions 511. The positioning assembly 53 includes a sheet 531 and a spacing board 532. The sheet 531 is provided with four optical-fiber-connector positioning holes 5311 corresponding respectively to the four optical fiber connectors 2. The spacing board 532 is provided with four positioning holes 5321 corresponding respectively to the four optical fiber connectors 2. The lower mold plate 54 is provided with for through holes 541 corresponding respectively to the four positioning holes 5321, and with an accommodating space S5 for receiving the first body member 51, the second body member 52, and the positioning assembly 53. Adhesive will be applied to the four optical fiber connectors 2, the first body member 51, the second body member 52, and the positioning assembly 53, so as to make the same integrated into one piece. The four optical fiber connectors 2 correspond to, and are arranged in, the four first mounting portions 511 and the four second mounting portions 521; and besides, the four bare fibers 201 of the four optical fiber connectors 2 emerge from the optical-fiber-connector positioning holes 5311 of the sheet 531.

As shown in FIG. 18A, it is noted that the four optical fiber connectors 2 are assembled in the first body member 51 and the second body member 52, where the optical fiber connectors 2 are positioned in place through the help of the optical-fiber-connector positioning holes 5311 and the positioning holes 5321 of the positioning assembly 53. Thereafter, after a pressing work with the lower mold plate 54, an optical-fiber-connector assembled structure 5 can be obtained, where a protective member 55 is provided for accommodating the first body member 51, the second body member 52, and the positioning assembly 53 (see FIG. 18C), so as to reinforce the firmness of the optical fiber connectors. According to the present invention, the protective member 55 is preferably made of metallic materials.

Figure 19A:
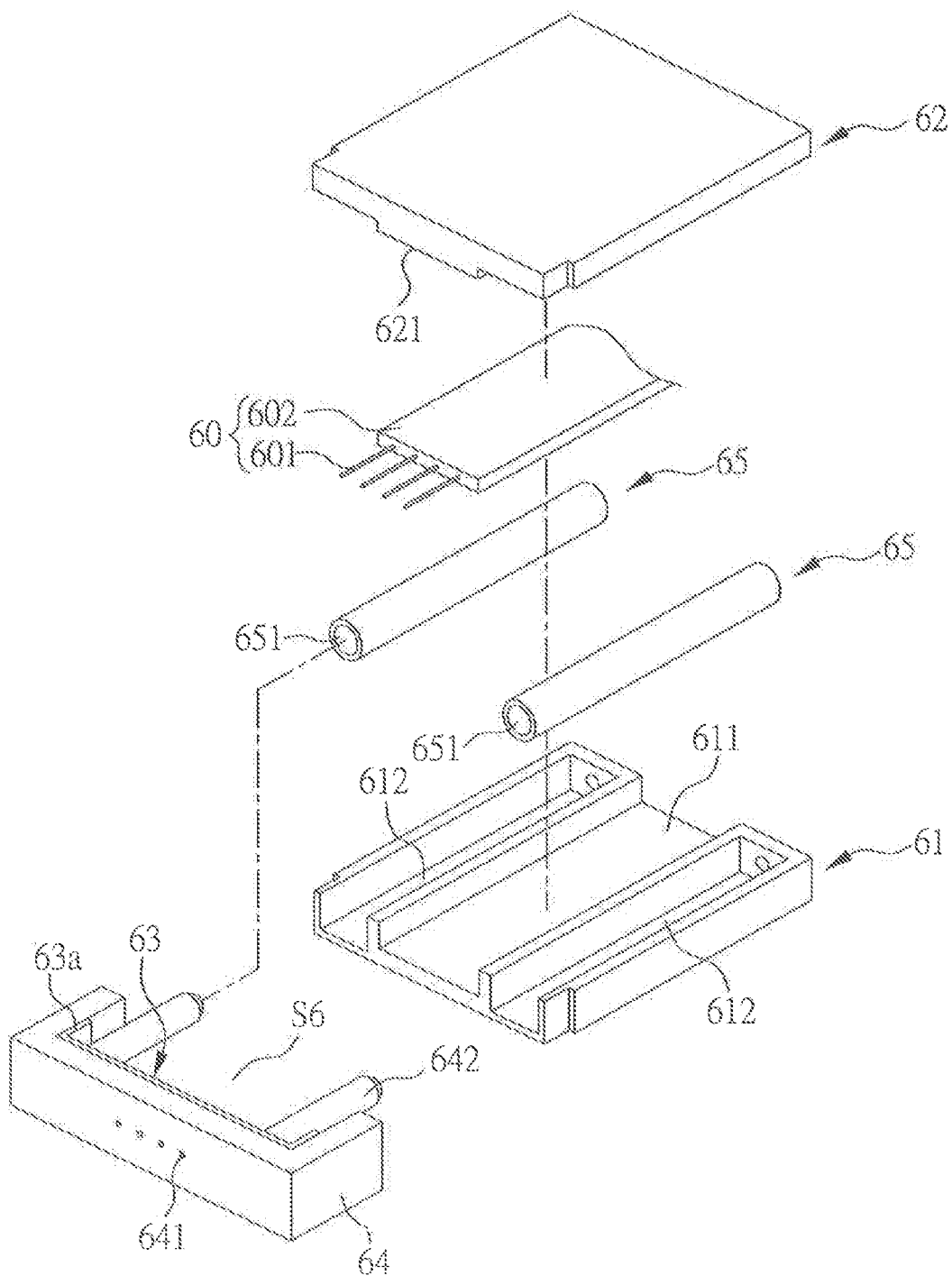
FIG. 19A is an exploded view illustrating manufacturing of an optical fiber connector according to a twenty-third embodiment of the present invention.
Figure 19B:
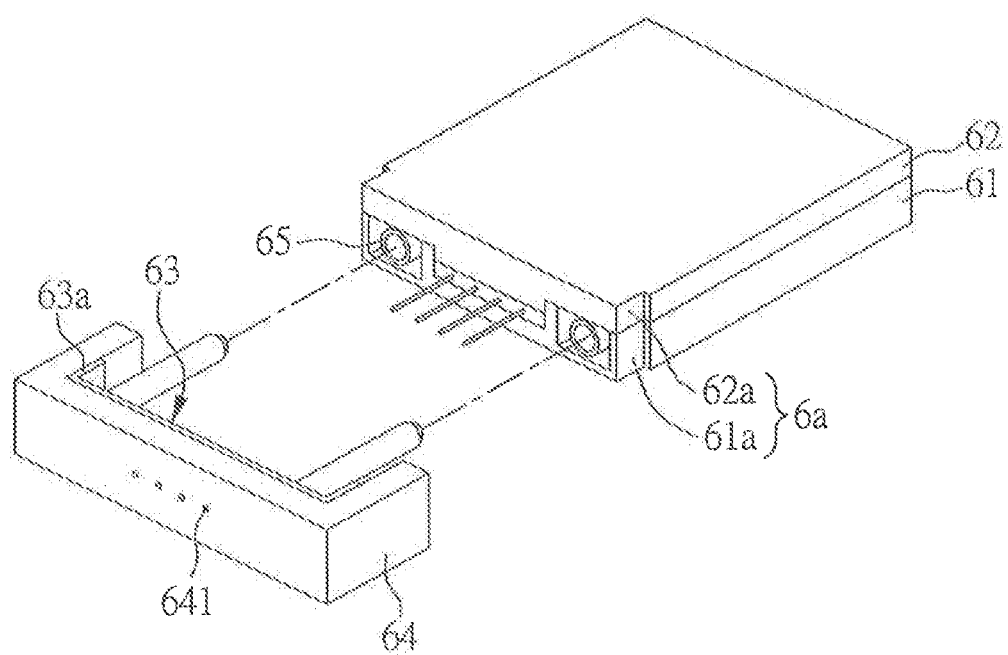
FIG. 19B is another exploded view illustrating manufacturing of the optical fiber connector according to the twenty-third embodiment of the present invention.
Figure 19C:
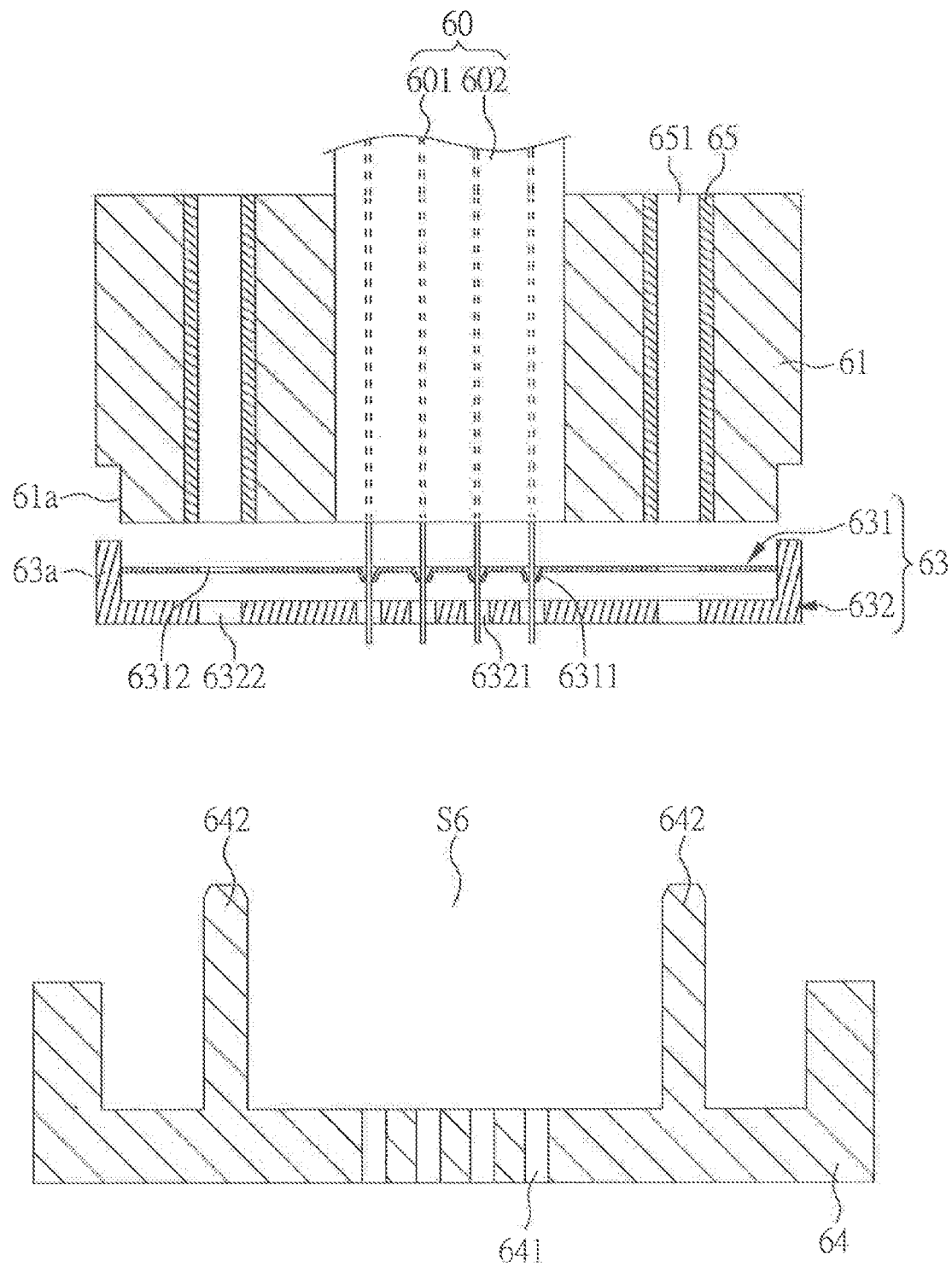
FIG. 19C is an exploded view illustrating manufacturing of the optical fiber connector according to the twenty-third embodiment of the present invention.

Still further, references are made to FIG. 19A, an exploded view illustrating manufacturing of an optical fiber connector according to a twenty-third embodiment of the present invention; FIG. 19B, another exploded view illustrating manufacturing of the optical fiber connector; and FIG. 19C, an exploded view illustrating manufacturing of the optical fiber connector. The manufacturing of the optical fiber connector, in the twenty-third embodiment, comprises an optical fiber assembly 60, a first body member 61, a second body member 62, a positioning assembly 63, a lower mold plate 64, and two tube-like members 65.

In the twenty-third embodiment, the optical fiber assembly 60 includes four bare fibers 601 and a protective layer 602. The first body member 61 includes a first mounting portion 611 and two receiving portions 612 for receiving the two tube-like members 65. Further, the first body member 61 and the second body member 62 are formed with two recessed portions 6a (the recessed portions 6a are each constituted by a first recessed portion 61a and a second recessed portion 62a). The second body member 62 is arranged on the first body member 61, and includes a second mounting portion 621. The positioning assembly 63 includes a positioning sheet 631 and a spacing board 632 overlapped with each other. The positioning sheet 631 is provided with four bare-fiber positioning holes 6311 corresponding respectively to the first mounting portion 611 and the second mounting portion 621, and with two first positioning pin holes 6312 corresponding respectively to two positioning pins 642. The spacing board 632 is provided with four positioning holes 6321 corresponding respectively to the bare-fiber positioning holes 6311, with two second positioning pin holes 6322 corresponding respectively to two positioning pins 642, and with two protrusions 63a corresponding respectively to the two recessed portions 6a. The lower mold plate 64 is provided with four through holes 641 corresponding respectively to the bare-fiber positioning holes 6311, with two positioning pins 642, and with an accommodating space S6 for receiving the first body member 61, the second body member 62, and the positioning assembly 63. The two tube-like members 65 correspond respectively to the two positioning pins 642, and are arranged on the positioning assembly 63. Further, the tube-like members 65 are each provided with a third positioning pin hole 651 for receiving the positioning pin 642.

The optical fiber assembly 60 is assembled in the first body member 61 and the second body member 62, where the bare fibers 601 are positioned in place by the bare-fiber positioning holes 6311 of the positioning sheet 631 of the positioning assembly 63, and where the two recessed portions 6a and the two protrusions 63a are provided for reinforcing the firmness thereof. Then adhesive will be applied to and in between the components of the optical fiber assembly 60, the first body member 61, the second body member 62, the two tube-like members 65, and the positioning assembly 63; and then the optical fiber assembly 60, the first body member 61, the second body member 62, the two tube-like members 65, and the positioning assembly 63 each has their one end laid into the accommodating space S6 of the lower mold plate 64 for pressing lamination; and that after the optical fiber assembly 60, the first body member 61, the second body member 62, the two tube-like members 65, and the positioning assembly 63 have been integrated into one piece, then the lower mold plate 64 can be removed, so as to form the product of optical fiber connectors. Besides, a protective member (not shown) can be provided for receiving therein the first body member 61, the second body member 62, and the positioning assembly 63 so as to reinforce the firmness of the optical fiber connectors.

Figure 19D:
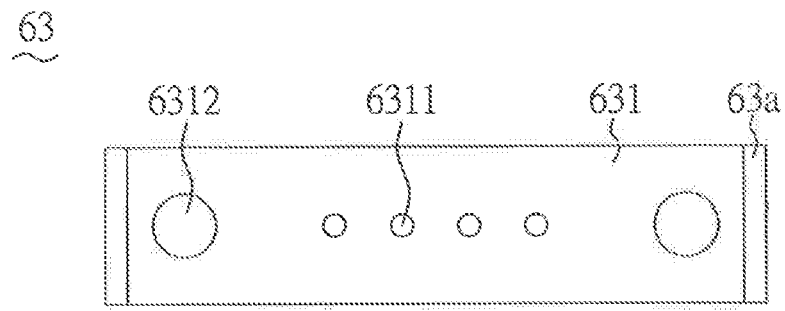
FIG. 19D is a schematic view illustrating a positioning assembly of the optical fiber connector according to the twenty-third embodiment of the present invention.
Figure 19E:
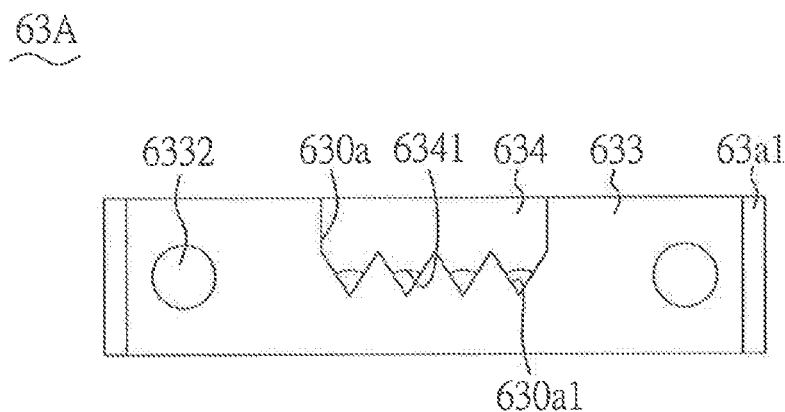
FIG. 19E is a schematic view illustrating another positioning assembly of the optical fiber connector according to the twenty-third embodiment of the present invention.
Figure 19F:
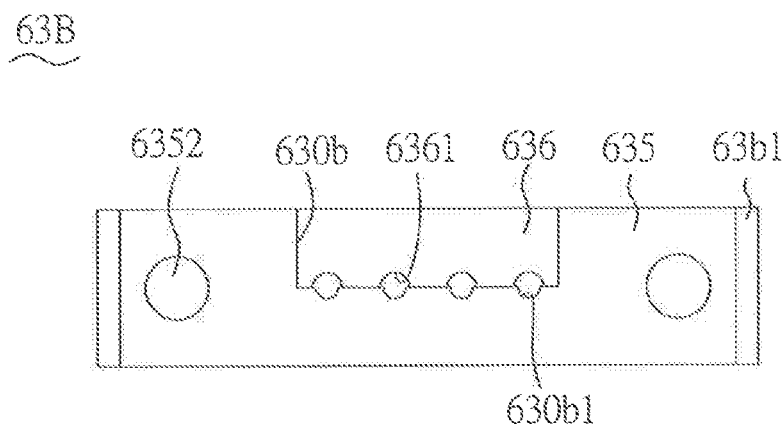
FIG. 19F is a schematic view illustrating still another positioning assembly of the optical fiber connector according to the twenty-third embodiment of the present invention.

Now references are made to FIG. 19D, a schematic view illustrating a positioning assembly of the optical fiber connector according to the twenty-third embodiment of the present invention; FIG. 19E, a schematic view illustrating another positioning assembly of the optical fiber connector; and FIG. 19F, a schematic view illustrating still another positioning assembly of the optical fiber connector. The positioning assembly 63 shown in FIG. 19D differs from the positioning assembly 63A in FIG. 19E, and from the positioning assembly 63B in FIG. 19F, in that the positioning assembly 63 is not provided with an opening.

According to the present invention, the positioning assembly 63A includes a positioning sheet 633 and a spacing board 634, where the positioning sheet 633 is formed with an opening 630a communicated therethrough, and with four positioning slots 630a1; and where the positioning sheet 633 is provided with two first positioning pin holes 6332. The spacing board 634 is provided with four positioning holes 6341, a protrusion 63a1, and two second positioning pin holes (not shown) corresponding to the two first positioning pin holes 6332. The four positioning slots 630a1 are zigzag, and correspond respectively to four bare fibers 601. In other words, the positioning sheet 631 positions the four bare fibers 601 with a manner of insertion; whereas the positioning sheet 633 with a manner of abutting against with each other for positioning the four bare fibers 601.

Further, according to the present invention, the positioning assembly 63B includes a positioning sheet 635 and a spacing board 636, where the positioning sheet 635 is formed with an opening 630b communicated therethrough, and with four positioning slots 630b1; and where the positioning sheet 635 is provided with two first positioning pin holes 6352. The spacing board 636 is provided with four positioning holes 6361, a protrusion 63b1, and two second positioning pin holes (not shown) corresponding to the two first positioning pin holes 6352. The four positioning slots 630b1 are semicircular, and correspond respectively to four bare fibers 601. In other words, the positioning sheet 631 positions the four bare fibers 601 with a manner of insertion; whereas the positioning sheet 635 with a manner of abutting against with each other for positioning the four bare fibers 601.

Still further, normally, a bore for positioning an optical fiber has a diameter of 0.127 mm. When a metal sheet has a thickness of 0.5 mm, a wire-cutting method, if applied to the positioning sheet 633 having the opening 630a or to the positioning sheet 635 having the opening 630b, will be more convenient than other working methods.

Figure 20:
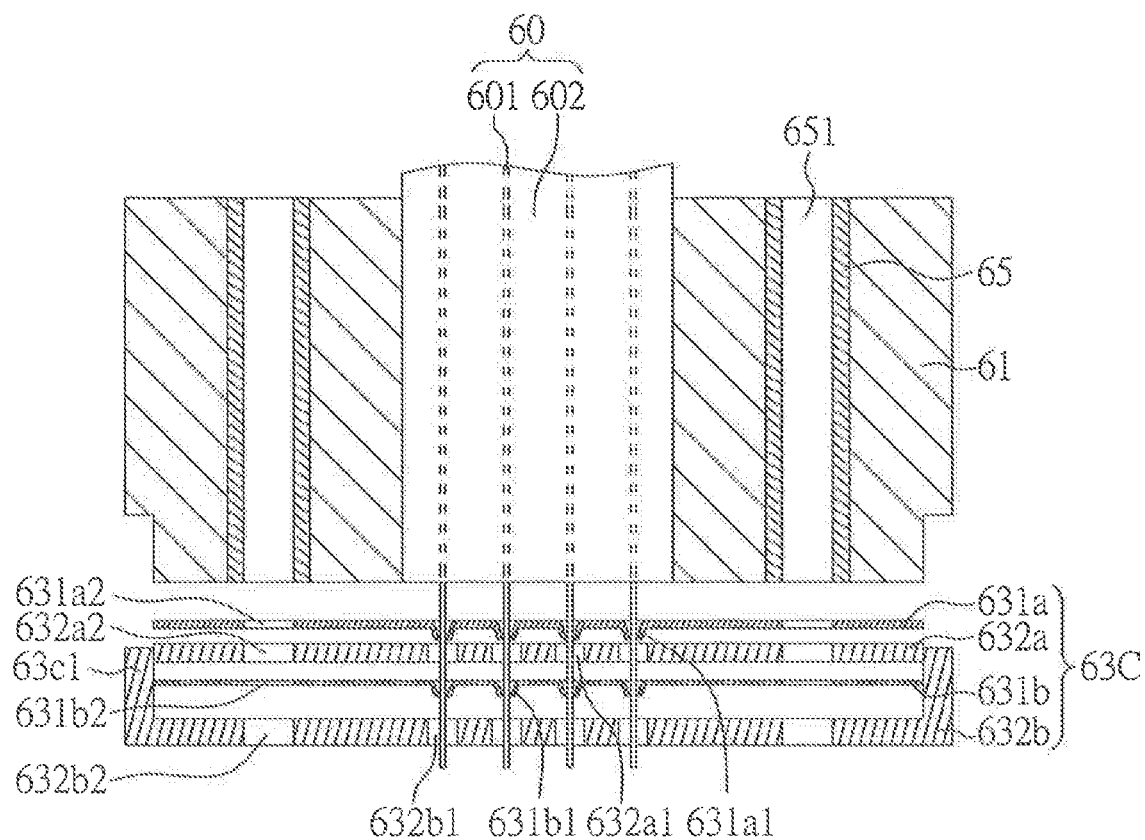
FIG. 20 is an exploded view illustrating manufacturing of an optical fiber connector according to a twenty-fourth embodiment of the present invention.
Figure 20:
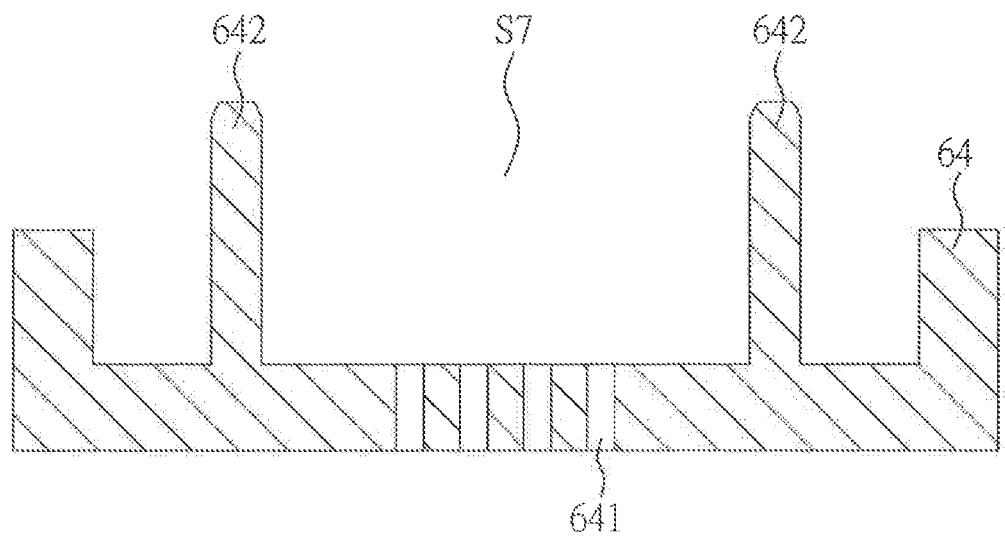

Further referring to FIG. 20, an exploded view illustrating manufacturing of an optical fiber connector according to a twenty-fourth embodiment of the present invention, the manufacturing of the optical fiber connector comprises an optical fiber assembly 60, a first body member 61, a second body member 62 (references may be made to FIG. 19A and FIG. 19B for the twenty-third embodiment), a positioning assembly 63C, a lower mold plate 64, and two tube-like members 65.

According to the present invention, the twenty-fourth embodiment for manufacturing the optical fiber connector differs from the twenty-third embodiment for manufacturing the optical fiber connector in that the twenty-fourth embodiment comprises the positioning assembly 63C having two positioning sheets 631a, 631b and having two spacing boards 632a, 632b interplaced with one another. The positioning sheet 631a is provided with four bare-fiber positioning holes 631a1 corresponding respectively to the first mounting portion 611 and the second mounting portion 621, and with two first positioning pin holes 631a2 corresponding respectively to the two positioning pins 642. The positioning sheet 631b is provided with four bare-fiber positioning holes 631b1 corresponding respectively to the first mounting portion 611 and the second mounting portion 621, and with two first positioning pin holes 631b2 corresponding respectively to the two positioning pins 642. The spacing board 632a is provided with four positioning holes 632a1 corresponding respectively to the bare-fiber positioning holes 631a1, 631b1, and with two second positioning pin holes 632a2 corresponding respectively to the two positioning pins 642. The spacing board 632b is provided with four positioning holes 632b1 corresponding respectively to the bare-fiber positioning holes 631a1, 631b1, and with two second positioning pin holes 632b2 corresponding respectively to the two positioning pins 642, and with two protrusions 63c1. The lower mold plate 64 is provided with four through holes 641 corresponding respectively to the bare-fiber positioning holes 631a1, 631b1, and with two positioning pins 642, and with an accommodating space S7 for receiving the first body member 61, the second body member 62, and the positioning assembly 63C, and after gluing and pressing, an optical fiber connector can be formed.

In the twenty-fourth embodiment, by way of the arrangement of the two positioning sheets 631a, 631b, an enhancing positioning effect for the bare fibers 601 can be obtained. Besides, the positioning sheets 631a, 631b are formed with different thicknesses, such that the positioning sheet 631a, having a larger thickness, can increase wear resistance and durability for the optical fiber connector.

Figure 21A:
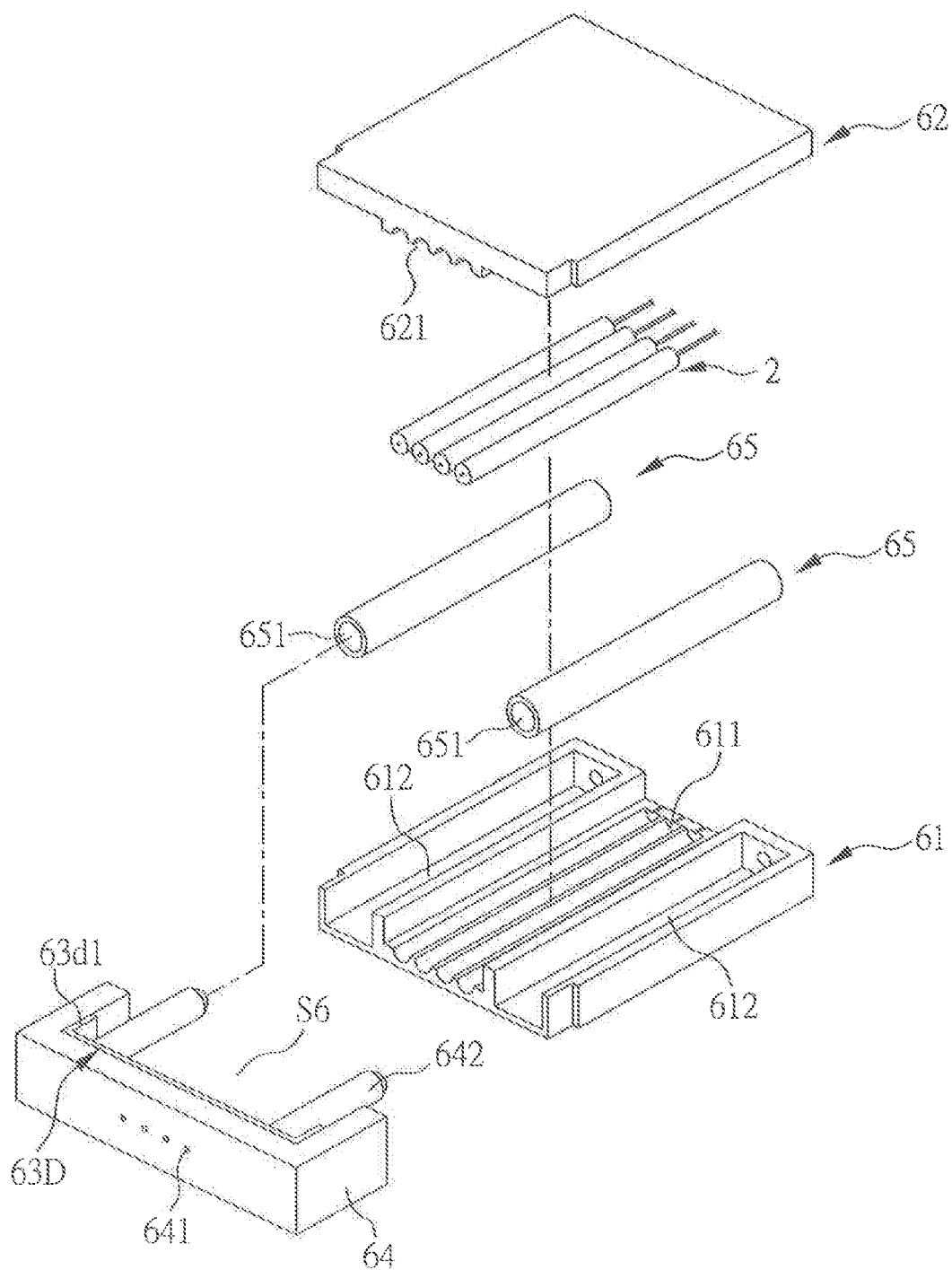
FIG. 21A is a perspective exploded view illustrating a third embodiment in manufacturing an assembled structure of optical fiber connectors according to the present invention.
Figure 21B:
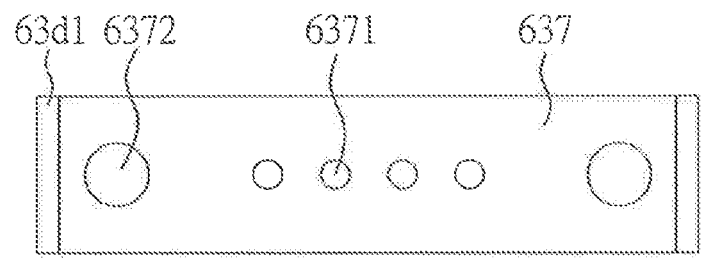
FIG. 21B is a schematic view illustrating a positioning assembly of the third embodiment of the assembled structure of optical fiber connectors according to the present invention.

Further, references are made to FIG. 21A, a perspective exploded view illustrating a third embodiment in manufacturing an assembled structure of optical fiber connectors according to the present invention; and FIG. 21B, a schematic view illustrating a positioning assembly of the third embodiment of the assembled structure of optical fiber connectors. The manufacturing of the third embodiment of the assembled structure of optical fiber connectors comprises four optical fiber connectors 2, a first body member 61, a second body member 62, a positioning assembly 63D, a lower mold plate 64, and two tube-like members 65.

In the third embodiment in manufacturing the assembled structure of optical fiber connectors, the optical fiber assembly 60 (references are made to FIG. 19A and FIG. 19C) is replaced with four optical fiber connectors 2. To comply with such change in the structure, the first body member 61 is provided with four first mounting portions 611, whereas the second body member 62 with four second mounting portions 621. The positioning assembly 63D includes a positioning sheet 637 and a spacing board (not shown). The positioning sheet 637 is provided with four optical-fiber-connector positioning holes 6371 and two first positioning pin holes 6372. The spacing board includes a protrusion 63d1 and two second positioning pin holes (not shown) corresponding respectively to the two first positioning pin holes 6372. The four optical fiber connectors 2 correspond to, and are arranged in the four first mounting portions 611 and the four second mounting portions 621, and after gluing and pressing, a product of the assembled structure of optical fiber connectors can be formed.

Figure 22A:
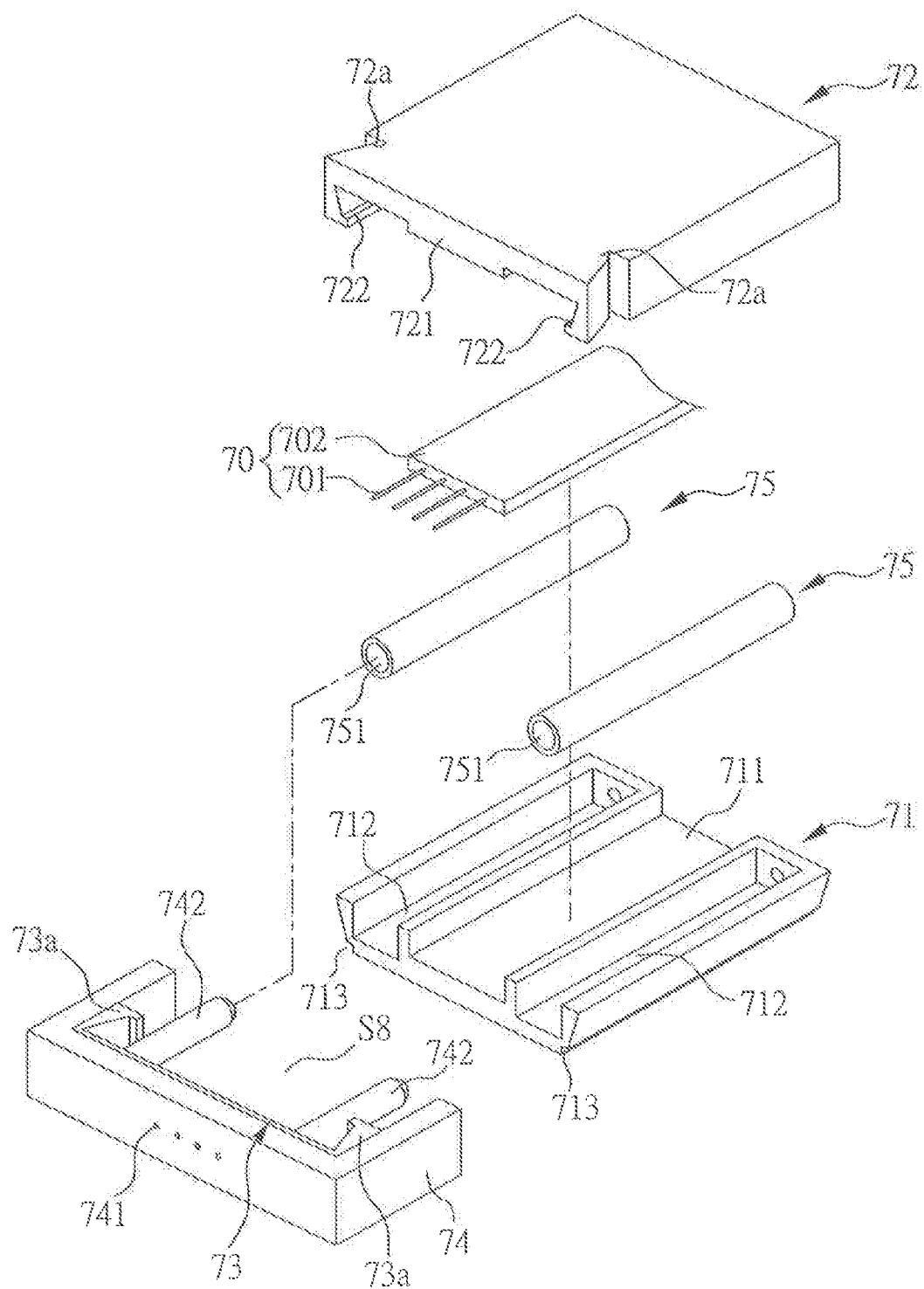
FIG. 22A is a perspective exploded view illustrating manufacturing of an optical fiber connector according to a twenty-fifth embodiment of the present invention.

Now referring to FIG. 22A, a perspective exploded view illustrating manufacturing of an optical fiber connector according to a twenty-fifth embodiment of the present invention, the manufacturing of the optical fiber connector comprises an optical fiber assembly 70, a first body member 71, a second body member 72, a positioning assembly 73, a lower mold plate 74, and two tube-like members 75.

In the twenty-fifth embodiment, the optical fiber assembly 70 includes four bare fibers 701 and a protective layer 702. The first body member 71 includes a first mounting portion 711, two receiving portions 712 for receiving the two tube-like members 75, and two first fastening portions 713. Further, the second body member 72 is arranged on the first body member 71, and includes a second mounting portion 721, two second fastening portions 722 corresponding respectively to the two first fastening portions 713, and two first engaging portions 72a. The positioning assembly 73 includes two second engaging portions 73a corresponding respectively to the two first engaging portions 72a. The lower mold plate 74 is provided with four through holes 741 corresponding respectively to the four bare fiber 701, two positioning pins 742, and with an accommodating space S8 for receiving the first body member 71, the second body member 72, and the positioning assembly 73C. The two tube-like members 75 are each provided with a third positioning pin hole 751 for receiving the positioning pin 742, and after gluing and pressing, an optical fiber connector can be formed.

According to the present invention, the manufacturing of the optical fiber connector of the twenty-fifth embodiment differs from that of the twenty-third embodiment in that in the twenty-fifth embodiment, the two first fastening portions 713 of the first body member 71 and the two second fastening portions 722 of the second body member 72 are engaged with each other, and in that the two first engaging portions 72a of the second body member 72 and the two second engaging portions 73a of the positioning assembly 73 are engaged with each other, so that the optical fiber connectors, being made, can be tightly combined with each other. Besides, a protective member (not shown) can be provided for receiving therein the first body member 71, the second body member 72, and the positioning assembly 73 so as to reinforce the firmness of the optical fiber connectors.

Figure 22B:
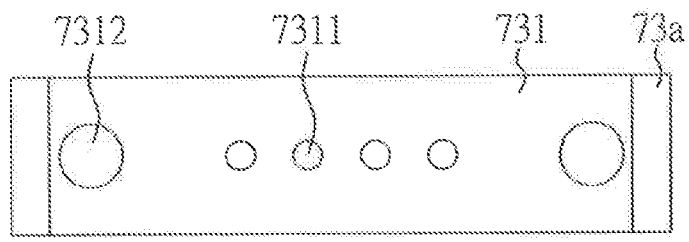
FIG. 22B is a schematic view illustrating a positioning assembly of the optical fiber connector according to the twenty-fifth embodiment of the present invention.
Figure 22C:
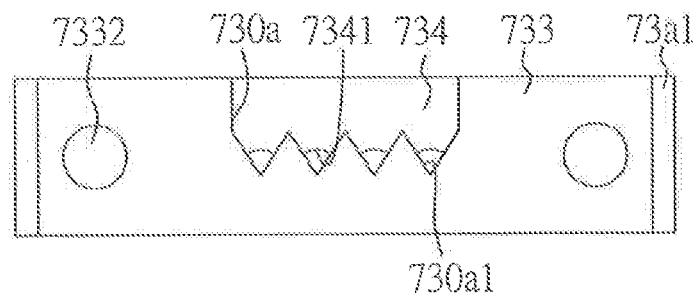
FIG. 22C is a schematic view illustrating another positioning assembly of the optical fiber connector according to the twenty-fifth embodiment of the present invention.
Figure 22D:
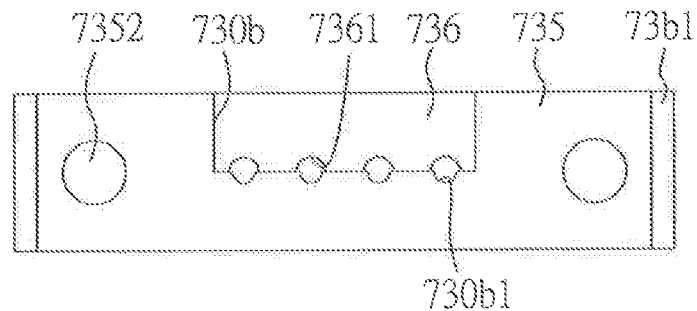
FIG. 22D is a schematic view illustrating still another positioning assembly of the optical fiber connector according to the twenty-fifth embodiment of the present invention.

Further, references are made to FIG. 22B, a schematic view illustrating a positioning assembly of the optical fiber connector according to the twenty-fifth embodiment of the present invention; FIG. 22C, a schematic view illustrating another positioning assembly of the optical fiber connector; and FIG. 22D, a schematic view illustrating still another positioning assembly of the optical fiber connector. The positioning assembly 73 shown in FIG. 22B differs from the positioning assembly 73A in FIG. 22C, and from the positioning assembly 73B in FIG. 22D, in that the positioning assembly 73 is not provided with an opening.

According to the present invention, the positioning assembly 73 includes a positioning sheet 731 and a spacing board (not shown), where the positioning sheet 731 is provided with four bare-fiber position holes 7311 and two first positioning pin holes 7312. The spacing board includes second engaging portions 73a, and is provided with two second positioning pin holes corresponding respectively to the two first positioning pin holes 7312.

Further, according to the present invention, the positioning assembly 73A includes a positioning sheet 733 and a spacing board 734, where the positioning sheet 733 is formed with an opening 730a communicated therethrough, and with four positioning slots 730a1; and where the positioning sheet 733 is provided with two first positioning pin holes 7332. The spacing board 734 is provided with four positioning holes 7341, two second engaging portions 73a, and two second positioning pin holes (not shown) corresponding respectively to the two first positioning pin holes 7332. The four positioning slots 730a1 are zigzag, and correspond respectively to four bare fibers 701. In other words, the positioning sheet 731 positions the four bare fibers 701 with a manner of insertion; whereas the positioning sheet 733 with a manner of abutting against with each other for positioning the four bare fibers 701.

Still further, according to the present invention, the positioning assembly 73B includes a positioning sheet 735 and a spacing board 736, where the positioning sheet 735 is formed with an opening 730b communicated therethrough, and with four positioning slots 730b1; and where the positioning sheet 735 is provided with two first positioning pin holes 7352. The spacing board 736 is provided with four positioning holes 7361, two second engaging protrusions 73b1, and two second positioning pin holes (not shown) corresponding to the two first positioning pin holes 7352. The four positioning slots 730b1 are semicircular, and correspond respectively to the four bare fibers 701. In other words, the positioning sheet 731 positions the four bare fibers 701 with a manner of insertion; whereas the positioning sheet 735 with a manner of abutting against with each other for positioning the four bare fibers 701.

Figure 23A:
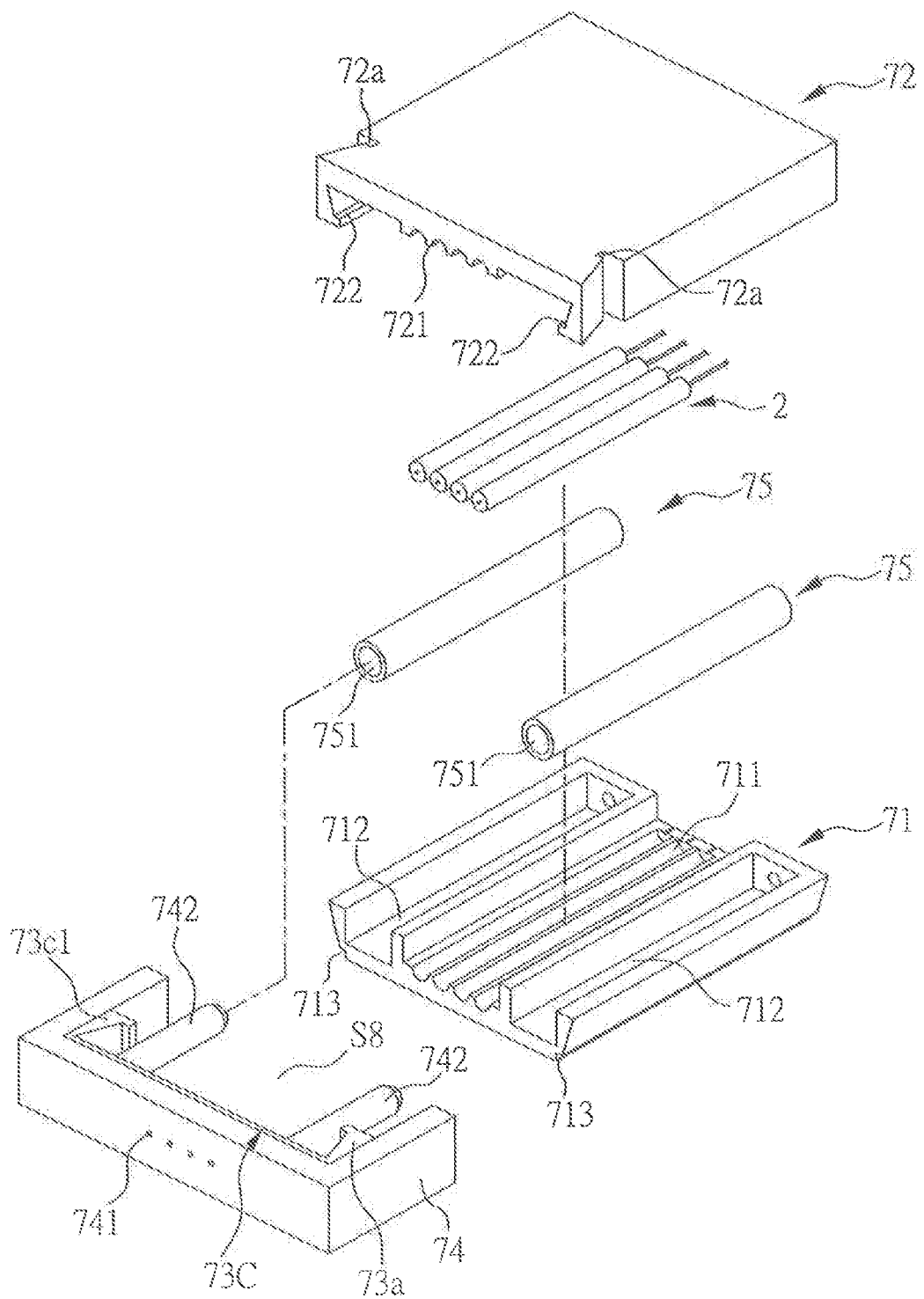
FIG. 23A is a perspective exploded view illustrating a fourth embodiment in manufacturing an assembled structure of optical fiber connectors according to the present invention.
Figure 23B:
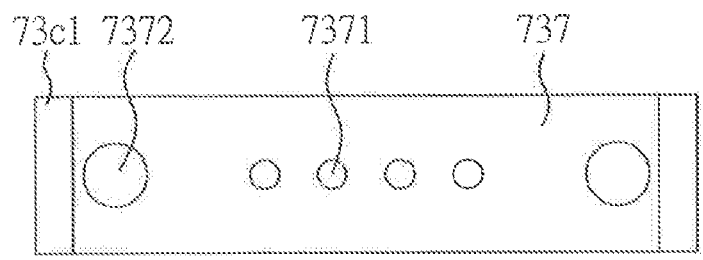
FIG. 23B is a schematic view illustrating a positioning assembly of the fourth embodiment of the assembled structure of optical fiber connectors according to the present invention.

Now references are made to FIG. 23A, a perspective exploded view illustrating a fourth embodiment in manufacturing an assembled structure of optical fiber connectors according to the present invention; and FIG. 23B, a schematic view illustrating a positioning assembly of the fourth embodiment of the assembled structure of optical fiber connectors. The manufacturing of the fourth embodiment of the assembled structure of optical fiber connectors comprises four optical fiber connectors 2, a first body member 71, a second body member 72, a positioning assembly 73C, a lower mold plate 74, and two tube-like members 75.

In the fourth embodiment in manufacturing the assembled structure of optical fiber connectors, the optical fiber assembly 70 (see FIG. 22A) is replaced with four optical fiber connectors 2. To comply with such change in the structure, the first body member 71 is provided with four first mounting portions 711, whereas the second body member 72 with four second mounting portions 721. The positioning assembly 73C includes a positioning sheet 737 and a spacing board (not shown). The positioning sheet 737 is provided with four optical-fiber-connector positioning holes 7371 and two first positioning pin holes 7372. The spacing board includes a protrusion 73c1 and two second positioning pin holes (not shown) corresponding respectively to the two first positioning pin holes 7372. The four optical fiber connectors 2 correspond to, and are arranged, in the four first mounting portions 711 and the four second mounting portions 721, and after gluing and pressing, a product of the assembled structure of optical fiber connectors can be formed.

Further, the manufacturing of the optical fiber connectors, from the first embodiment (see FIG. 2) to the eighteenth embodiment (see FIG. 12F), and the twenty-third embodiment (see FIG. 19A), and the twenty-fifth embodiment (see FIG. 22A), the manner in the application of adhesive for the gluing can be can be divided into two methods as follows: First, to apply adhesive to the optical fiber assemblies 20, 60, 70, and then to the other components, so as to form the optical fiber connectors; Second, to apply adhesive to the other components, and reserve space for arranging the optical fiber connectors 20, 60, 70, and then put into the optical fiber connectors 20, 60, 70 so as to form the optical fiber connectors.

Still further, after completion of the optical fiber connectors according to the present invention, the process of abrasion will be performed. In general, a soft abrasive disc can be employed to polish the end of the protrusion of the optical fiber assembly. Thereafter, a hydrophobic material layer will be coated on the surface of the optical fiber assembly which has been polished by the soft abrasive disc. After the coating, a hard abrasive disc will be employed to grind the optical fiber assembly so as to remove the hydrophobic material layer on the end of the bare fiber, and to expose the end of the bare fiber. Finally, the process of spraying lens material will be applied to the ends of the bare fibers such that lenses can be formed on the bare fibers, and then the lenses are heated and become hard and solid. Such a working process has been a mature technique, and that related technical information can be searched from public sources and are well known to those skilled in the art. As such, no further descriptions thereof are necessary.

Given the above, it is noted that for the optical fiber connectors and assembled structure thereof, according to the present invention, the body members, the positioning members, and the casing members can reinforce the positioning effect of the bare fibers during the manufacturing of the optical fiber connectors and improve the strength of the optical fiber connectors. This will increase the reliability and production capacity for the automation of producing optical fiber connectors, so as to improve the utility of optical fiber connectors.

Although the present invention has been explained in relation to its preferred embodiments, it is to be understood that many other possible modifications and variations can be made without departing from the scope of the invention as hereinafter claimed.

What is claimed is:

1. An optical fiber connector, comprising:
   a body member, including a first positioning hole and a concave portion; and
   a positioning member, including a first spacing board and at least one positioning sheet, wherein the first spacing board is provided with a second positioning hole and a protrusion, and the second positioning hole corresponds to the first positioning hole, and the protrusion corresponds to, and is arranged in the concave portion, and wherein the at least one positioning sheet is provided with a third positioning hole corresponding to the second positioning hole;
   wherein, the body member is adhered to the positioning member by an adhesive, so that the body member and the positioning member are integrated into one piece, and
   wherein, the first spacing board includes at least one structural reinforcing portion, and the at least one positioning sheet is provided with at least one structural reinforcing hole corresponding to the at least one reinforcing portion.

2. The optical fiber connector as claimed in claim 1, wherein the positioning member further includes at least one second spacing board, and the at least one second spacing board is provided with a fourth positioning hole corresponding to the third positioning hole.

3. The optical fiber connector as claimed in claim 2, wherein each positioning sheet is provided with a plurality of structural reinforcing apertures extending between the first spacing board and the second spacing board, to enable the first spacing board and second spacing board to be glued together.

4. The optical fiber connector as claimed in claim 2, wherein the first spacing board is provided with at least one structural reinforcing slot, and each positioning sheet is provided with at least one structural reinforcing aperture corresponding to the at least one structural reinforcing slot, and each second spacing board includes at least one structural reinforcing portion corresponding to the at least one structural reinforcing slot.

5. The optical fiber connector as claimed in claim 1, wherein the concave portion is formed inside with a first thread portion, and the first spacing board formed with a second thread portion corresponding to the first thread portion.

6. The optical fiber connector as claimed in either claim 1, further comprising an optical fiber assembly including a bare fiber and a protective layer, wherein the bare fiber is enveloped by the protective layer with at least an end of the bare fiber uncovered, and wherein the protective layer is provided with the first positioning hole, such that the bare fiber is inserted into the third positioning hole so as to obtain a positioning effect.

7. The optical fiber connector as claimed in claim 6, wherein a plastic portion is formed by applying glue in and between the bare fiber and the positioning member so as to secure the bare fiber.

8. An assembled structure of optical fiber connectors, comprising a plurality of optical fiber connectors, as claimed in claim 7, a casing member, an upper board, a positioning assembly, and a plastic member, wherein the upper board is arranged above the casing member, and includes at least one sprue and a plurality of optical-fiber-assembly through holes, and the positioning assembly is provided at inner side of the casing member, and is provided with at least one optical-fiber-connector positioning hole corresponding to the at least one optical-fiber-assembly through hole, and the plastic member is integrated with the casing member, the upper board, the positioning assembly, and with the at least one optical fiber connector, such that the at least one optical fiber connector corresponds to, and passes through, the at least one optical-fiber-assembly through hole.

9. The assembled structure of optical fiber connectors as claimed in claim 8, wherein the casing member further includes a mounting portion for arranging a protective member.

10. The assembled structure of optical fiber connectors as claimed in claim 8, wherein the positioning assembly includes either at least one sheet or at least one spacing board, the at least one sheet is provided with at least one optical-fiber-connector positioning hole, and the at least one spacing board is provided with at least one positioning hole corresponding to the at least one optical-fiber-assembly through hole.

11. The assembled structure of optical fiber connectors as claimed in claim 8, wherein the positioning assembly is formed with at least one plastic-material channel, and the plastic member, located at the upper side and lower side of the positioning assembly, can be fed through the at least one plastic-material channel, and formed integrally as an optical-fiber-connector assembled structure.

12. An assembled structure of optical fiber connectors, comprising a plurality of optical fiber connectors, as claimed in claim 7, a first body member, a second body member, and a positioning assembly, wherein the first body member includes at least one first mounting portion, and the second body member is arranged on the first body member, and includes at least one second mounting portion corresponding to the at least one first mounting portions, and the positioning assembly includes either at least one sheet or at least one spacing board, and wherein the at least one sheet is provided with a plurality of optical-fiber-connector positioning holes corresponding to the plural optical fiber connectors, respectively, and the at least one spacing board is provided with a plurality of positioning holes corresponding respectively to the plural optical fiber connectors, and wherein adhesive is applied to the plural optical fiber connectors, the first body member, the second body member, and the positioning assembly, so as to make the same integrated into one piece, and the plural optical fiber connectors correspond to, and are arranged in, the at least one first mounting portion and the at least one second mounting portion, and besides, bare fibers of the plural optical fiber connectors emerge from the positioning holes of the at least one spacing board, respectively.

13. The assembled structure of optical fiber connectors as claimed in claim 12, further comprising two tube-like members, wherein the first body member further includes two receiving portions for respectively receiving the two tube-like members, and the first body member and the second body member are formed with two recessed portions, and wherein the positioning assembly further includes two protrusions corresponding respectively to the two recessed portions, and the at least one spacing board further includes two second positioning pin holes corresponding respectively to the two tube-like members, and the two tube-like members are provided on the positioning assembly, and each tube-like member includes a third positioning pin hole for receiving a positioning pin, and adhesive is applied to the first body member, the second body member, the positioning assembly, and the two tube-like members, so as to make the same integrated into one piece.

14. The assembled structure of optical fiber connectors as claimed in claim 12, further comprising two tube-like members, wherein the first body member further includes two receiving portions for respectively receiving the two tube-like members, and two first fastening portions, and the second body member further includes two second fastening portions corresponding respectively to the two first fastening portions, and two first engaging portions, and the positioning assembly further includes two second engaging portions corresponding respectively to the two first engaging portions, and wherein the at least one spacing board further includes two second positioning pin holes corresponding respectively to the two tube-like members, and the two tube-like members are provided on the positioning assembly, and each tube-like member includes a third positioning pin hole for receiving the positioning pin, and adhesive is applied to the first body member, the second body member, the positioning assembly, and the two tube-like members, so as to make the same integrated into one piece.

15. The assembled structure of optical fiber connectors as claimed in claim 12, wherein the at least one sheet is formed with an opening communicated therethrough, and a plurality of positioning slots, and the positioning slots take place of the plural optical-fiber-connector positioning holes of the at least one sheet, respectively.

16. The assembled structure of optical fiber connectors as claimed in claim 12, further comprising a protective member for receiving therein the first body member, the second body member, and the positioning assembly.

* * * * *